(12) United States Patent
Tanaka

(10) Patent No.: US 10,225,554 B2
(45) Date of Patent: Mar. 5, 2019

(54) IMAGE PROCESSING DEVICE AND IMAGE PROCESSING METHOD

(71) Applicant: Velos Media, LLC, Plano, TX (US)

(72) Inventor: Junichi Tanaka, Kanagawa (JP)

(73) Assignee: Velos Media, LLC, Plano, TX (US)

( * ) Notice: Subject to any disclaimer, the term of this patent is extended or adjusted under 35 U.S.C. 154(b) by 0 days.

(21) Appl. No.: 15/955,091

(22) Filed: Apr. 17, 2018

(65) Prior Publication Data

US 2018/0234680 A1  Aug. 16, 2018

Related U.S. Application Data

(63) Continuation of application No. 14/536,851, filed on Nov. 10, 2014, now Pat. No. 9,986,241, which is a
(Continued)

(30) Foreign Application Priority Data

Feb. 10, 2011 (JP) .................................. 2011-027896
Mar. 4, 2011 (JP) .................................. 2011-047655
Aug. 30, 2011 (JP) .................................. 2011-187179

(51) Int. Cl.
*H04N 19/126* (2014.01)
*H04N 19/103* (2014.01)
(Continued)

(52) U.S. Cl.
CPC ......... *H04N 19/124* (2014.11); *H04N 19/103* (2014.11); *H04N 19/126* (2014.11);
(Continued)

(58) Field of Classification Search
CPC ... H04N 19/126; H04N 19/103; H04N 19/157
(Continued)

(56) References Cited

U.S. PATENT DOCUMENTS 6,928,113 B1   8/2005  Mihara
9,706,205 B2   7/2017  Tanaka
(Continued)

FOREIGN PATENT DOCUMENTS

CN      1527607 A      9/2004
DE   196 18 117 C1    10/1997
(Continued)

OTHER PUBLICATIONS

Lim, Decoding method, decoding apparatus, coding method, and coding apparatus, Oct. 29, 2010, PCT/JP2010/006383.
(Continued)

*Primary Examiner* — Nam D Pham
(74) *Attorney, Agent, or Firm* — Nixon & Vanderhye P.C.

(57) ABSTRACT

An image processing device including an acquiring section configured to acquire quantization matrix parameters from an encoded stream in which the quantization matrix parameters defining a quantization matrix are set within a parameter set which is different from a sequence parameter set and a picture parameter set, a setting section configured to set, based on the quantization matrix parameters acquired by the acquiring section, a quantization matrix which is used when inversely quantizing data decoded from the encoded stream, and an inverse quantization section configured to inversely quantize the data decoded from the encoded stream using the quantization matrix set by the setting section.

10 Claims, 37 Drawing Sheets

Related U.S. Application Data continuation of application No. 13/990,489, filed as application No. PCT/JP2012/050931 on Jan. 18, 2012, now Pat. No. 9,706,205.

(51) Int. Cl.

| | | |
|---|---|---|
| *H04N 19/157* | (2014.01) | |
| *H04N 19/124* | (2014.01) | |
| *H04N 19/70* | (2014.01) | |
| *H04N 19/31* | (2014.01) | |
| *H04N 19/50* | (2014.01) | |
| *H04N 19/44* | (2014.01) | |
| *H04N 19/463* | (2014.01) | |
| *H04N 19/174* | (2014.01) | |

(52) U.S. Cl.
CPC ......... *H04N 19/157* (2014.11); *H04N 19/174* (2014.11); *H04N 19/31* (2014.11); *H04N 19/44* (2014.11); *H04N 19/463* (2014.11); *H04N 19/50* (2014.11); *H04N 19/70* (2014.11)

(58) Field of Classification Search
USPC .................................................. 375/240.03
See application file for complete search history.

(56) References Cited

U.S. PATENT DOCUMENTS

| | | |
|---|---|---|
| 2004/0190610 A1 | 9/2004 | Song et al. |
| 2005/0169547 A1 | 8/2005 | Mihara |
| 2005/0190836 A1 | 9/2005 | Lu et al. |
| 2006/0029130 A1 | 2/2006 | Song et al. |
| 2006/0029131 A1 | 2/2006 | Song et al. |
| 2006/0029132 A1 | 2/2006 | Song et al. |
| 2006/0029283 A1 | 2/2006 | Song et al. |
| 2006/0034371 A1 | 2/2006 | Song et al. |
| 2006/0034372 A1 | 2/2006 | Song et al. |
| 2007/0104270 A1 | 5/2007 | Song et al. |
| 2007/0189626 A1* | 8/2007 | Tanizawa ............. H04N 19/176 382/251 |
| 2008/0069211 A1 | 3/2008 | Kim |
| 2008/0089410 A1 | 4/2008 | Lu et al. |
| 2008/0170624 A1 | 7/2008 | Yamada et al. |
| 2008/0170627 A1 | 7/2008 | Yamada et al. |
| 2008/0170793 A1 | 7/2008 | Yamada et al. |
| 2008/0205516 A1 | 8/2008 | Song et al. |
| 2008/0205517 A1 | 8/2008 | Song et al. |
| 2008/0205528 A1 | 8/2008 | Song et al. |
| 2008/0253449 A1 | 10/2008 | Shimizu et al. |
| 2009/0296808 A1 | 12/2009 | Regunathan |
| 2010/0020883 A1 | 1/2010 | Miyauchi |
| 2010/0091842 A1 | 4/2010 | Ikeda |
| 2010/0177828 A1 | 7/2010 | Rubinstein |
| 2010/0316120 A1 | 12/2010 | Abe |
| 2011/0026611 A1 | 2/2011 | Kondo |
| 2012/0121188 A1 | 1/2012 | Kondo |
| 2012/0140815 A1 | 6/2012 | Zhou et al. |
| 2013/0028531 A1 | 1/2013 | Sato |
| 2013/0051477 A1 | 2/2013 | Sasaki |
| 2013/0071039 A1 | 3/2013 | Sato |
| 2013/0101026 A1 | 4/2013 | Song et al. |
| 2013/0216149 A1 | 8/2013 | Sato |
| 2013/0251032 A1 | 9/2013 | Tanaka |
| 2013/0251050 A1 | 9/2013 | Ikeda et al. |
| 2013/0259142 A1 | 10/2013 | Ikeda et al. |
| 2013/0301739 A1 | 11/2013 | Sato |
| 2013/0301743 A1 | 11/2013 | Ikeda et al. |
| 2013/0301942 A1 | 11/2013 | Kondo |
| 2013/0322525 A1 | 12/2013 | Tanaka |
| 2013/0330012 A1 | 12/2013 | Sato |
| 2013/0343451 A1 | 12/2013 | Sato |
| 2014/0003510 A1 | 1/2014 | Lu et al. |
| 2014/0023150 A1 | 1/2014 | Kondo |
| 2014/0050262 A1 | 2/2014 | Sakurai et al. |
| 2014/0050267 A1 | 2/2014 | Sakurai et al. |
| 2014/0064362 A1 | 3/2014 | Sato |
| 2014/0072037 A1 | 3/2014 | Sato |
| 2014/0086322 A1 | 3/2014 | Takahashi et al. |
| 2014/0092958 A1 | 4/2014 | Sato |
| 2014/0105281 A1 | 4/2014 | Sato et al. |
| 2014/0112396 A1 | 4/2014 | Ikeda |
| 2014/0133547 A1 | 5/2014 | Tanaka |
| 2015/0043816 A1 | 2/2015 | Tanaka |

FOREIGN PATENT DOCUMENTS

| | | |
|---|---|---|
| EP | 0 987 902 A2 | 3/2000 |
| EP | 1 439 706 A2 | 7/2004 |
| EP | 1 947 860 A2 | 7/2008 |
| JP | 6-284412 A | 10/1994 |
| JP | 2004-254327 A | 9/2004 |
| JP | 2007-520165 A | 7/2007 |
| JP | 2007-318516 A | 12/2007 |
| JP | 4414328 B2 | 11/2009 |
| KR | 10-2008-0085909 | 9/2008 |
| WO | WO 2005/072312 A2 | 8/2005 |

OTHER PUBLICATIONS

Notice of Allowance dated Jan. 23, 2018 in U.S. Appl. No. 14/524,590.
Chinese Notification to Grant Patent Right for Invention dated Aug. 30, 2017 in Chinese application 201410022658.2.
Canadian Office Action dated Jul. 26, 2017 in CA Patent application 2,819,401.
EP Summons to Attend Oral Proceedings Pursuant to Rule 115(1) EPC dated Sep. 22, 2017 in EP application 12744369.5.
English translation of Korean Notice of Preliminary Rejection dated Aug. 31, 2017 in KR application 10-2013-7020512.
PH Substantive Examination Report dated Sep. 12, 2017 in PH application 1/2015/501742.
Chinese Notification to Go Through Formalities Registration mailed Aug. 7, 2017 in Chinese application 201280007291.6.
Japanese Decision to Grant with English translation dated Aug. 15, 2017 in Japanese application 2016-132584.
Japanese Decision to Grant with English translation dated Aug. 15, 2017 in Japanese application 2016-132583.
Chinese Office Action dated Jun. 2, 2017 in Chinese Application 201410022658.2.
Office Action dated Jun. 3, 2016 in Chinese Application No. 201410022658.2, along with its English translation.
Combined Chinese Office Action and Search Report dated Apr. 11, 2016 in Patent Application No. 201280007291.6 (with English Translation).
Extended European Search Report dated Feb. 17, 2016 in European Patent Application No. 12744369.5.
Singapore Written Opinion dated Jan. 27, 2016 in Patent Application No. 10201400975Q.
Miska M. Hannuksela, "Coding of Parameter Sets," Joint Video Team (JVT) 01 ISO/IEC MPEG & ITU-T VCEG (ISO/IEC JTC1/SC29/WG11 and ITU-T SG16 Q.6), 3$^{rd}$ Meeting: Fairfax, Virginia, USA, Document: JVT-C078, Filename: JVT-C078.doc, XP030005187, May 6-10, 2002.
Office Action dated Sep. 15, 2015 in Japanese Patent Application No. 2014-248712.
Office Action dated Sep. 15, 2015 in Japanese Patent Application No. 2012-556813.
Office Action dated Sep. 18, 2015 in Singapore Patent Application No. 10201400975Q.
Jiuhuai Lu. et al., "Proposal of quantization weighting for H.264/MPEG-4 AVC Professional Profiles" Joint Video Team (JVT) of ISO/IEC MPEG & ITU-T VCEG (ISO/IEC JTC1/SC29/WG11 and ITU-T SG16 Q.6). 11$^{th}$ Meeting: Munich, DE, Mar. 15-19, 2004, Document JVT-K029, 10 pages.
Singapore Search Report and Written Opinion dated Oct. 21, 2014 in Patent Application No. 201305910-0.
Akiyuki Tanizawa et al., "Adaptive Quantization Matrix Selection on KTA Software", ITU—Telecommunications Standardization Sec-

(56) References Cited

OTHER PUBLICATIONS tor, Study Group 16 Question 6, Video Coding Experts Group (VCEG), Document: VCEG-AD06, 30$^{th}$ Meeting, Oct. 23-24, 2006, 5 pages.
"Test Model Under Consideration", Joint Collaborative Team on Video Coding (JCT-VC) of ITU-T SG16 WP3 and ISO/IEC JTC1/SC29/WG11, Document: JCTVC-B205, 2$^{nd}$ Meeting, Jul. 21-28, 2010, 153 pages.
Junichi Tanaka et al., "Quantization Matrix for HEVC", Joint Collaborative Team on Video Coding (JCT-VC) of ITU-T SG16 WP3 and ISO/IEC JTC1/SC29/WG11, Document: JCTVC-E073, 5th Meeting, Mar. 16-23, 2011, 24 pages.
Office Action dated Aug. 4, 2015 in U.S. Appl. No. 13/990,489.
Final Office Action dated Dec. 3, 2015 in U.S. Appl. No. 13/990,489.
Advisory Action dated Feb. 25, 2016 in U.S. Appl. No. 13/990,489.
Office Action dated May 19, 2016 in U.S. Appl. No. 13/990,489.
Final Office Action dated Aug. 24, 2016 in U.S. Appl. No. 13/990,489.
Advisory Action dated Nov. 24, 2016 in U.S. Appl. No. 13/990,489.
Notice of Allowance dated Mar. 23, 2017 in U.S. Appl. No. 13/990,489.
Notice of Allowance dated Jan. 22, 2018 in U.S. Appl. No. 14/536,851.
Notice of Allowance dated Sep. 15, 2017 in U.S. Appl. No. 14/536,851.
Office Action dated Apr. 12, 2017 in U.S. Appl. No. 14/536,851.
Advisory Action dated Sep. 15, 2016 in U.S. Appl. No. 14/536,851.
Final Office Action dated Jun. 24, 2016 in U.S. Appl. No. 14/536,851.
Office Action dated Mar. 9, 2016 in U.S. Appl. No. 14/536,851.
JP Notice of Reasons for Rejection and English translation thereof dated Aug. 14, 2018 in JP Application 2017-175724.
Zhou, et al., "Compact representation of quantization matrices" for HEVC, Joint Collaborative Team on Video Coding (JCT-VC) 4th Meeting: Daegu, JCTVC-D024-vl.zip, Jan. 15, 2011, JCTVC-D024.doc.

* cited by examiner

FIG.3

| PARAMETER NAME | DESCRIPTION |
|---|---|
| QMPS ID | IDENTIFIER FOR DISTINGUISHING EACH QMPS |
| GENERATION MODE PRESENT FLAG | FLAG INDICATING WHETHER CLASSIFICATION OF GENERATION MODE (pred_mode) IS PRESENT |
| GENERATION MODE <pred_mode> | CLASSIFICATION EXPRESSING MODE OF QUANTIZATION MATRIX GENERATION PROCESS<br>E.G.) 0: COPY, 1: AXIS DESIGNATION, 2: FULL SCAN |
| CASE OF COPY MODE (pred_mode='0') ||
| SOURCE ID | QMPS ID DESIGNATING COPY SOURCE QMPS<br>* DESIGNATES OWN ID WHEN USING DEFAULT MATRIX |
| COPY SOURCE SIZE | SIZE OF COPY SOURCE QUANTIZATION MATRIX |
| COPY SOURCE TYPE | TYPE OF COPY SOURCE QUANTIZATION MATRIX |
| RESIDUAL FLAG | FLAG INDICATING PRESENCE OF RESIDUAL ERROR |
| RESIDUAL DATA | DATA FOR GENERATING RESIDUAL MATRIX |
| CASE OF AXIS DESIGNATION MODE (pred_mode='1') ||
| DESIGNATION METHOD FLAG | FLAG INDICATING REFERENCE AXIS DESIGNATION METHOD<br>E.G.) 0: DIFFERENTIAL, 1: INTERPOLATION |
| REFERENCE AXIS DATA | DATA FOR REFERENCE AXIS ELEMENTS IN THE CASE OF DIFFERENTIAL METHOD |
| CORNER DATA | DATA FOR CORNER ELEMENTS IN THE CASE OF INTERPOLATION METHOD |
| RESIDUAL FLAG | FLAG INDICATING PRESENCE OF RESIDUAL ERROR |
| DIFFERENTIAL DATA | DATA FOR GENERATING RESIDUAL MATRIX |
| CASE OF FULL SCAN MODE (pred_mode='2') ||
| DIFFERENTIAL DATA | LINEAR ARRAY OF DIFFERENTIAL VALUES COMPUTED IN DPCM FORMAT FOR EACH ELEMENT IN QUANTIZATION MATRIX |

QUANTIZATION MATRIX PARAMETER SET

FIG.4

| PARAMETER NAME | DESCRIPTION |
|---|---|
| ⋮ | |
| SLICE TYPE | SLICE ENCODING TYPE |
| PPS ID | ID OF PPS REFERENCED FOR CURRENT SLICE |
| ⋮ | |
| QMPS ID PRESENT FLAG | FLAG INDICATING WHETHER QMPS ID IS PRESENT WITHIN CURRENT HEADER |
| QMPS ID | ID OF QMPS REFERENCED FOR CURRENT SLICE |
| ⋮ | |

SLICE HEADER

FIG.13

```
01 | QuantizaionMatrixParameterSet(){
02 |   quantization_matrix_paramter_id      ...QMPS ID
03 |   pred_present_flag                    ...GENERATION MODE PRESENT FLAG
04 |   for(i=0;i<SizeIdc;i++){                              //LOOP FOR EACH SIZE//
05 |     for(j=0;j<6;j++){                                  //LOOP FOR EACH TYPE//
06 |       if(pred_present_flag){
07 |         pred_mode                      ...GENERATION MODE
08 |         if(pred_mode==0){                              //COPY MODE//
09 |           pred_qmps_id                 ...SOURCE ID
10 |           pred_size_idc                ...COPY SOURCE SIZE
11 |           pred_matrix_id               ...COPY SOURCE TYPE 12 |           pred_matrix(j,i,pred_qmps_id,pred_size_idc,pred_matrix_id)
                                                            //COPY//
13 |           residual_flag                ...RESIDUAL FLAG
14 |           if(residual_flag){
15 |             residual_matrix(i)                         //ADD RESIDUAL ERROR//
16 |           }
17 |         }else if(pred_mode==1){                        //AXIS DESIGNATION MODE//
```
          //SEE FIG. 14//
```
51 |         }else if(pred_mode==2){                        //FULL SCAN MODE//
52 |           qmatrix(i,j)
53 |         }
54 |         }else{
55 |           qmatrix(i,j)
56 |         }
57 |     }
58 |   }
59 | }
```

FIG.14

```
18 |    dpcm_flag                           ...DESIGNATION METHOD FLAG
19 |    if(dpcm_flag){                      //DIFFERENTIAL METHOD//
20 |      nextcoef = 0
21 |      for(i=0,i<Size;i++){              //VERTICAL AXIS//
22 |        delta_coef
23 |        nextcoef = nextcoef + delta_coef
24 |        coef_vertical[i] = nextcoef
25 |      }
26 |      nextcoef = coef_horizontal[0] = coef_vertical[0]
27 |      copy_from_vertical
28 |      if(copy_from_vertical != 0){
29 |        for(i=1,i<Size;i++){            //HORIZONTAL AXIS//
30 |          delta_coef
31 |          nextcoef = nextcoef + delta_coef
32 |          coef_horizontal[i] = nextcoef
33 |        }
34 |      }
35 |      nextcoef = coef_diagonal[0] = coef_vertical[0]
36 |      for(i=1,i<Size;i++){              //DIAGONAL AXIS//
37 |        delta_coef
38 |        nextcoef = nextcoef + delta_coef
39 |        coef_diagonal[i] = nextcoef
40 |      }
41 |    }else{                              //INTERPOLATION METHOD//
42 |      dc                                ...UPPER-LEFT (DC COMPONENT)
43 |      horizontal_end                    ...LOWER-LEFT
44 |      vertical_end                      ...LOWER-RIGHT
45 |      diagonal_end                      ...LOWER-RIGHT
46 |    }
47 |    residual_flag                       ...RESIDUAL FLAG
48 |    if(residual_flag){
49 |      residual_matrix(i)                //ADD RESIDUAL ERROR//
50 |    }
```

FIG.15

```
01 | residual_matrix(){
02 |   residual_dpcm_flag              ...RESIDUAL DESIGNATION METHOD FLAG
03 |   if(residual_dpcm_flag){                        //DPCM METHOD//
04 |     nextcoef = 0
05 |     for(i=0,i<coefNum;i++){
06 |       delta_coef
07 |       nextcoef = nextcoef + delta_coef
08 |       coef[i] = nextcoef
09 |     }
10 |   }else{                                         //RUN-LENGTH METHOD//
11 |     next_pos = 0
12 |     while(last_pos==0){
13 |       run
14 |       data
15 |       last_pos
16 |       coef[next_pos+run] = data
17 |       next_pos += run+1
18 |     }
19 |   }
20 | }
```

FIG.16

```
01 | QuantizaionMatrixParameterSet(){
02 |   quantization_matrix_paramter_id    ...QMPS ID
03 |   use_default_only_flag
04 |   use_dqp_flag
05 |   if(use_default_only_flag == 0){
06 |     pred_present_flag                ...GENERATION MODE PRESENT FLAG
07 |     Qscale0                          ...1ST QUANTIZATION SCALE
08 |     Qscale1                          ...2ND QUANTIZATION SCALE
09 |     Qscale2                          ...3RD QUANTIZATION SCALE
10 |     Qscale3                          ...4TH QUANTIZATION SCALE
11 |     for(i=0;i<4;i++){                            //LOOP FOR EACH SIZE//
12 |       for(j=0;j<6;j++){                          //LOOP FOR EACH TYPE//
13 |         if(pred_present_flag){
14 |           pred_mode                  ...GENERATION MODE
15 |           if(pred_mode==0){                      //COPY MODE//
16 |             pred_qmps_id             ...SOURCE ID
17 |             pred_size_idc            ...COPY SOURCE SIZE
18 |             pred_matrix_id           ...COPY SOURCE TYPE
19 |             residual_flag            ...RESIDUAL FLAG
20 |             if(residual_flag){
21 |               residual_matrix()                  //SPECIFY RESIDUAL ERROR//
22 |             }
   |         //SEE FIGS. 17, 18//
77 |     }
78 |   }
79 | }
80 |}
```

FIG.17

```
23 |    }else if(pred_mode==1){              //AXIS DESIGNATION MODE//
24 |      dpcm_flag                          ...DESIGNATION METHOD FLAG
25 |      if(dpcm_flag){                     //DIFFERENTIAL METHOD//
26 |        nextcoef = use_dqp_flag ? -6 : 8
27 |        for(i=0,i<Size;i++){             //VERTICAL AXIS//
28 |          delta_coef
29 |          nextcoef = nextcoef + delta_coef
30 |          coef_vertical[i] = nextcoef
31 |        }
32 |        nextcoef = coef_horizontal[0] = coef_vertical[0]
33 |        copy_from_vertical
34 |        if(copy_from_vertical != 0){
35 |          for(i=1,i<Size;i++){           //HORIZONTAL AXIS//
36 |            delta_coef
37 |            nextcoef = nextcoef + delta_coef
38 |            coef_horizontal[i] = nextcoef
39 |          }
40 |        }
41 |        nextcoef = coef_diagonal[0] = coef_vertical[0]
42 |        for(i=1,i<Size;i++){             //DIAGONAL AXIS//
43 |          delta_coef
44 |          nextcoef = nextcoef + delta_coef
45 |          coef_diagonal[i] = nextcoef
46 |        }
47 |      }else{                             //INTERPOLATION METHOD//
48 |        dc                               ...UPPER-LEFT (DC COMPONENT)
49 |        horizontal_end                   ...UPPER-RIGHT
50 |        vertical_end                     ...LOWER-LEFT
51 |        diagonal_end                     ...LOWER-RIGHT
52 |      }
53 |      residual_flag                      ...RESIDUAL FLAG
54 |      if(residual_flag){
55 |        residual_matrix()                //SPECIFY RESIDUAL ERROR//
56 |      }
```

FIG.18

```
57 |      }else if(pred_mode==2){              //FULL SCAN MODE//
58 |          matrix_symmetry_flag
59 |          matrix_sign_flag
60 |          matrix_dpcm_run_flag       ...DESIGNATION METHOD FLAG
61 |          vlc_table_data             ...VLC TABLE (DATA)
62 |          if(matrix_dpcm_run_flag){
63 |             vlc_table_run           ...VLC TABLE (RUN)
64 |          }
65 |          qmatrix()
66 |      }
67 |      }else{
68 |          matrix_symmetry_flag
69 |          matrix_sign_flag
70 |          matrix_dpcm_run_flag       ...DESIGNATION METHOD FLAG
71 |          vlc_table_data             ...VLC TABLE (DATA)
72 |          if(matrix_dpcm_run_flag){
73 |             vlc_table_run           ...VLC TABLE (RUN)
74 |          }
75 |          qmatrix()
76 |      }
```

FIG.19

```
01 | qmatrix(){
02 |   if(!matrix_dpcm_run_flag){                    //DPCM METHOD//
03 |     nextcoef = use_dqp_flag ? -6 : 8
04 |     for(i=0,i<coefNum;i++){
05 |       delta_coef                                <----- ENCODE WITH VLC TABLE (DATA)
06 |       nextcoef = nextcoef + delta_coef
07 |       coef[i] = nextcoef
08 |     }
09 |   }else{                                        //RUN-LENGTH METHOD//
10 |     next_pos = 0
11 |     while(last_pos==0){
12 |       run                                       <----- ENCODE WITH VLC TABLE (RUN)
13 |       data                                      <----- ENCODE WITH VLC TABLE (DATA)
14 |       coef[next_pos+run] = data
15 |       next_pos += run+1
16 |       if(uiSize <= next_pos){
17 |         last_pos = 1;
18 |       }else{
19 |         last_pos = 0;
20 |       }
21 |     }
22 |   }
23 | }
```

FIG.20

```
01 | residual_matrix(){
02 |   residual_symmetry_flag
03 |   residual_dpcm_flag
04 |   residual_run_flag              ...RESIDUAL ERROR DESIGNATION METHOD FLAG
05 |   residual_sign_flag
06 |   if(!residual_run_flag){                          //DPCM METHOD//
07 |     vlc_table_data              ...VLC TABLE (DATA)
08 |     nextcoef = 0
09 |     for(i=0;i<coefNum;i++){
10 |       delta_coef                <----- ENCODE WITH VLC TABLE (DATA)
11 |       nextcoef = nextcoef + delta_coef
12 |       coef[i] = nextcoef
13 |     }
14 |   }else{                                           //RUN-LENGTH METHOD//
15 |     vlc_table_data              ...VLC TABLE (DATA)
16 |     vlc_table_run               ...VLC TABLE (RUN)
17 |     next_pos = 0
18 |     while(last_pos==0){
19 |       run                       <----- ENCODE WITH VLC TABLE (RUN)
20 |       data                      <----- ENCODE WITH VLC TABLE (DATA)
21 |       coef[next_pos+run] = data
22 |       next_pos += run+1
23 |       if(uiSize <= next_pos){
24 |         last_pos = 1;
25 |       }else{
26 |         last_pos = 0;
27 |       }
28 |     }
29 |   }
30 | }
```

EXAMPLE OF QUANTIZATION SCALE SETTING AREAS
IN 8×8 QUANTIZATION MATRIX

AREA A1: Qscale0=1 (NOT QUANTIZED)

AREA A2: Qscale1=2

AREA A3: Qscale2=3

AREA A4: Qscale3=4

$$\begin{bmatrix} 1 & 1 & 1 & 1 & 1 & 1 & 2 & 2 \\ 1 & 1 & 1 & 1 & 1 & 2 & 2 & 3 \\ 1 & 1 & 1 & 1 & 2 & 2 & 3 & 3 \\ 1 & 1 & 1 & 2 & 2 & 3 & 3 & 4 \\ 1 & 1 & 2 & 2 & 3 & 3 & 4 & 4 \\ 1 & 2 & 2 & 3 & 3 & 4 & 4 & 4 \\ 2 & 2 & 3 & 3 & 4 & 4 & 4 & 4 \\ 2 & 3 & 3 & 4 & 4 & 4 & 4 & 4 \end{bmatrix}$$

EXAMPLE QUANTIZATION
SCALE SETTING

FIG.23

| VLC0 | VLC1 | VLC2 | VLC3 | VLC4 |
|---|---|---|---|---|
| 1 | 1x | 1xx | 1xxx | 1xxxx |
| 01 | 01x | 01xx | 01xxx | 01xxxx |
| 001 | 001x | 001xx | 001xxx | 001xxxx |
| 0001 | 0001x | 0001xx | 0001xxx | 0001xxxx |
| 00001 | 00001x | 00001xx | 00001xxx | 00001xxxx |
| 0000001 | 0000001x | 0000001xx | 0000001xxx | 000001xxxx |
| 00000001 | 00000001x | 00000001xx | 00000001xxx | 0000001xxxx |
| 000000001 | 000000001x | 000000001xx | 000000001xxx | 00000001xxxxx |
| 0000000001xx | 0000000001xxx | 0000000001xxxx | 0000000001xxxxx | 0000000001xxxxxx |
| .. | .. | .. | .. | .. |

| VLC5 | VLC6 | VLC7 | VLC8 | VLC9 | VLC10 |
|---|---|---|---|---|---|
| 1x | 1xx | 1xxx | 1 | 100 | 1 |
| 01x | 01xx | 01xxx | 01 | 1010 | 01x |
| 001x | 001xx | 001xxx | 00 | 1011 | 001xx |
|  |  |  |  | 11xxx | 0001xxx |
|  |  |  |  | 01xxxx |  |
|  |  |  |  | 001xxxxx |  |
| .. | .. | .. |  | .. | .. |

FIG.26

```
01 | slice_header() {
02 |     lightweight_slice_flag
03 |     if( !lightweight_slice_flag ) {
04 |         slice_type
05 |         pic_parameter_set_id              <----- REFERENCE PPS ID
06 |     }
07 |     if( sample_adaptive_offset_enabled_flag || adaptive_loop_filter_enabled_flag || qmatrix_enabled_flag)
08 |         aps_id                            <----- REFERENCE APS ID
09 |     frame_num
10 |     if( IdrPicFlag ) idr_pic_id
11 |     if( pic_order_cnt_type == 0 ) pic_order_cnt_lsb
12 |     if( slice_type == P || slice_type == B ) {
13 |         num_ref_idx_active_override_flag
14 |         if( num_ref_idx_active_override_flag ) {
15 |             num_ref_idx_l0_active_minus1
16 |             if( slice_type == B ) num_ref_idx_l1_active_minus1
17 |         }
18 |     }
19 |     ref_pic_list_modification()
20 |     ref_pic_list_combination()
21 |     if( nal_ref_idc != 0 ) dec_ref_pic_marking()
22 |     }
23 |     if( entropy_coding_mode_flag && slice_type != I) cabac_init_idc
24 |     first_slice_in_pic_flag
25 |     if( first_slice_in_pic_flag == 0 ) slice_address
26 |     if( !lightweight_slice_flag ) {
27 |         slice_qp_delta
28 |         if( deblocking_filter_control_present_flag ) {
29 |             disable_deblocking_filter_idc
30 |             if( disable_deblocking_filter_idc != 1 ) {
31 |                 slice_alpha_c0_offset_div2
32 |                 slice_beta_offset_div2
33 |             }
34 |         }
35 |         if( slice_type == B ) collocated_from_l0_flag
36 |         if( adaptive_loop_filter_enabled_flag && aps_adaptive_loop_filter_flag ) {
37 |             byte_align()
38 |             alf_cu_control_param()
39 |             byte_align()
40 |         }
41 |     }
42 | }
```

FIG.27

```
01 | aps_rbsp() {
02 |     aps_id                              <----- APS ID
03 |     aps_sample_adaptive_offset_flag
04 |     aps_adaptive_loop_filter_flag
05 |     aps_qmatrix_flag
06 |     if( aps_sample_adaptive_offset_flag || aps_adaptive_loop_filter_flag || aps_qmatrix_flag) {
07 |         aps_cabac_use_flag
08 |         if( aps_cabac_use_flag ) {
09 |             aps_cabac_init_idc
10 |             aps_cabac_init_qp_minus26
11 |         }
12 |     }
13 |     if( aps_adaptive_loop_filter_flag ) {        ⎫
14 |         alf_data_byte_count                      ⎪
15 |         alf_param()                              ⎬  ALF-RELATED PARAMETERS
16 |         byte_align()                             ⎪
17 |     }                                            ⎭
18 |     if( aps_sample_adaptive_offset_flag ) {      ⎫
19 |         sao_data_byte_count                      ⎪
20 |         byte_align ()                            ⎬  SAO-RELATED PARAMETERS
21 |         sao_param()                              ⎪
22 |         byte_align()                             ⎪
23 |     }                                            ⎭
24 |     if(aps_qmatrix_flag) {                       ⎫
25 |         ref_aps_id_present_flag         <----- PAST REFERENCE ID PRESENT FLAG
26 |         if(ref_aps_id_present_flag) {            ⎪
27 |             ref_aps_id                  <----- PAST REFERENCE ID
28 |         } else {                                 ⎬  QM-RELATED PARAMETERS
29 |             qmatrix_data_byte_count              ⎪
30 |             byte_align()                         ⎪
31 |             qmatrix_param()                      ⎪
32 |         }                                        ⎪
33 |     }                                            ⎭
34 |     rbsp_trailing_bits()
35 | }
```

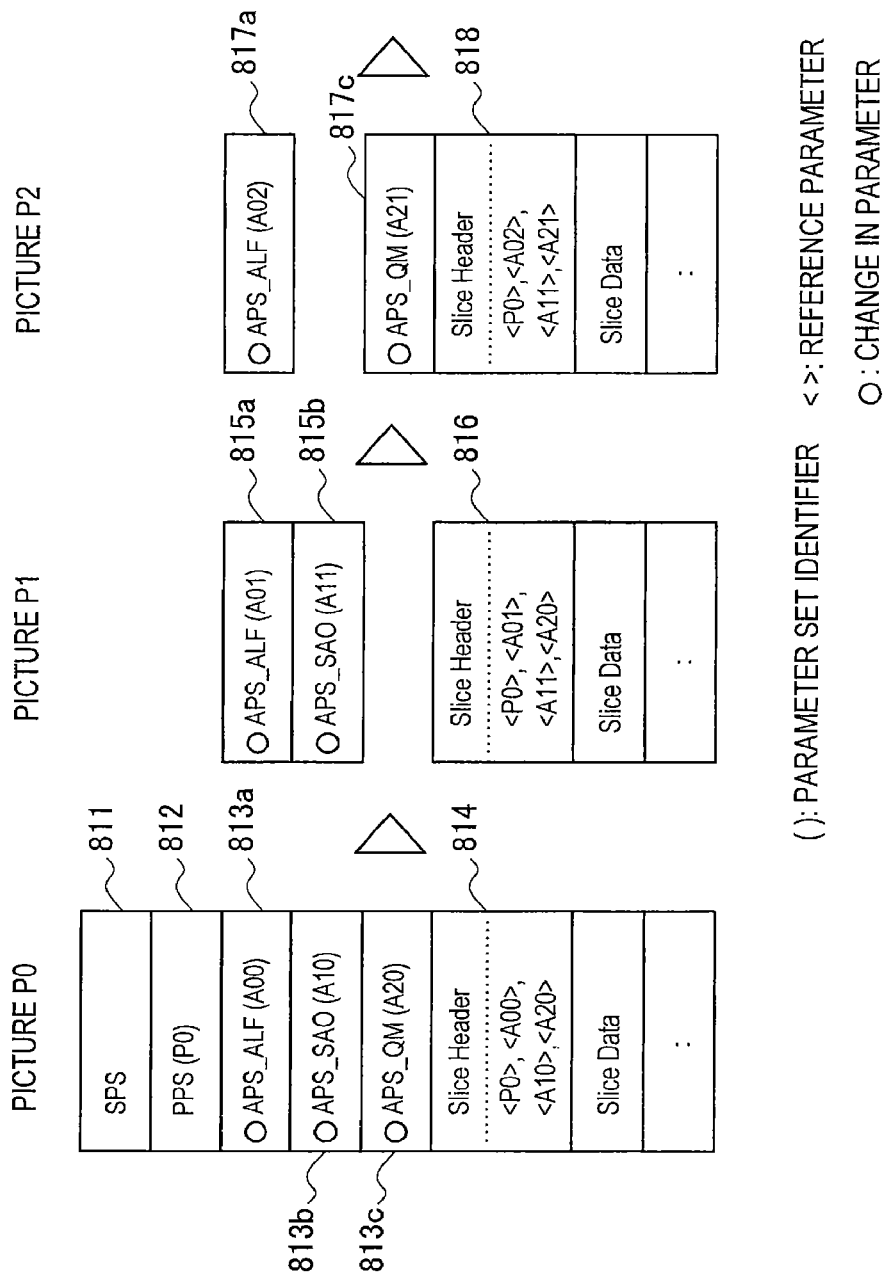

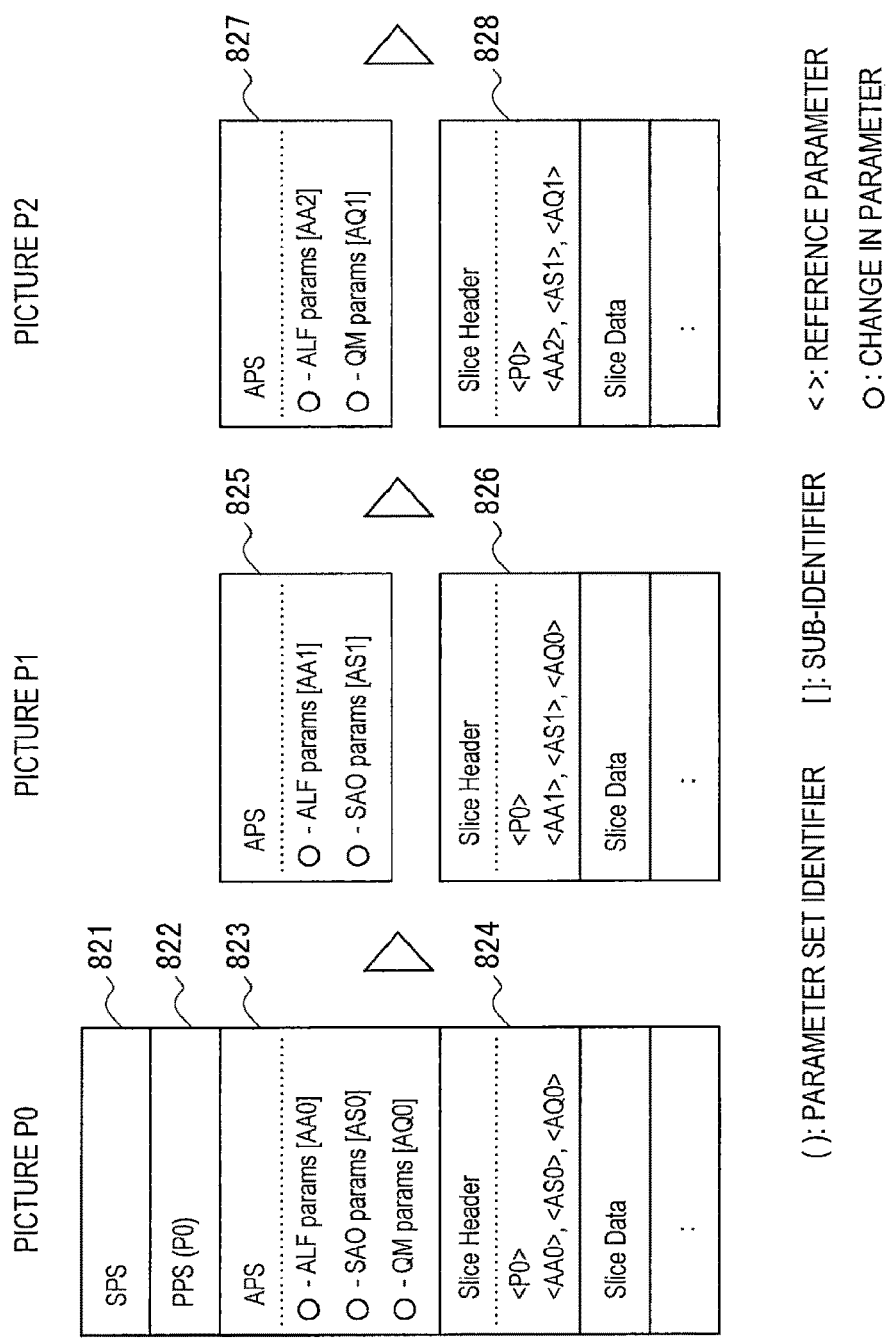

FIG.31

```
01 |   slice_header() {
02 |       lightweight_slice_flag
03 |       if( !lightweight_slice_flag ) {
04 |           slice_type
05 |           pic_parameter_set_id              <---- REFERENCE PPS ID
06 |       }
07 |       if( sample_adaptive_offset_enabled_flag || adaptive_loop_filter_enabled_flag || qmatrix_enabled_flag)
08 |           sub_alf_id                        <--- REFERENCE SUB_ALF ID
09 |           sub_sao_id                        <------------ REFERENCE SUB_SAO ID
10 |           sub_qmatrix_id                    <--- REFERENCE SUB_QM ID
11 |       frame_num
12 |       if( IdrPicFlag ) idr_pic_id
13 |       if( pic_order_cnt_type == 0 ) pic_order_cnt_lsb
14 |       if( slice_type == P || slice_type == B ){
15 |           num_ref_idx_active_override_flag
16 |           if( num_ref_idx_active_override_flag ) {
17 |               num_ref_idx_l0_active_minus1
18 |               if( slice_type == B ) num_ref_idx_l1_active_minus1
19 |           }
20 |       }
21 |       ref_pic_list_modification()
22 |       ref_pic_list_combination()
23 |       if( nal_ref_idc != 0 ) dec_ref_pic_marking()
24 |       }
25 |       if( entropy_coding_mode_flag && slice_type != I) cabac_init_idc
26 |       first_slice_in_pic_flag
27 |       if( first_slice_in_pic_flag == 0 ) slice_address
28 |       if( !lightweight_slice_flag ) {
29 |           slice_qp_delta
30 |           if( deblocking_filter_control_present_flag ) {
31 |               disable_deblocking_filter_idc
32 |               if( disable_deblocking_filter_idc != 1 ) {
33 |                   slice_alpha_c0_offset_div2
34 |                   slice_beta_offset_div2
35 |               }
36 |           }
37 |           if( slice_type == B ) collocated_from_l0_flag
38 |           if( adaptive_loop_filter_enabled_flag && aps_adaptive_loop_filter_flag ) {
39 |               byte_align()
40 |               alf_cu_control_param()
41 |               byte_align()
42 |           }
43 |       }
44 |   }
```

FIG.32

| ENCODING TOOL | PARAMETER CONTENTS | UPDATE FREQUENCY | DATA SIZE | NOTES |
|---|---|---|---|---|
| ADAPTIVE LOOP FILTER (ALF) | - FILTER COEFFICIENTS<br>- ON/OFF FLAG FOR EACH CU | EVERY PICTURE | VERY LARGE | - MAY BE OMITTED FOR B PICTURES WITH LOW RATE, ETC.<br>- LOW LIKELIHOOD OF BEING ABLE TO REUSE PREVIOUSLY SET PARAMETER VALUES |
| SAMPLE ADAPTIVE OFFSET (SAO) | - OFFSET PATTERN<br>- OFFSET VALUES | EVERY PICTURE | SOMEWHAT LARGE | - POSSIBILITY OF BEING ABLE TO REUSE PREVIOUSLY SET PARAMETER VALUES |
| QUANTIZATION MATRIX (QM) | - QUANTIZATION MATRIX FOR EACH PICTURE | EVERY PICTURE / EVERY PICTURE TYPE / EVERY GOP | LARGE | - REUSE POSSIBLE FOR EACH PICTURE TYPE (I/P/B) |
| ADAPTIVE INTERPOLATION FILTER (AIF) | - FILTER COEFFICIENTS FOR EACH SUB-PIXEL POSITION | EVERY PICTURE | SMALL | - REUSE POSSIBLE FOR EACH PICTURE TYPE (I/P/B) |

IMAGE PROCESSING DEVICE AND IMAGE PROCESSING METHOD

CROSS REFERENCE TO RELATED APPLICATION

The present application is a continuation of U.S. application Ser. No. 14/536,851, filed on Nov. 10, 2014 (pending), which is a continuation of U.S. application Ser. No. 13/990,489, filed on May 30, 2013 (granted as U.S. Pat. No. 9,706,205 on Jul. 11, 2017), which is the National Stage of International Application No. PCT/JP2012/050931, filed on Jan. 18, 2012, and which claimed priority to Japanese Application Nos. 2011-027896, filed on Feb. 10, 2011, 2011-047655, filed on Mar. 4, 2011, and 2011-187179, filed on Aug. 30, 2011. Each of the above-listed documents is hereby incorporated by reference in their entirety.

TECHNICAL FIELD

The present disclosure relates to an image processing device and an image processing method.

BACKGROUND ART

In H.264/AVC, one of the standard specifications for image encoding schemes, it is possible to use different quantization steps for each component of the orthogonal transform coefficients when quantizing image data in the High Profile or higher profile. A quantization step (or quantization scale) for each component of the orthogonal transform coefficients may be set on the basis of a quantization matrix (also called a scaling list) defined at the same size as the units of orthogonal transform, and a standard step value.

FIG. 38 illustrates four classes of default quantization matrices which are predefined in H.264/AVC. The matrix SL1 is the default 4×4 quantization matrix for intra prediction mode. The matrix SL2 is the default 4×4 quantization matrix for inter prediction mode. The matrix SL3 is the default 8×8 quantization matrix for intra prediction mode. The matrix SL4 is the default 8×8 quantization matrix for inter prediction mode. The user may also define one's own quantization matrix that differs from the default matrices illustrated in FIG. 38 in the sequence parameter set or the picture parameter set. Note that in the case where no quantization matrix is specified, a flat quantization matrix having an equal quantization step for all components may be used.

In High Efficiency Video Coding (HEVC), whose standardization is being advanced as a next-generation image encoding scheme to succeed H.264/AVC, there is introduced the concept of a coding unit (CU), which corresponds to a macroblock of the past (see Non-Patent Literature 1 below). The range of coding unit sizes is specified in the sequence parameter set as a pair of power-of-2 values called the largest coding unit (LCU) and the smallest coding unit (SCU). Additionally, SPLIT_FLAGS are used to designate a specific coding unit size within the range specified by the LCU and the SCU.

In HEVC, one coding unit may be split into one or more units of orthogonal transform, or in other words, one or more transform units (TUs). Any of 4×4, 8×8, 16×16, and 32×32 is usable as the transform unit size. Consequently, a quantization matrix may also be specified for each of these candidate transform unit sizes. Non-Patent Literature 2 below proposes specifying multiple quantization matrix candidates for one transform unit size in one picture, and adaptively selecting a quantization matrix for each block from the perspective of rate-distortion (RD) optimization.

CITATION LIST

Non-Patent Literature

Non-Patent Literature 1: JCTVC-B205, "Test Model under Consideration", Joint Collaborative Team on Video Coding (JCT-VC) of ITU-T SG16 WP3 and ISO/IEC JTC1/SC29/WG11 2nd Meeting: Geneva, CH, 21-28 Jul. 2010

Non-Patent Literature 2: VCEG-AD06, "Adaptive Quantization Matrix Selection on KTA Software", ITU—Telecommunications Standardization Sector STUDY GROUP 16 Question 6 Video Coding Experts Group (VCEG) 30th Meeting: Hangzhou, China, 23-24 Oct. 2006

SUMMARY OF INVENTION

Technical Problem

However, the quantization matrix adapted to quantization and inverse quantization differs according to the characteristics of each image included in a video. For this reason, the frequency of quantization matrix updates will rise if one attempts to encode video whose image characteristics change from moment to moment with optimal quantization matrices. In H.264/AVC, the quantization matrix is defined in the sequence parameter set (SPS) or the picture parameter set (PPS). Consequently, if the frequency of quantization matrix updates rises, the proportion of the encoded stream occupied by the SPS or the PPS will increase. This means that the encoding efficiency will decrease because of increased overhead. For HEVC, in which the quantization matrix size is further increased and in which several different quantization matrices may be defined for each picture, there is a risk that such decreases in the encoding efficiency accompanying the update of the quantization matrix may become even more significant.

Consequently, it is desirable to provide a mechanism enabling moderation of the decrease in encoding efficiency accompanying the update of the quantization matrix.

Solution to Problem

According to an embodiment of the present disclosure, there is provided an image processing device including an acquiring section configured to acquire quantization matrix parameters from an encoded stream in which the quantization matrix parameters defining a quantization matrix are set within a parameter set which is different from a sequence parameter set and a picture parameter set, a setting section configured to set, based on the quantization matrix parameters acquired by the acquiring section, a quantization matrix which is used when inversely quantizing data decoded from the encoded stream, and an inverse quantization section configured to inversely quantize the data decoded from the encoded stream using the quantization matrix set by the setting section.

The image processing device may be typically realized as an image decoding device that decodes an image.

According to an embodiment of the present disclosure, there is provided an image processing method including acquiring quantization matrix parameters from an encoded stream in which the quantization matrix parameters defining a quantization matrix are set within a parameter set which is different from a sequence parameter set and a picture parameter set, setting, based on the acquired quantization matrix parameters, a quantization matrix which is used when inversely quantizing data decoded from the encoded stream, and inversely quantizing the data decoded from the encoded stream using the set quantization matrix.

According to an embodiment of the present disclosure, there is provided an image processing device including a quantization section configured to quantize data using a quantization matrix, a setting section configured to set quantization matrix parameters that define a quantization matrix to be used when the quantization section quantizes the data, and an encoding section configured to encode the quantization matrix parameters set by the setting section within a parameter set which is different from a sequence parameter set and a picture parameter set.

The image processing device may be typically realized as an image encoding device that encodes an image.

According to an embodiment of the present disclosure, there is provided an image processing method including quantizing data using a quantization matrix, setting quantization matrix parameters that define the quantization matrix to be used when quantizing the data, and encoding the set quantization matrix parameters within a parameter set which is different from a sequence parameter set and a picture parameter set.

Advantageous Effects of Invention

According to an image processing device and an image processing method in accordance with the present disclosure, it is possible to moderate the decrease in encoding efficiency accompanying the update of the quantization matrix.

BRIEF DESCRIPTION OF DRAWINGS

FIG. 3 is an explanatory diagram illustrating exemplary parameters included in a quantization matrix parameter set in an embodiment.

FIG. 4 is an explanatory diagram illustrating exemplary parameters included in a slice header in an embodiment.

FIG. 13 is a first explanatory diagram illustrating a first example of illustrative pseudo-code expressing the syntax of a quantization matrix parameter set.

FIG. 14 is a second explanatory diagram illustrating a first example of illustrative pseudo-code expressing the syntax of a quantization matrix parameter set.

FIG. 15 is a third explanatory diagram illustrating a first example of illustrative pseudo-code expressing the syntax of a quantization matrix parameter set.

FIG. 16 is a first explanatory diagram illustrating a second example of illustrative pseudo-code expressing the syntax of a quantization matrix parameter set.

FIG. 17 is a second explanatory diagram illustrating a second example of illustrative pseudo-code expressing the syntax of a quantization matrix parameter set.

FIG. 18 is a third explanatory diagram illustrating a second example of illustrative pseudo-code expressing the syntax of a quantization matrix parameter set.

FIG. 19 is a fourth explanatory diagram illustrating a second example of illustrative pseudo-code expressing the syntax of a quantization matrix parameter set.

FIG. 20 is a fifth explanatory diagram illustrating a second example of illustrative pseudo-code expressing the syntax of a quantization matrix parameter set.

FIG. 23 is an explanatory diagram for explaining 11 classes of VLC tables prepared in LCEC.

FIG. 26 is an explanatory diagram illustrating an example of slice header syntax defined in accordance with a first technique that uses an APS.

FIG. 27 is an explanatory diagram illustrating an example of APS syntax defined in accordance with an exemplary modification of a first technique that uses an APS.

FIG. 28 is an explanatory diagram illustrating an example of an encoded stream structured in accordance with a second technique that uses an APS.

FIG. 29 is an explanatory diagram illustrating an example of an encoded stream structured in accordance with a third technique that uses an APS.

FIG. 31 is an explanatory diagram illustrating an example of slice header syntax defined in accordance with a third technique that uses an APS.

FIG. 32 is a table listing parameter features for each of several typical encoding tools.

DESCRIPTION OF EMBODIMENTS

Figure 1:
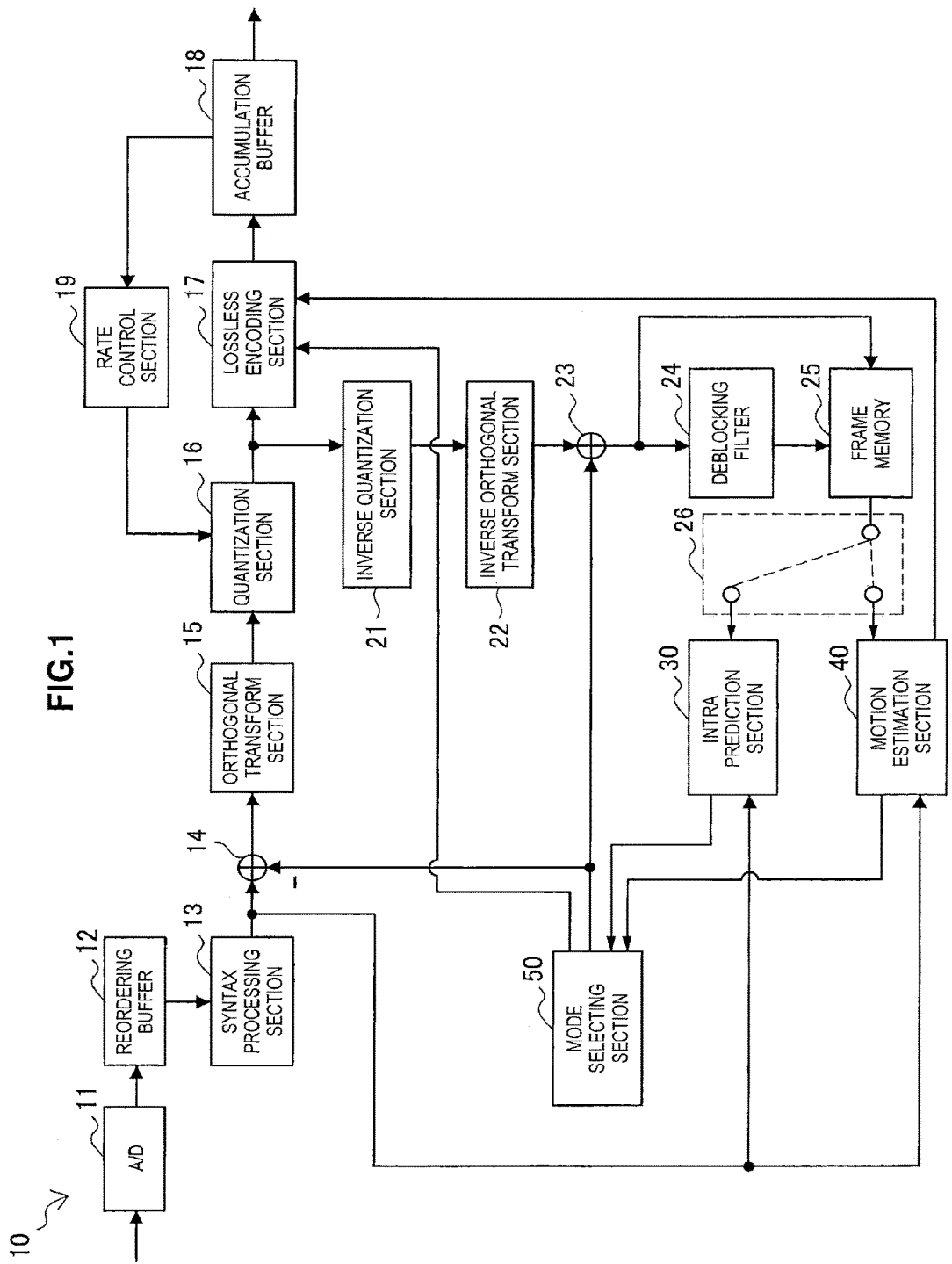
FIG. 1 is a block diagram illustrating an exemplary configuration of an image encoding device according to an embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will proceed in the following order.
1. Exemplary configuration of image encoding device according to embodiment
  1-1. Exemplary overall configuration
  1-2. Exemplary configuration of syntax processing section
  1-3. Exemplary parameter structure
2. Process flow during encoding according to embodiment
3. Exemplary configuration of image decoding device according to embodiment
  3-1. Exemplary overall configuration
  3-2. Exemplary configuration of syntax processing section
4. Process flow during decoding according to embodiment
  4-1. Generating quantization matrices
  4-2. Setting quantization matrix to slice
5. Syntax examples
  5-1. First example
  5-2. Second example
6. Various exemplary configurations of parameter sets
  6-1. First technique
  6-2. Exemplary modification of first technique
  6-3. Second technique
  6-4. Third technique
  6-5. Exemplary modification of third technique
7. Applications
8. Conclusion

1. Exemplary Configuration of Image Encoding Device According to Embodiment

This section describes an exemplary configuration of an image encoding device according to an embodiment.

1-1. Exemplary Overall Configuration

FIG. 1 is a block diagram illustrating an exemplary configuration of an image encoding device 10 according to an embodiment. Referring to FIG. 1, the image encoding device 10 is equipped with an analog-to-digital (A/D) conversion section 11, a reordering buffer 12, a syntax processing section 13, a subtraction section 14, an orthogonal transform section 15, a quantization section 16, a lossless encoding section 17, an accumulation buffer 18, a rate control section 19, an inverse quantization section 21, an inverse orthogonal transform section 22, an addition section 23, a deblocking filter 24, frame memory 25, a selector 26, an intra prediction section 30, a motion estimation section 40, and a mode selecting section 50.

The A/D conversion section 11 converts an image signal input in an analog format into image data in a digital format, and outputs a sequence of digital image data to the reordering buffer 12.

The reordering buffer 12 reorders the images included in the sequence of image data input from the A/D conversion section 11. After reordering the images according to a group of pictures (GOP) structure in accordance with the encoding process, the reordering buffer 12 outputs the reordered image data to the syntax processing section 13.

The image data output from the reordering buffer 12 to the syntax processing section 13 is mapped to a bitstream in units called Network Abstraction Layer (NAL) units. The stream of image data includes one or more sequences. The leading picture in a sequence is called the instantaneous decoding refresh (IDR) picture. Each sequence includes one or more pictures, and each picture further includes one or more slices. In H.264/AVC and HEVC, these slices are the basic units of video encoding and decoding. The data for each slice is recognized as a Video Coding Layer (VCL) NAL unit.

The syntax processing section 13 sequentially recognizes the NAL units in the stream of image data input from the reordering buffer 12, and inserts non-VCL NAL units storing header information into the stream. The non-VCL NAL units that the syntax processing section 13 inserts into the stream include sequence parameter sets (SPSs) and picture parameter sets (PPSs). Furthermore, in the present embodiment, the syntax processing section 13 inserts into the stream a quantization matrix parameter set (QMPS), a non-VCL NAL unit different from the SPS and the PPS. The syntax processing section 13 also adds a slice header (SH) at the beginning of the slices. The syntax processing section 13 then outputs the stream of image data including VCL NAL units and non-VCL NAL units to the subtraction section 14, the intra prediction section 30, and the motion estimation section 40. A detailed configuration of the syntax processing section 13 will be further described later.

The subtraction section 14 is supplied with the image data input from the syntax processing section 13, and predicted image data selected by the mode selecting section 50 described later. The subtraction section 14 calculates prediction error data, which is the difference between the image data input from the syntax processing section 13 and the predicted image data input from the mode selecting section 50, and outputs the calculated prediction error data to the orthogonal transform section 15.

The orthogonal transform section 15 performs an orthogonal transform on the prediction error data input from the subtraction section 13. The orthogonal transform executed by the orthogonal transform section 15 may be discrete cosine transform (DCT) or the Karhunen-Loeve transform, for example. The orthogonal transform section 15 outputs transform coefficient data acquired by the orthogonal transform process to the quantization section 16.

The quantization section 16 uses a quantization matrix to quantize the transform coefficient data input from the orthogonal transform section 15, and outputs the quantized transform coefficient data (hereinafter referred to as quantized data) to the lossless encoding section 17 and the inverse quantization section 21. The bit rate of the quantized data is controlled on the basis of a rate control signal from the rate control section 19. The quantization matrix used by the quantization section 16 is defined in the quantization matrix parameter set, and may be specified in the slice header for each slice. In the case where a quantization matrix is not specified, a flat quantization matrix having an equal quantization step for all components is used.

The lossless encoding section 17 generates an encoded stream by performing a lossless encoding process on the quantized data input from the quantization section 16. The lossless encoding by the lossless encoding section 17 may be variable-length coding or arithmetic coding, for example. Furthermore, the lossless encoding section 17 multiplexes information about intra prediction or information about inter prediction input from the mode selecting section 50 into the header of the encoded stream. The lossless encoding section 17 then outputs the encoded stream thus generated to the accumulation buffer 18.

The accumulation buffer 18 uses a storage medium such as semiconductor memory to temporarily buffer the encoded stream input from the lossless encoding section 17. The accumulation buffer 18 then outputs the encoded stream thus buffered to a transmission section not illustrated (such as a communication interface or a connection interface with peripheral equipment, for example), at a rate according to the bandwidth of the transmission channel.

The rate control section 19 monitors the free space in the accumulation buffer 18. Then, the rate control section 19 generates a rate control signal according to the free space in the accumulation buffer 18, and outputs the generated rate control signal to the quantization section 16. For example, when there is not much free space in the accumulation buffer 18, the rate control section 19 generates a rate control signal for lowering the bit rate of the quantized data. Also, when there is sufficient free space in the accumulation buffer 18, for example, the rate control section 19 generates a rate control signal for raising the bit rate of the quantized data.

The inverse quantization section 21 uses a quantization matrix to perform an inverse quantization process on the quantized data input from the quantization section 16. The inverse quantization section 21 then outputs transform coefficient data acquired by the inverse quantization process to the inverse orthogonal transform section 22.

The inverse orthogonal transform section 22 performs an inverse orthogonal transform process on the transform coefficient data input from the dequantization section 21 to thereby restore the prediction error data. Then, the inverse orthogonal transform section 22 outputs the restored prediction error data to the addition section 23.

The addition section 23 adds the restored prediction error data input from the inverse orthogonal transform section 22 and the predicted image data input from the mode selecting section 50 to thereby generate decoded image data. Then, the addition section 23 outputs the decoded image data thus generated to the deblocking filter 24 and the frame memory 25.

The deblocking filter 24 applies filtering to reduce blocking artifacts produced at the time of image encoding. The deblocking filter 24 removes blocking artifacts by filtering the decoded image data input from the addition section 23, and outputs the decoded image data thus filtered to the frame memory 25.

The frame memory 25 uses a storage medium to store the decoded image data input from the addition section 23 and the decoded image data after filtering input from the deblocking filter 24.

The selector 26 reads, from the frame memory 25, unfiltered decoded image data to be used for intra prediction, and supplies the decoded image data thus read to the intra prediction section 30 as reference image data. Also, the selector 26 reads, from the frame memory 25, the filtered decoded image data to be used for inter prediction, and supplies the decoded image data thus read to the motion estimation section 40 as reference image data.

The intra prediction section 30 performs an intra prediction process in each intra prediction mode, on the basis of the image data to be encoded that is input from the syntax processing section 13, and the decoded image data supplied via the selector 26. For example, the intra prediction section 30 evaluates the prediction result of each intra prediction mode using a predetermined cost function. Then, the intra prediction section 30 selects the intra prediction mode yielding the smallest cost function value, that is, the intra prediction mode yielding the highest compression ratio, as the optimal intra prediction mode. Furthermore, the intra prediction section 30 outputs information about intra prediction, such as prediction mode information indicating the optimal intra prediction mode, the predicted image data and the cost function value, to the mode selecting section 50.

The motion estimation section 40 performs an inter prediction process (prediction process between frames) on the basis of image data to be encoded that is input from the syntax processing section 13, and decoded image data supplied via the selector 26. For example, the motion estimation section 40 evaluates the prediction result of each prediction mode using a predetermined cost function. Then, the motion estimation section 40 selects the prediction mode yielding the smallest cost function value, that is, the prediction mode yielding the highest compression ratio, as the optimal prediction mode. The motion estimation section 40 generates predicted image data according to the optimal prediction mode. The motion estimation section 40 outputs information about inter prediction, such as prediction mode information indicating the optimal intra prediction mode thus selected, the predicted image data and the cost function value, to the mode selecting section 50.

The mode selecting section 50 compares the cost function value related to intra prediction input from the intra prediction section 30 to the cost function value related to inter prediction input from the motion estimation section 40. Then, the mode selecting section 50 selects the prediction method with the smaller cost function value between intra prediction and inter prediction. In the case of selecting intra prediction, the mode selecting section 50 outputs the information about intra prediction to the lossless encoding section 17, and also outputs the predicted image data to the subtraction section 14 and the addition section 23. Also, in the case of selecting inter prediction, the mode selecting section 50 outputs the information about inter prediction described above to the lossless encoding section 17, and also outputs the predicted image data to the subtraction section 14 and the addition section 23.

1-2. Exemplary Configuration of Syntax Processing Section

Figure 2:
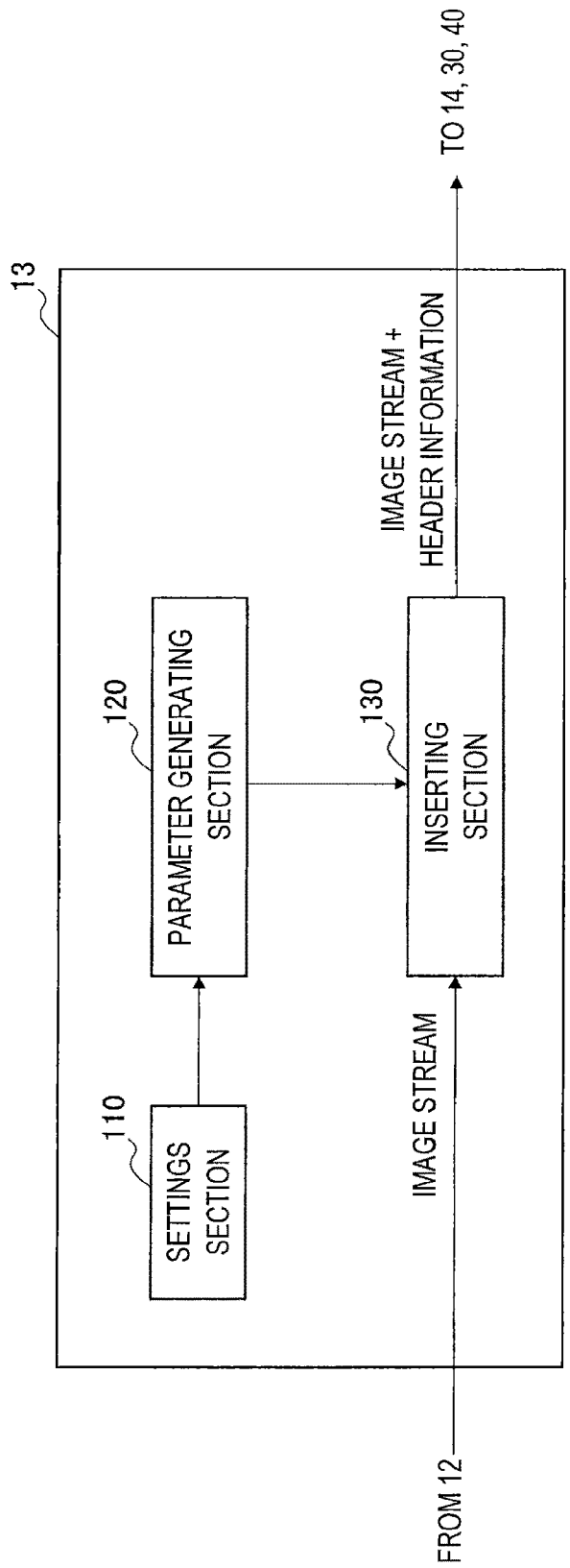
FIG. 2 is a block diagram illustrating an example of a detailed configuration of the syntax processing section illustrated in FIG. 1.

FIG. 2 is a block diagram illustrating an example of a detailed configuration of the syntax processing section 13 of the image encoding device 10 illustrated in FIG. 1. Referring to FIG. 2, the syntax processing section 13 includes a settings section 110, a parameter generating section 120, and an inserting section 130.

(1) Settings Section

The settings section 110 retains various settings used for the encoding process by the image encoding device 10. For example, the settings section 110 retains a profile for each sequence in the image data, the encoding mode for each picture, data regarding the GOP structure, and the like. Also, in the present embodiment, the settings section 110 retains settings regarding quantization matrices used by the quantization section 16 (and the inverse quantization section 21). The question of which quantization matrix should be used by the quantization section 16 may be predetermined for each slice, typically on the basis of offline image analysis.

For example, in exemplary applications such as digital video cameras, compression artifacts do not exist in the input images, and thus a quantization matrix with a reduced quantization step may be used, even in the high range. The quantization matrix varies in picture units or frame units. In the case of input images with low complexity, using a flat quantization matrix with a smaller quantization step enables improvement in the image quality subjectively perceived by the user. On the other hand, in the case of input images with high complexity, it is desirable to use a larger quantization step in order to inhibit increases in the rate. In this case, using a flat quantization matrix has the risk of artifacts in the low range signal being recognized as block noise. For this reason, it is beneficial to reduce noise by using a quantization matrix in which the quantization step increases proceeding from the low range to the high range.

In exemplary applications such as recorders that recompress broadcast content encoded in MPEG-2, MPEG-2 compression artifacts such as mosquito noise exist in the input images themselves. Mosquito noise is noise produced as a result of quantizing a high range signal with a larger quantization step, and the frequency components of the noise become extremely high frequencies themselves. When recompressing such input images, it is desirable to use a quantization matrix having a large quantization step in the high range. Also, in interlaced signals, the correlation of signal in the horizontal direction is higher than the correlation of the signal in the vertical direction compared to progressive signals, due to the effects of the interlaced scans. For this reason, it is also beneficial to use different quantization matrices according to whether the image signal is a progressive signal or an interlaced signal. In either case, the optimal quantization matrix may vary in picture units or frame units, depending on the image content.

(2) Parameter Generating Section

The parameter generating section 120 generates parameters defining settings for the encoding process which are retained by the settings section 110, and outputs the generated parameters to the inserting section 130.

For example, in the present embodiment, the parameter generating section 120 generates quantization matrix parameters defining quantization matrices to be used by the quantization section 16. The group of quantization matrix parameters generated by the parameter generating section 120 are included in the quantization matrix parameter set (QMPS). Each QMPS is assigned a QMPS ID, which is an identifier for discriminating the individual QMPSs from each other. Typically, multiple classes of quantization matrices are defined inside one QMPS. The classes of quantization matrices are distinguished from each other by the matrix size along with the corresponding prediction method, and the signal components. For example, a maximum of six classes of quantization matrices (the Y/Cb/Cr components in intra prediction/inter prediction) may be defined for each of the sizes 4×4, 8×8, 16×16, and 32×32 inside one QMPS.

More specifically, the parameter generating section 120 may convert each quantization matrix into a linear array using a zigzag scan, and encode the value of each element in the linear array in differential pulse-code modulation (DPCM) format, similarly to the quantization matrix encoding process in H.264/AVC. In this case, the linear arrays of DPCM differential data become the quantization matrix parameters. In this specification, such a mode for generating quantization matrix parameters is designated the full scan mode.

In addition, the parameter generating section 120 may also generate quantization matrix parameters in a mode that differs from the full scan mode, in order to reduce the amount of codes of the quantization matrix parameters. For example, instead of the full scan mode, the parameter generating section 120 may also generate quantization matrix parameters in a copy mode or an axis designation mode, described next.

Copy mode is a mode that may be selected in the case where the quantization matrix used for a given slice resembles or equals an already-defined quantization matrix. In the case of copy mode, the parameter generating section 120 includes the QMPS ID of the QMPS in which the copy source quantization matrix is defined, as well as the size and type of the copy source quantization matrix, into the QMPS as quantization matrix parameters. Note that in this specification, the combination of the prediction method and signal components corresponding to a given quantization matrix is designated the type of that quantization matrix. In the case where differences exist between the quantization matrix to be defined and the copy source quantization matrix, the parameter generating section 120 may additionally include residual data for generating a residual matrix expressing the residual error of each component in the QMPS.

Processing for axis designation mode is further divided according to two specifying methods: a differential method and an interpolation method. With the differential method, the parameter generating section 120 specifies only the values of the elements in the quantization matrix corresponding to the vertical axis which is the leftmost column, the horizontal axis which is the uppermost row, and diagonal axis along the diagonal of the transform unit. With the interpolation method, the parameter generating section 120 specifies only the values of the elements in the quantization matrix corresponding to the four corners at the upper-left (the DC component), the upper-right, the lower-left, and the lower-right of the transform unit. The values of the remaining elements may be interpolated with an arbitrary technique such as linear interpolation, cubic interpolation, or Lagrange interpolation. Likewise in axis designation mode, in the case where differences exist between the quantization matrix to be defined and the interpolated quantization matrix, the parameter generating section 120 may additionally include residual data for generating a residual matrix expressing the residual error of each component in the QMPS.

(3) Inserting Section

The inserting section 130 inserts header information, such as SPSs, PPSs, QMPSs, and slice headers that respectively include the parameter groups generated by the parameter generating section 120, into the stream of image data input from the reordering buffer 12. As discussed earlier, the QMPS is a non-VCL NAL unit that differs from the SPS and the PPS. The QMPS includes quantization matrix parameters generated by the parameter generating section 120. The inserting section 130 then outputs the stream of image data with inserted header information to the subtraction section 14, the intra prediction section 30, and the motion estimation section 40.

1-3. Exemplary Parameter Structure (1) Quantization Matrix Parameter Set

FIG. 3 is an explanatory diagram illustrating exemplary parameters included in each QMPS in the present embodiment. Referring to FIG. 3, each QMPS includes a "QMPS ID", a "generation mode present flag", a "generation mode", and different quantization matrix parameters for each mode.

The "QMPS ID" is an identifier for discriminating the individual QMPSs from each other. The QMPS ID may be an integer in the range from 0 to 31, or the like. The specification of an unused QMPS ID means that a new QMPS is to be defined. The re-specification of a QMPS ID already being used in a sequence means that an already-defined QMPS is to be updated.

The "generation mode present flag" is a flag indicating whether or not a "generation mode", which is a classification representing a mode of the quantization matrix generation process, is present inside that QMPS. In the case where the generation mode present flag indicates "0: not present", quantization matrices are defined in full scan mode inside that QMPS. Meanwhile, in the case where the generation mode present flag indicates "1: present", a "generation mode" is present inside that QMPS.

The "generation mode" is a classification that may take any of the values "0: copy", "1: axis designation", or "2: full scan", for example. In the syntax pseudo-code described later, the generation mode is represented by a variable called "pred_mode".

In the case of copy mode (that is, pred_mode=0), the QMPS may include a "source ID", a "copy source size", a "copy source type", a "residual flag", and "residual data" as quantization matrix parameters. The "source ID" is a QMPS ID specifying a QMPS in which a copy source quantization matrix is defined. The "copy source size" is the size of the copy source quantization matrix. The "copy source type" is the type of the copy source quantization matrix (intra-Y, intra-Cb, intra-Cr). The "residual flag" is a flag indicating whether or not residual error is present. The "residual data" is data for generating a residual matrix expressing the residual error in the case where residual error is present. The residual data may be omitted in the case where the residual flag indicates "0: not present".

Figure 38:
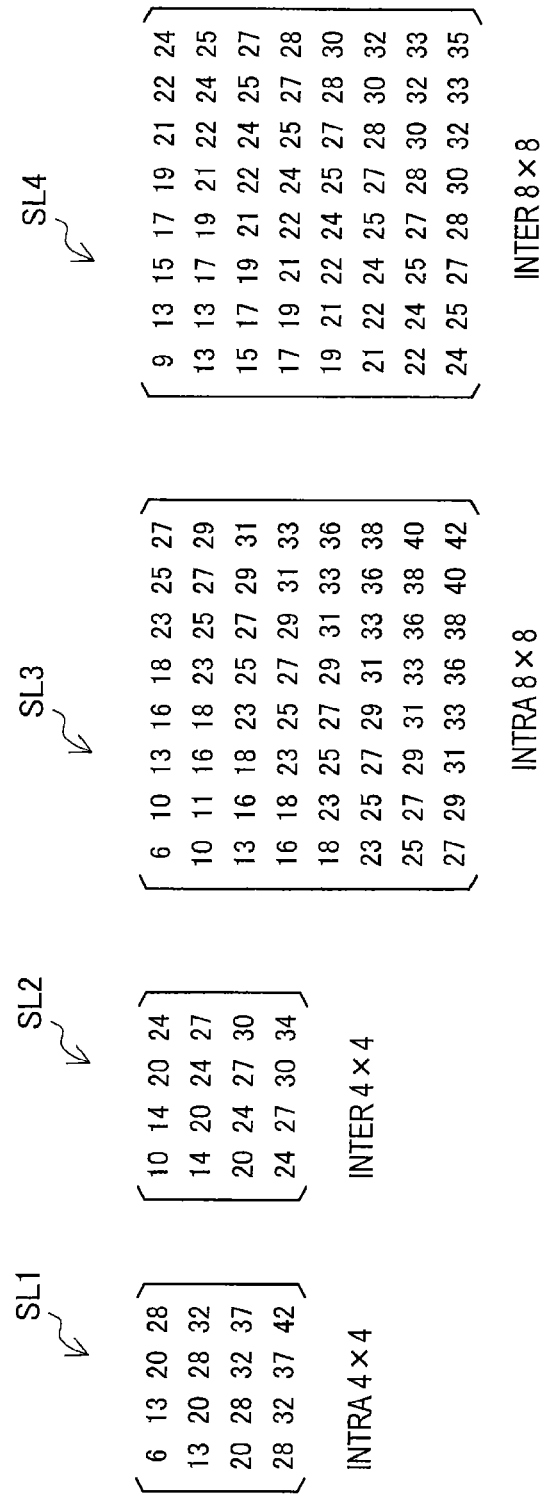
FIG. 38 is an explanatory diagram illustrating default quantization matrices which are predefined in H.264/AVC.

Note the case where the source ID of a given QMPS is equal to QMPS ID of that QMPS itself may be interpreted as specifying a default quantization matrix like that illustrated by example in FIG. 38. Doing so may reduce the amount of codes of the QMPS, since an independent flag for specifying the default quantization matrix no longer needs to be included in the QMPS.

In the case of axis designation mode (that is, pred_mode=1), the QMPS may include a "designation method flag", in addition to either "reference axis data" or "corner data", a "residual flag", and "residual data" as quantization matrix parameters. The designation method flag is a flag that indicates how to designate the values of elements along reference axes that serve as a reference for the generation of a quantization matrix, and may take a value of either "0: differential" or "1: interpolation", for example. In the case where the designation method is "0: differential", the values of elements corresponding to the reference axes of the quantization matrix, these being the vertical axis, the horizontal axis, and the diagonal axis, are designated by the reference axis data. In the case where the designation method is "1: interpolation", the values of elements corresponding to the four corners at the upper-left, the upper-right, the lower-left, and the lower-right of the quantization matrix are designated by the corner data. The values of elements on the three reference axes may be generated by interpolation from the values of these four corners. The residual flag and the residual data are similar to the case of copy mode.

In the case of full scan mode (that is, pred_mode=2), the QMPS may include linear arrays of DPCM differential data as quantization matrix parameters.

Note that each QMPS may include generation modes that differ for each class of quantization matrix and quantization matrix parameters corresponding to each mode. In other words, as an example, a given class of quantization matrix may be defined in full scan mode, another class of quantization matrix may be defined in axis designation mode, and the remaining quantization matrices may be defined in copy mode inside a single QMPS.

(2) Slice Header

FIG. 4 is an explanatory diagram partially illustrating exemplary parameters included in each slice header in the present embodiment. Referring to FIG. 4, each slice header may include a "slice type", a "PPS ID", a "QMPS ID present flag", and a "QMPS ID". The "slice type" is a classification indicating the encoding type for that slice, and takes a value corresponding to a P slice, B slice, or I slice, or the like. The "PPS ID" is an ID for the picture parameter set (PPS) referenced for that slice. The "QMPS ID present flag" is a flag indicating whether or not a QMPS ID is present in that slice header. The "QMPS ID" is a QMPS ID for the quantization matrix parameter set (QMPS) referenced for that slice.

2. Process Flow During Encoding According to Embodiment (1) Parameter Set Insertion Process FIG. 5 is a flowchart illustrating an exemplary flow of a parameter set insertion process by the inserting section 130 of the syntax processing section 13 according to the present embodiment.

Figure 5:
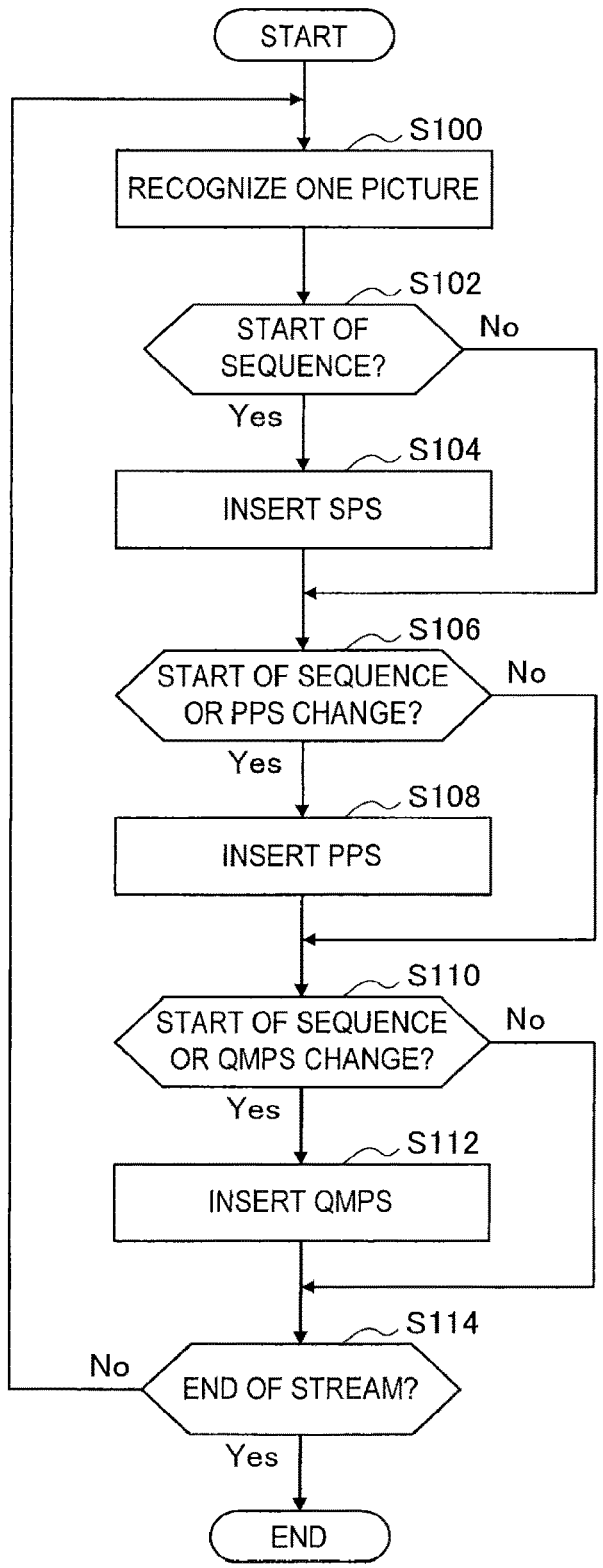
FIG. 5 is a flowchart illustrating an exemplary flow of a parameter set insertion process according to an embodiment.

Referring to FIG. 5, the inserting section 130 first successively acquires NAL units inside the stream of image data input from the reordering buffer 12, and recognizes a single picture (step S100). Next, the inserting section 130 determines whether or not the recognized picture is the leading picture of a sequence (step S102). At this point, the inserting section 130 inserts an SPS into the stream in the case where the recognized picture is the leading picture of a sequence (step S104). Next, the inserting section 130 additionally determines whether or not there is a change in the PPS for the recognized picture (step S106). At this point, the inserting section 130 inserts a PPS into the stream in the case where there is a change in the PPS, or in the case where the recognized picture is the leading picture of a sequence (step S108). Next, the inserting section 130 additionally determines whether or not there is a change in the QMPS (step S110). At this point, the inserting section 130 inserts a QMPS into the stream in the case where there is a change in the QMPS, or in the case where the recognized picture is the leading picture of a sequence (step S112). After that, the inserting section 130 ends the process in the case of detecting the end of the stream. On the other hand, the inserting section 130 repeats the above process for the next picture in the case where the stream has not ended (step S114).

Note that although the flowchart only illustrates the insertion of the SPS, the PPS, and QMPS for the sake of simplicity, the inserting section 130 may also insert other header information, such as supplemental enhancement information (SEI) and slice headers, into the stream.

(2) Description of Stream Structure

Figure 6:
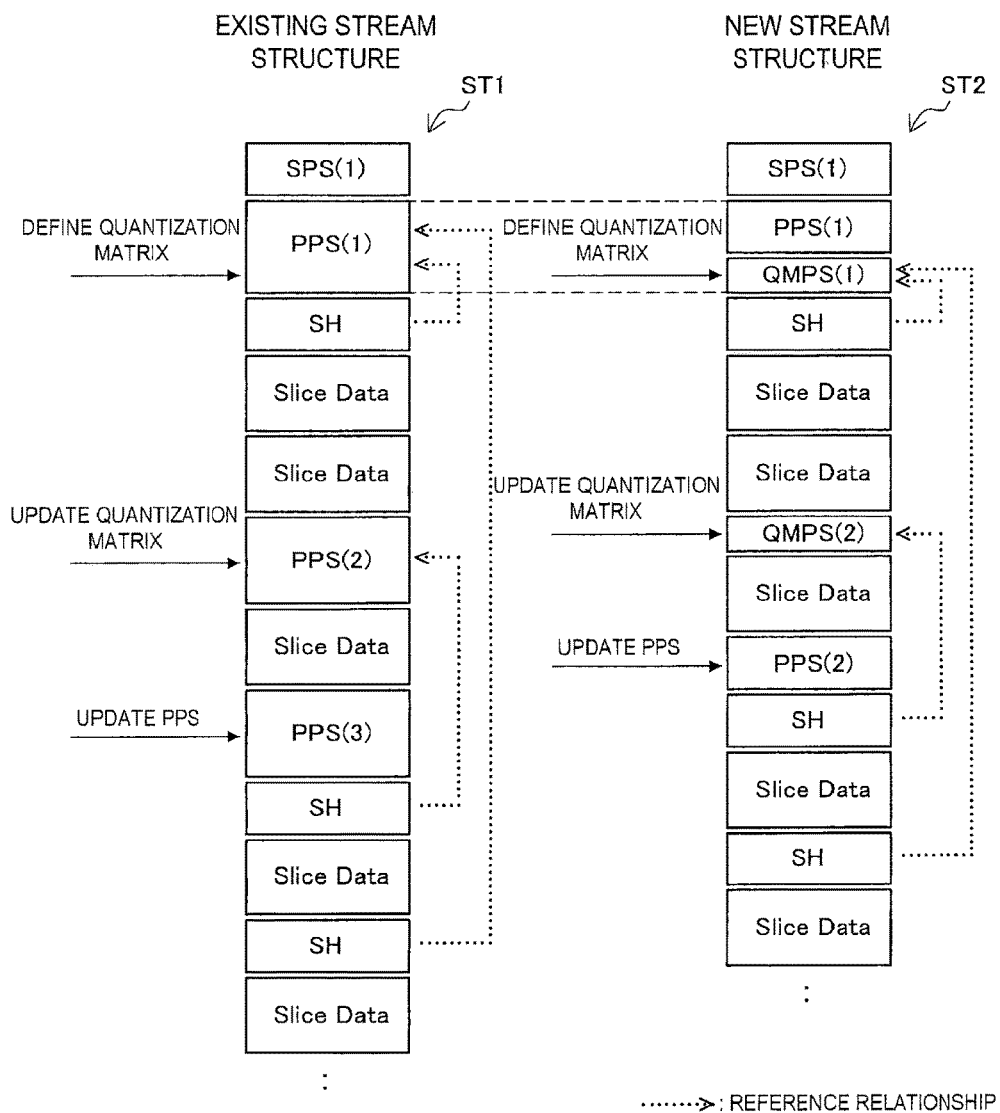
FIG. 6 is an explanatory diagram for explaining differences in the stream structure between a technique according to an embodiment and an existing technique.

FIG. 6 is an explanatory diagram for explaining differences in the stream structure between a technique according to the present embodiment and an existing technique.

The left side of FIG. 6 illustrates a stream ST1 as an example generated in accordance with an existing technique. Since the start of the stream ST1 is the start of a sequence, a first SPS(1) and a first PPS(1) are inserted at the start of the stream ST1. One or more quantization matrices may be defined in the SPS(1) and the PPS(1). Next, assume that it becomes necessary to update the quantization matrices after several subsequent slice headers and slice data. Thus, a second PPS(2) is inserted into the stream ST1. The PPS(2) also includes parameters other than quantization matrix parameters. Next, assume that it becomes necessary to update the PPS after several subsequent slice headers and slice data. Thus, a third PPS(3) is inserted into the stream ST1. The PPS(3) also includes quantization matrix parameters. The quantization process (and inverse quantization process) for subsequent slices is conducted using the quantization matrices defined in the PPS specified by the PPS ID in the slice header.

The right side of FIG. 6 illustrates a stream ST2 as an example generated in accordance with the above technique according to the present embodiment. Since the start of the stream ST2 is the start of a sequence, a first SPS(1), a first PPS(1), and a first QMPS(1) are inserted at the start of the stream ST1. In the stream ST2, one or more quantization matrices may be defined in the QMPS(1). The sum of the lengths of the PPS(1) and the QMPS(1) in the stream ST2 are approximately equal to the length of the PPS(1) in the stream ST1. Next, if it becomes necessary to update the quantization matrices after several subsequent slice headers and slice data, a second QMPS(2) is inserted into the stream ST2. Since the QMPS(2) does not contain parameters other than quantization matrix parameters, the length of the QMPS(2) is shorter than the length of the PPS(2) in the stream ST2. Next, if it becomes necessary to update the PPS after several subsequent slice headers and slice data, a second PPS(2) is inserted into the stream ST2. Since the PPS(2) in the stream ST2 does not contain quantization matrix parameters, the length of the PPS(2) in the stream ST2 is shorter than the length of the PPS(3) in the stream ST1. The quantization process (and inverse quantization process) for subsequent slices is conducted using the quantization matrices defined in the QMPS specified by the QMPS ID in the slice header.

A comparison of the streams ST1 and ST2 in FIG. 6 reveals that the amount of codes of the stream overall may be reduced with the technique described in the present embodiment. Particularly, the reduction of the amount of codes with the above technique becomes even more effective in the case of quantization matrices with larger sizes, or in the case where a larger number of quantization matrices are defined for each picture.

3. Exemplary Configuration of Image Decoding Device According to Embodiment

3-1. Exemplary Overall Configuration

This section describes an exemplary configuration of an image decoding device according to an embodiment.

3-1. Exemplary Overall Configuration

Figure 7:
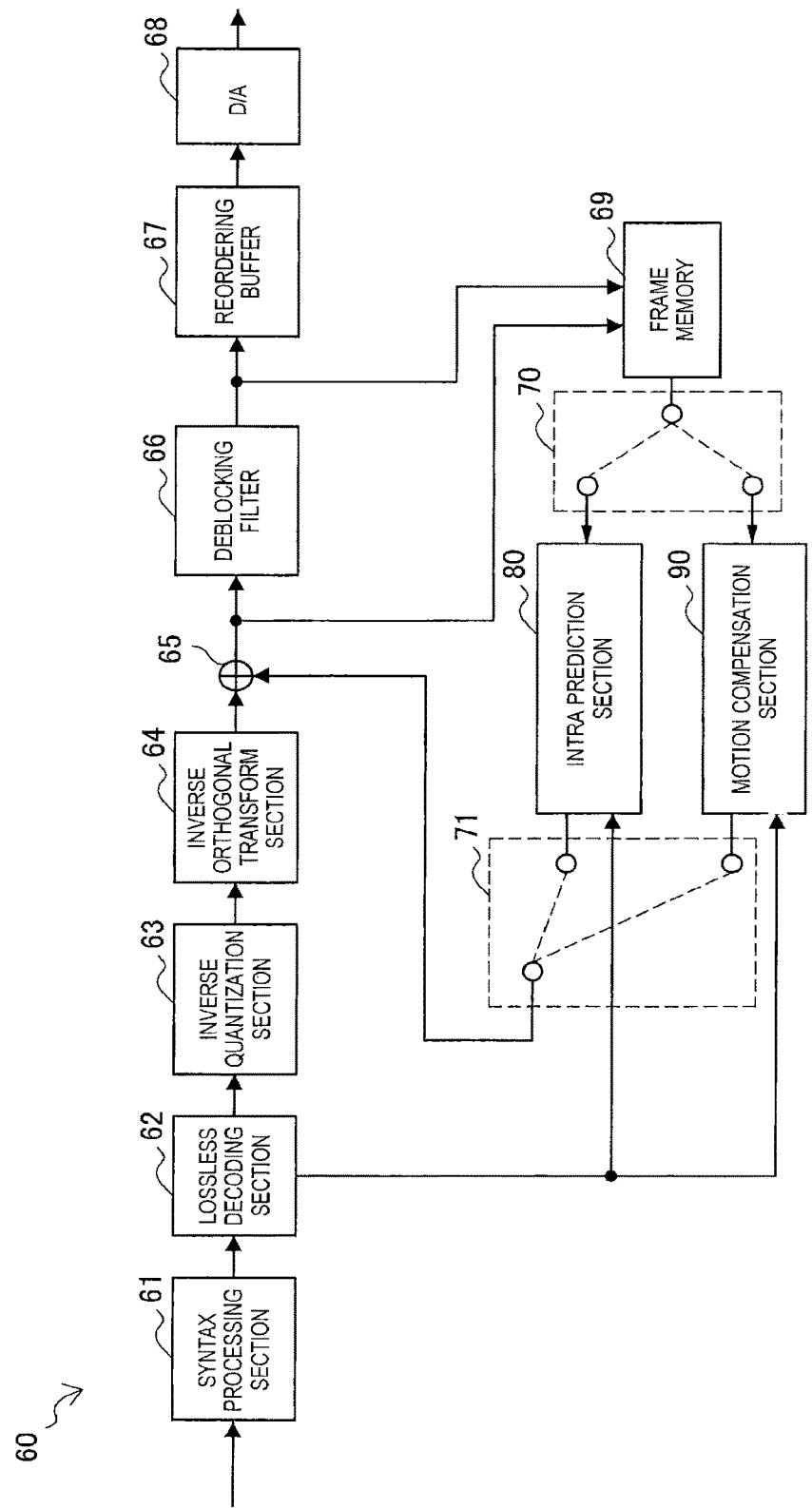
FIG. 7 is a block diagram illustrating an exemplary configuration of an image decoding device according to an embodiment.

FIG. 7 is a block diagram illustrating an exemplary configuration of an image decoding device 60 according to an embodiment. Referring to FIG. 7, the image decoding device 60 is equipped with a syntax processing section 61, a lossless decoding section 62, an inverse quantization section 63, an inverse orthogonal transform section 64, an addition section 65, a deblocking filter 66, a reordering buffer 67, a digital-to-analog (D/A) conversion section 68, frame memory 69, selectors 70 and 71, an intra prediction section 80, and a motion compensation section 90.

The syntax processing section 61 acquires header information such as SPSs, PPSs, QMPSs, and slice headers from an encoded stream input via a transmission channel, and recognizes various settings for a decoding process by the image decoding device 60 on the basis of the acquired header information. For example, in the present embodiment, the syntax processing section 61 sets a quantization matrix to be used during an inverse quantization process by the inverse quantization section 63 on the basis of quantization matrix parameters included in a QMPS. A detailed configuration of the syntax processing section 61 will be further described later.

The lossless decoding section 62 decodes the encoded stream input from the syntax processing section 61 according to the coding method used at the time of encoding. The lossless decoding section 62 then outputs the decoded quantization data to the inverse quantization section 62. In addition, the lossless decoding section 62 outputs information about intra prediction included in the header information to the intra prediction section 80, and outputs information about inter prediction to the motion compensation section 90.

The inverse quantization section 63 uses a quantization matrix set by the syntax processing section 61 to inversely quantize the quantization data decoded by the lossless decoding section 62 (that is, quantized transform coefficient data). The question of which quantization matrix should be used for each block in a given slice may be determined according to the QMPS ID specified in the slice header, the size of each block (Transform Unit), the prediction method for each block, and the signal components.

The inverse orthogonal transform section 64 generates prediction error data by performing an inverse orthogonal transform on transform coefficient data input from the dequantization section 63 according to the orthogonal transform method used at the time of encoding. Then, the inverse orthogonal transform section 64 outputs the generated prediction error data to the addition section 65.

The addition section 65 adds the prediction error data input from the inverse orthogonal transform section 64 to predicted image data input from the selector 71 to thereby generate decoded image data. Then, the addition section 65 outputs the decoded image data thus generated to the deblocking filter 66 and the frame memory 69.

The deblocking filter 66 removes blocking artifacts by filtering the decoded image data input from the addition section 65, and outputs the decoded image data thus filtered to the reordering buffer 67 and the frame memory 69.

The reordering buffer 67 generates a chronological sequence of image data by reordering images input from the deblocking filter 66. Then, the reordering buffer 67 outputs the generated image data to the D/A conversion section 68.

The D/A conversion section 68 converts the image data in a digital format input from the reordering buffer 67 into an image signal in an analog format. Then, the D/A conversion section 68 causes an image to be displayed by outputting the analog image signal to a display (not illustrated) connected to the image decoding device 60, for example.

The frame memory 69 uses a storage medium to store the unfiltered decoded image data input from the addition section 65 and the filtered decoded image data input from the deblocking filter 66.

The selector 70 switches the output destination of the image data from the frame memory 69 between the intra prediction section 80 and the motion compensation section 90 for each block in the image according to mode information acquired by the lossless decoding section 62. For example, in the case where an intra prediction mode is specified, the selector 70 outputs the unfiltered decoded image data that is supplied from the frame memory 69 to the intra prediction section 80 as reference image data. Also, in the case where an inter prediction mode is specified, the selector 70 outputs the filtered decoded image data that is supplied from the frame memory 69 to the motion compensation section 90 as reference image data.

The selector 71 switches the output source of predicted image data to be supplied to the addition section 65 between the intra prediction section 80 and the motion compensation section 90 for each block in the image according to the mode information acquired by the lossless decoding section 62. For example, in the case where an intra prediction mode is specified, the selector 71 supplies the addition section 65 with the predicted image data output from the intra prediction section 80. In the case where an inter prediction mode is specified, the selector 71 supplies the addition section 65 with the predicted image data output from the motion compensation section 90.

The intra prediction section 80 performs in-picture prediction of pixel values on the basis of the information about intra prediction input from the lossless decoding section 62 and the reference image data from the frame memory 69, and generates predicted image data. Then, the intra prediction section 80 outputs the predicted image data thus generated to the selector 71.

The motion compensation section 90 performs a motion compensation process on the basis of the information about inter prediction input from the lossless decoding section 62 and the reference image data from the frame memory 69, and generates predicted image data. Then, the motion compensation section 90 outputs the predicted image data thus generated to the selector 71.

3-2. Exemplary Configuration of Syntax Processing Section

Figure 8:
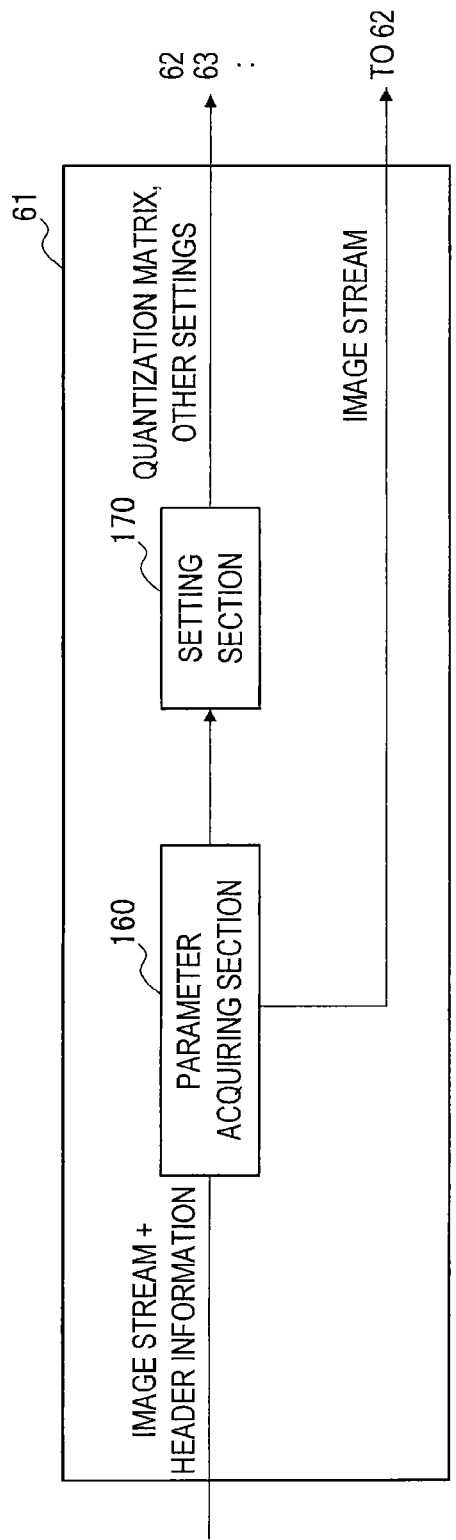
FIG. 8 is a block diagram illustrating an example of a detailed configuration of the syntax processing section illustrated in FIG. 7.

FIG. 8 is a block diagram illustrating an example of a detailed configuration of the syntax processing section 61 of the image decoding device 60 illustrated in FIG. 7. Referring to FIG. 8, the syntax processing section 61 includes a parameter acquiring section 160 and a setting section 170.

(1) Parameter Acquiring Section

The parameter acquiring section 160 recognizes header information such as SPSs, PPSs, QMPSs, and slice headers from the stream of image data, and acquires parameters included in the header information. For example, in the present embodiment, the parameter acquiring section 160 acquires quantization matrix parameters defining a quantization matrix from a QMPS. As discussed earlier, the QMPS is a non-VCL NAL unit that differs from the SPS and the PPS. The parameter acquiring section 160 then outputs the acquires parameters to the setting section 170. The parameter acquiring section 160 also outputs the stream of image data to the lossless decoding section 62.

(2) Setting Section

The setting section 170 applies settings for the processing in each section illustrated in FIG. 7 on the basis of the parameters acquired by the parameter acquiring section 160. For example, the setting section 170 recognizes the range of Coding Unit sizes from the pair of LCU and SCU values, while also setting the Coding Unit size according to the value of split_flag. The decoding of image data is conducted by taking the Coding Units set at this point as the units of processing. In addition, the setting section 170 additionally sets the Transform Unit size. The inverse quantization by the inverse quantization section 63 and the inverse orthogonal transform by the inverse orthogonal transform section 64 discussed above are conducted by taking the Transform Units set at this point as the units of processing.

Also, in the present embodiment, the setting section 170 sets quantization matrices on the basis of quantization matrix parameters acquired from a QMPS by the parameter acquiring section 160. More specifically, on the basis of quantization parameters included in a QMPS, the setting section 170 generates multiple quantization matrices that differ from each other in size and type in full scan mode, copy mode, and axis designation mode, respectively. The generation of quantization matrices may be conducted each time a QMPS is detected in the stream of image data.

For example, in full scan mode, the setting section 170 decodes a linear array of differential data included in the quantization matrix parameters in DPCM format. The setting section 170 then converts the decoded linear array to a two-dimensional quantization matrix according to the scan pattern of a zigzag scan.

Also, in copy mode, the setting section 170 copies a (previously generated) quantization matrix specified by a source ID, a copy source size, and a copy source type included in the quantization matrix parameters. At this point, in the case where the size of the new quantization matrix is smaller than the size of the copy source quantization matrix, the setting section 170 generates the new quantization matrix by decimating elements in the copied quantization matrix. In addition, in the case where the size of the new quantization matrix is larger than the size of the copy source quantization matrix, the setting section 170 generates the new quantization matrix by interpolating elements in the copied quantization matrix. Then, in the case where residual components are present, the setting section 170 adds the residual components to the new quantization matrix.

Also, in the case where the source ID included in the quantization matrix parameters inside a given QMPS is equal to the QMPS ID of that QMPS, the setting section 170 treats the new quantization matrix as the default quantization matrix.

Also, in axis designation mode, the setting section 170 recognizes the designation method flag included in the quantization matrix parameters. Then, in the case of the differential method, the setting section 170 generates the values of the elements of the quantization matrix that correspond to the vertical axis, the horizontal axis, and the diagonal axis on the basis of reference axis data included in the quantization matrix parameters, and generates the values of the remaining elements by interpolation. In addition, in the case of the interpolation method, the setting section 170 generates the values of the elements of the quantization matrix that correspond to the four corners on the basis of corner data included in the quantization matrix parameters, and after generating the values of elements along the reference axes by interpolation, additionally generates the values of the remaining elements by interpolation. Then, in the case where residual components are present, the setting section 170 adds the residual components to the new quantization matrix.

After that, when a QMPS ID is specified in a slice header, the setting section 170 sets the quantization matrix generated for the QMPS identified by the specified QMPS ID as the quantization matrix to be used by the inverse quantization section 63.

4. Process Flow During Decoding According to Embodiment

Figure 9:
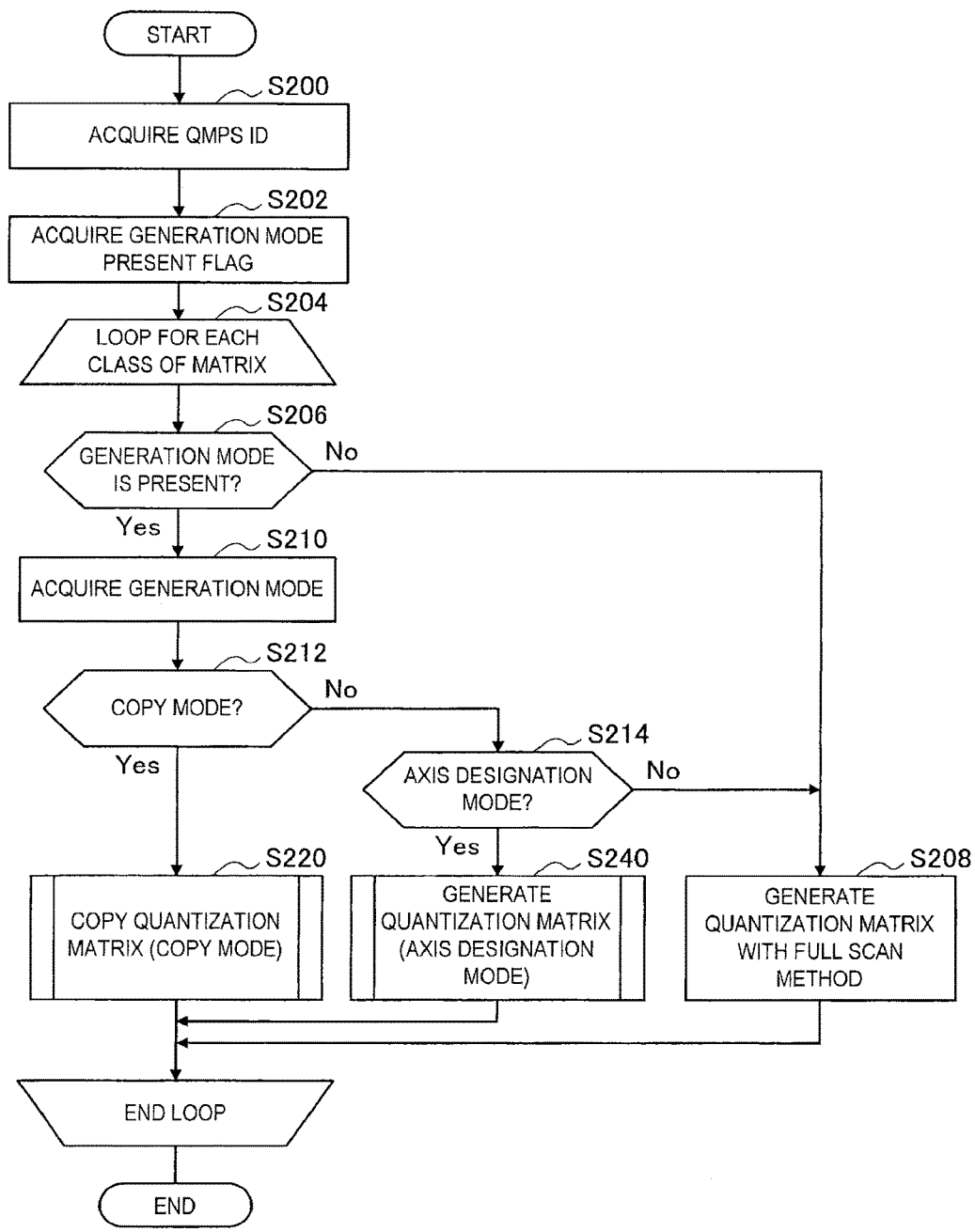
FIG. 9 is a flowchart illustrating an exemplary flow of a quantization matrix generation process according to an embodiment.

4-1. Generating Quantization Matrices (1) Quantization Matrix Generation Process FIG. 9 is a flowchart illustrating an exemplary flow of a quantization matrix generation process by the syntax processing section 61 according to the present embodiment. The quantization matrix generation process in FIG. 9 is a process that may be conducted each time a QMPS is detected in the stream of image data.

Referring to FIG. 9, the parameter acquiring section 160 first acquires a QMPS ID from a QMPS (step S200). If the QMPS ID acquired at this point is an unused ID in the stream, the setting section 170 generates a new quantization matrix to be associated with that QMPS ID according to the process described below. On the other hand, if the QMPS ID is an ID that is already in use, the setting section 170 updates the quantization matrix stored in association with that QMPS ID to a matrix generated according to the process described below. Next, the parameter acquiring section 160 acquires a generation mode present flag from the QMPS (step S202).

The subsequent processing from step S206 to step S240 is repeated for every class of quantization matrix (step S204). Note that the class of a quantization matrix corresponds to the combination of the size and the type (that is, the prediction method and signal components) of the quantization matrix.

In step S206, the setting section 170 determines, according to the generation mode present flag, whether or not (a classification of) a generation mode is present in the QMPS (step S206). In the case where a generation mode is not present at this point, the setting section 170 generates a quantization matrix with the full scan method, similarly to the quantization matrix decoding process in H.264/AVC (step S208). On the other hand, in the case where a generation mode is present, the parameter acquiring section 160 acquires the generation mode from the QMPS (step S210). The setting section 170 then conducts different processing depending on the generation mode (steps S212, S214).

Figure 10:
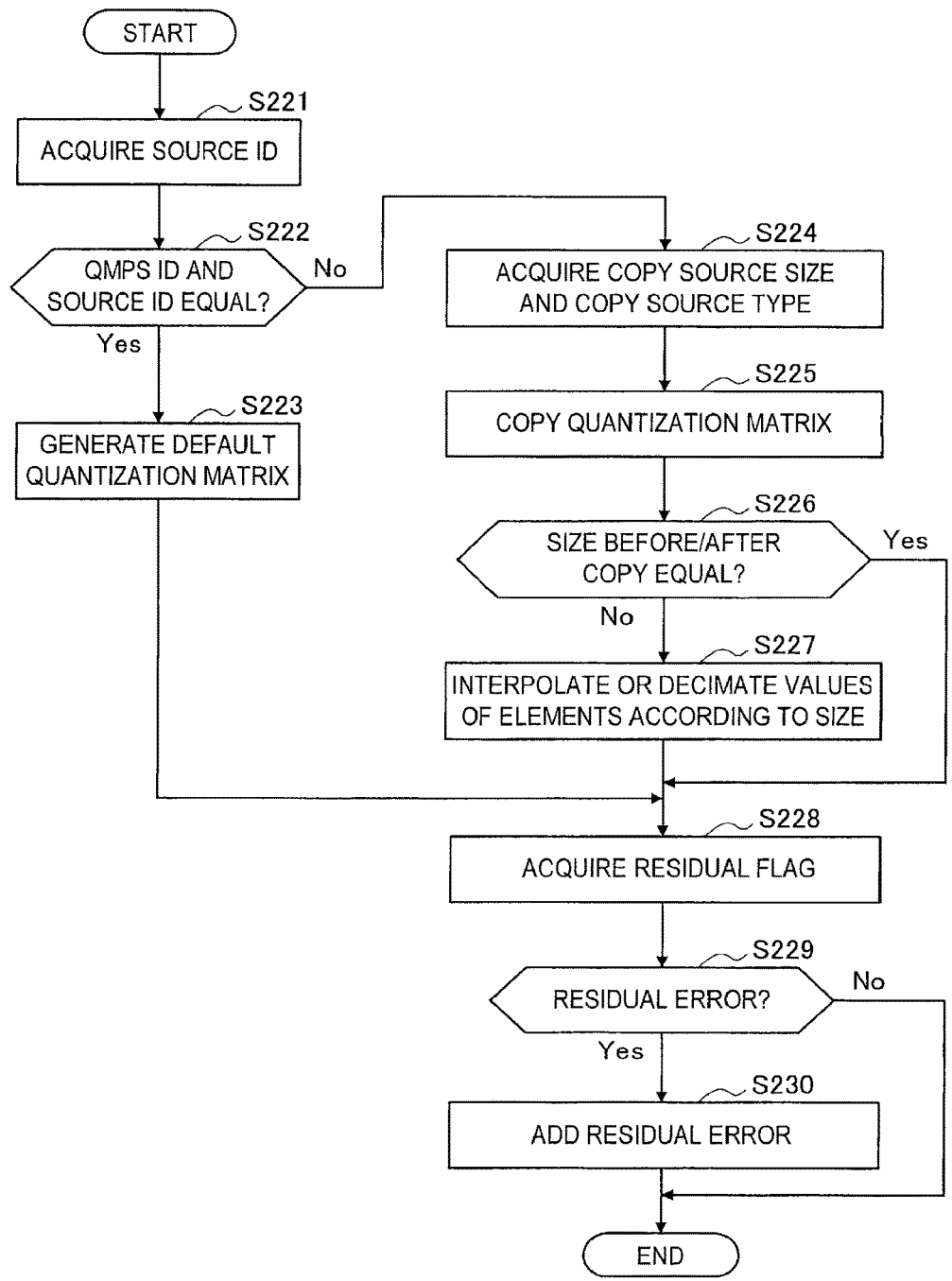
FIG. 10 is a flowchart illustrating an example of a detailed flow of a process in copy mode according to an embodiment.

For example, in the case where copy mode is indicated, the setting section 170 conducts processing in the copy mode illustrated by example in FIG. 10 (step S220). Also, in the case where axis designation mode is indicated, the setting section 170 conducts processing in the axis designation mode illustrated by example in FIG. 11 (step S240). Also, in the case where full scan mode is indicated, the setting section 170 generates a quantization matrix with the full scan method, similarly to the quantization matrix decoding process in H.264/AVC (step S208).

After that, when quantization matrices for all classes of quantization matrices are generated, the quantization matrix generation process illustrated in FIG. 9 ends.

(2) Process in Copy Mode

FIG. 10 is a flowchart illustrating an example of a detailed flow of a process in copy mode in step S220 of FIG. 9.

Referring to FIG. 10, first, the parameter acquiring section 160 acquires a source ID from a QMPS (step S221). Next, the setting section 170 determines whether or not the QMPS ID acquired in step S200 of FIG. 9 (the QMPS ID of the current QMPS) and the source ID are equal (step S222). At this point, in the case where the QMPS ID of the current QMPS and the source ID are equal, the setting section 170 generates a new quantization matrix as the default quantization matrix (step S223). On the other hand, in the case where the QMPS ID of the current QMPS and the source ID are not equal, the process proceeds to step S224.

In step S224, the parameter acquiring section 160 acquires the copy source size and the copy source type from the QMPS (step S224). Next, the setting section 170 copies the quantization matrix specified by the source ID, the copy source size, and the copy source type (step S225). Next, the setting section 170 compares the copy source size to the size of the quantization matrix to be generated (step S226). At this point, in the case where the copy source size and the size of the quantization matrix to be generated are not equal, the setting section 170 generates a new quantization matrix by interpolating or decimating elements in the copied quantization matrix, depending on the size difference (step S227).

Additionally, the parameter acquiring section 160 acquires the residual flag from the QMPS (step S228). Next, the setting section 170 determines whether or not residual data is present, according to the value of the residual flag (step S229). At this point, in the case where residual data is present, the setting section 170 adds the residual error to the new quantization matrix generated in step S223 or steps S225 to S227 (step S230).

(3) Process in Axis Designation Mode

Figure 11:
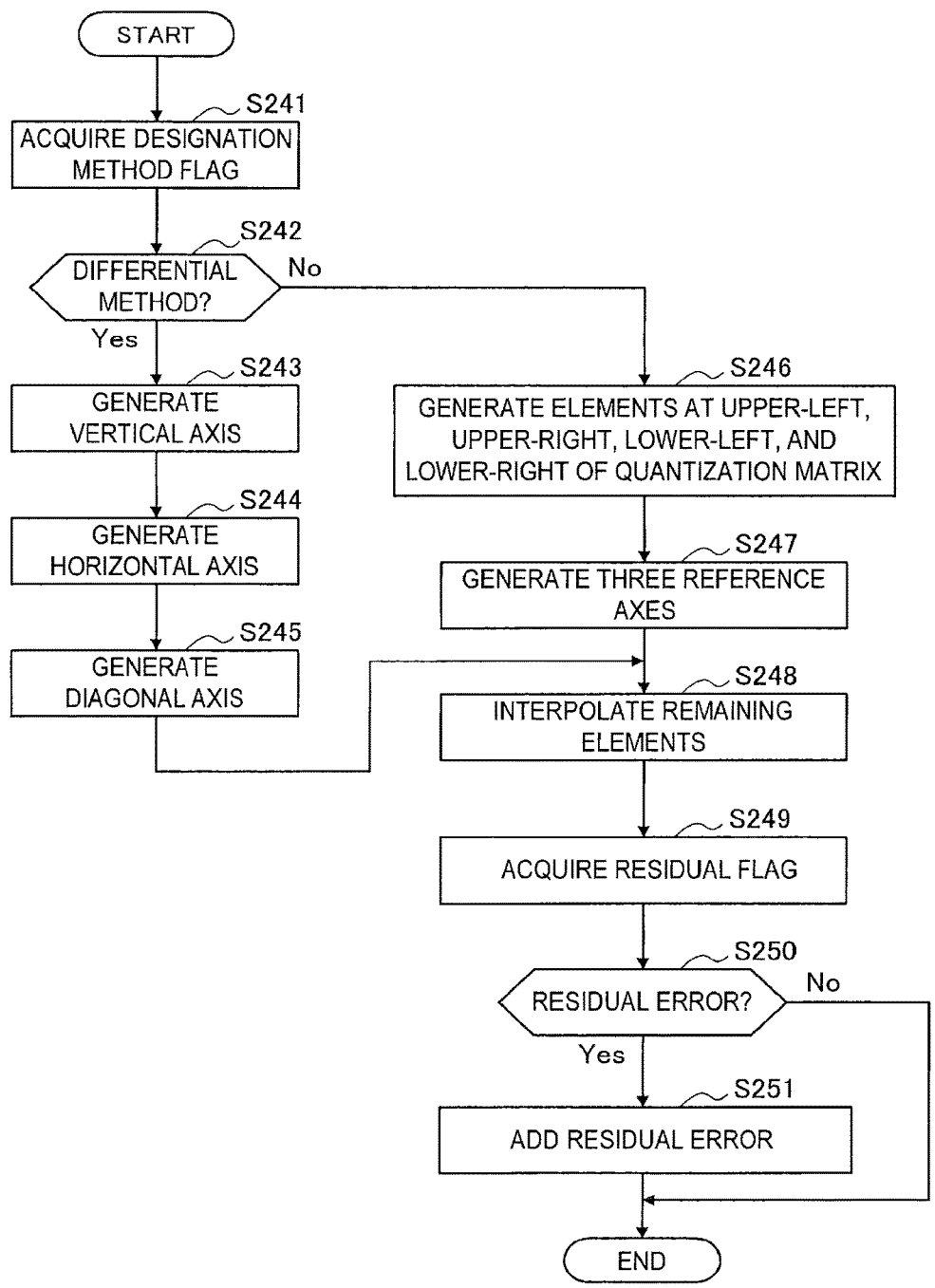
FIG. 11 is a flowchart illustrating an example of a detailed flow of a process in axis designation mode according to an embodiment.

FIG. 11 is a flowchart illustrating an example of a detailed flow of a process in axis designation mode in step S240 of FIG. 9.

Referring to FIG. 11, first, the parameter acquiring section 160 acquires the designation method flag from a QMPS (step S241). Next, the setting section 170 determines the designation method according to the value of the designation method flag (step S242). At this point, the process proceeds to step S243 in the case where the differential method is designated. On the other hand, the process proceeds to step S246 in the case where the interpolation method is designated.

In the case of the differential method, the setting section 170 generates the values of the elements of the quantization matrix that correspond to the vertical axis, the horizontal axis, and the diagonal axis, on the basis of reference axis data included in the quantization matrix parameters (steps S243, S244, and S245). Meanwhile, in the case of the interpolation method, the setting section 170 generates the values of the elements of the quantization matrix that correspond to the four corners, on the basis of corner data included in the quantization matrix parameters (step S246). Next, the setting section 170 generates by interpolation the values of the elements along the reference axes (vertical axis, horizontal axis, and diagonal axis) that join the four corners (step S247). After that, the setting section 170 interpolates the values of the remaining elements on the basis of the values of the elements along the reference axes (step S248).

Additionally, the parameter acquiring section 160 acquires the residual flag from the QMPS (step S249). Next, the setting section 170 determines whether or not residual data is present, according to the value of the residual flag (step S250). At this point, in the case where residual data is present, the setting section 170 adds the residual error to the new quantization matrix generated in step S248 (step S251).

4-2. Setting Quantization Matrix to Slice

Figure 12:
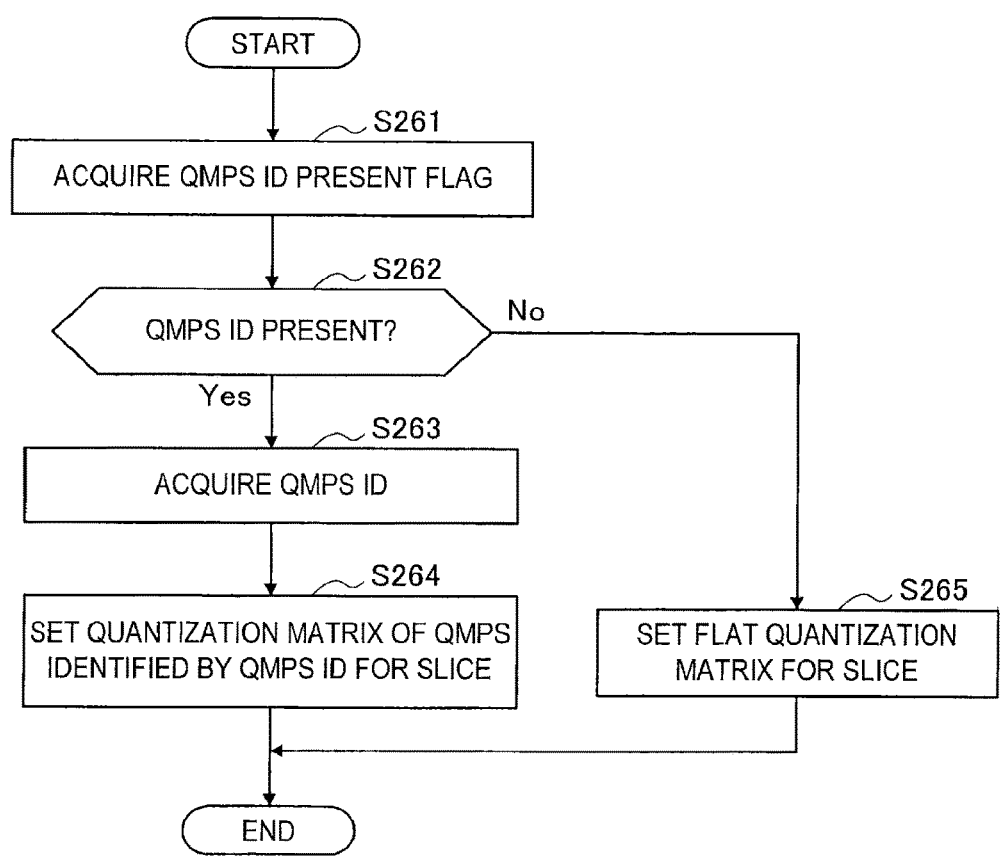
FIG. 12 is a flowchart illustrating an exemplary flow of a process for setting a quantization matrix to a slice according to an embodiment.

FIG. 12 is a flowchart illustrating an exemplary flow of a process for setting a quantization matrix to a slice by the syntax processing section 61 according to the present embodiment. The process in FIG. 12 may be conducted each time a slice header is detected in the stream of image data.

First, the parameter acquiring section 160 acquires the QMPS ID present flag from a slice header (step S261). Next, the parameter acquiring section 160 determines whether or not a QMPS ID is present inside the slice header, according to the value of the QMPS ID present flag (step S262). At this point, the parameter acquiring section 160 additionally acquires a QMPS ID from a QMPS in the case where a QMPS ID is present (step S263). The setting section 170 then sets the quantization matrix generated for the QMPS identified by the acquired QMPS ID for slices following that slice header (step S264). On the other hand, in the case where a QMPS ID is not present inside the slice header, the setting section 170 sets a flat quantization matrix for slices following that slice header (step S265).

5. Syntax Examples

5-1. First Example

FIGS. 13 to 15 illustrate a first example of illustrative pseudo-code expressing the syntax of a QMPS according to the present embodiment. Line numbers are given on the left edge of the pseudo-code. Also, an underlined variable in the pseudo-code means that the parameter corresponding to that variable is specified inside the QMPS.

The function QuantizationMatrixParameterSet( ) on line 1 in FIG. 13 is a function that expresses the syntax of a single QMPS. On line 2 and line 3, the QMPS ID (quantization_matrix_parameter_id) and the generation mode present flag (pred_present_flag) are specified. The subsequent syntax from line 6 to line 56 loops for every size and type of quantization matrix. The syntax from line 7 to line 53 in the loop is inserted into the QMPS in the case where a generation mode is present (pred_present_flag=1).

The syntax from line 9 to line 16 in the case where a generation mode is present is the syntax for copy mode. From line 9 to line 11, the source ID, copy source size, and copy source type are specified. The function pred_matrix( ) on line 12 means that the quantization matrix specified by the source ID, copy source size, and copy source type is to be copied. On line 13, the residual flag is specified. The function residual_matrix( ) on line 15 means that residual data is specified in the QMPS in the case where residual components are present.

The syntax from line 18 to line 50 is the syntax for axis designation mode, and is described in FIG. 14. On line 18, the designation method flag is specified. In the case where the designation method is the differential (DPCM) method, the values of elements along the vertical axis are specified from line 21 to line 25, while the values of elements along the horizontal axis are specified from line 26 to line 34, and the values of elements along the diagonal axis are specified from line 35 to line 40. The reference axis data in this case are linear arrays of DPCM differential data. Note that the syntax for elements along the horizontal axis may be omitted in the case where the values of elements along the horizontal axis may be copied (line 27, line 28). In the case where the designation method is the interpolation method, the values of the upper-left (DC component), upper-right, lower-left, and lower-right elements are respectively specified as corner data from line 42 to line 45.

The processing on line 52 is the syntax for the full scan mode. The processing on line 55 is the syntax for the case where a generation mode is not present. In either case, a quantization matrix is specified with the full scan method by a function qmatrix( ) that represents the quantization matrix syntax in H.264/AVC.

The function residual_matrix( ) on line 1 in FIG. 15 is a function for specifying residual data used on line 15 in FIG. 13 and line 49 in FIG. 14. In the example in FIG. 15, residual data is specified by a DPCM method or a run-length method. In the case of the DPCM method, the value of the difference from the last element (delta_coef) is specified from line 4 to line 8 for every element in the linear array. In the case of the run-length method, the length of element groups in portions in which the value is consecutively zero (run) and the value of non-zero elements (data) are repeatedly specified from line 11 to line 18.

5-2. Second Example

FIGS. 16 to 20 illustrate a second example of illustrative pseudo-code expressing the syntax of a QMPS according to the present embodiment.

The function QuantizaionMatrixParameterSet( ) on line 1 in FIG. 16 is a function that expresses the syntax of a single QMPS. On line 2, the QMPS ID (quantization_matrix_parameter_id) is specified. In addition, the generation mode present flag (pred_present_flag) is specified on line 6, except in the case where only the default quantization matrix is designated.

Figures 21, 22:
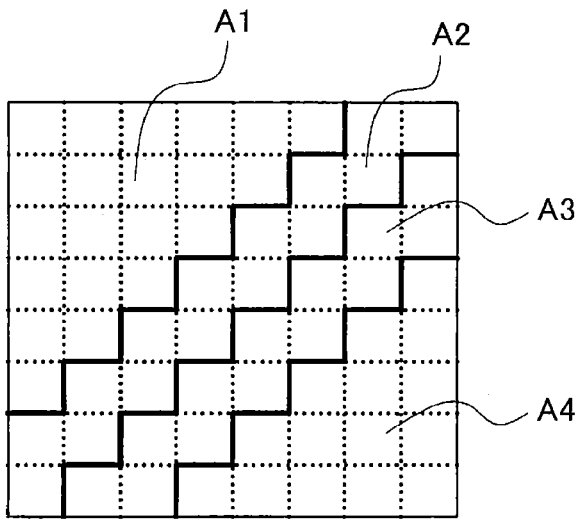
FIG. 21 is an explanatory diagram illustrating an example of quantization scale setting areas defined in order to quantize a quantization matrix.
FIG. 22 is an explanatory diagram illustrating an example of quantization scales set in the respective quantization scale setting areas illustrated by example in FIG. 21.

Furthermore, in the second example, four classes of quantization scales (Qscale0 to Qscale3) are specified from line 7 to line 10 in the function QuantizaionMatrixParameterSet( ). These quantization scales are parameters that may be adopted in order to quantize the value of each element in a quantization matrix and further decrease the rate. More specifically, four quantization scale setting areas A1 to A4 like those illustrated in FIG. 21 are defined in an 8×8 quantization matrix, for example. The quantization scale setting area A1 is an area for the element group corresponding to the low-range signal, including the DC component. The quantization scale setting areas A2 and A3 are areas for the element groups that correspond to respective signals in the mid-range. The quantization scale setting area A4 is an area for the element group corresponding to the high-range signal. A quantization scale for quantizing the values of elements in the quantization matrix may be set for each of these areas. For example, referring to FIG. 22, the first quantization scale (Qscale0) is "1" for the quantization scale setting area A1. This means that values in the quantization matrix are not quantized in element groups corresponding to the low-range signal. Meanwhile, the second quantization scale (Qscale1) is "2" for the quantization scale setting area A2. The third quantization scale (Qscale2) is "3" for the quantization scale setting area A3. The fourth quantization scale (Qscale3) is "4" for the quantization scale setting area A4. As the quantization scale becomes larger, the error produced by quantization increases. Typically, however, some degree of error is tolerable for the high-range signal. Consequently, in cases where it is desirable to achieve a high encoding efficiency, the amount of codes required to define a quantization matrix can be effectively reduced by setting such quantization scales for quantizing the quantization matrix, without greatly degrading image quality. In cases where a quantization matrix is quantized, the value of each element in the residual data or the differential data illustrated by example in FIG. 3 may be substantially quantized or inversely quantized by the quantization steps set in the quantization scale setting areas to which each element belongs.

Note that the layout of quantization scale setting areas illustrated in FIG. 21 is merely one example. For example, different numbers of quantization scale setting areas may also be defined for each size of quantization matrix (for example, more quantization scale setting areas may be defined for larger sizes). Also, the positions of the boundaries of the quantization scale setting areas are not limited to the example in FIG. 21. Ordinarily, the scan pattern when linearizing a quantization matrix is a zigzag scan. For this reason, it is preferable to use diagonal area boundaries from the upper-right to the lower-left, as illustrated in FIG. 21. However, area boundaries following along the vertical direction or the horizontal direction may also be used, depending on factors such as inter-element correlation in the quantization matrix and the scan pattern in use. Furthermore, the layout of quantization scale setting areas (the number of areas, the positions of boundaries, and the like) may also be adaptively selected from the perspective of encoding efficiency. For example, a smaller number of quantization scale setting areas may also be selected in the case where a nearly-flat quantization matrix is defined.

In FIG. 16, the subsequent syntax from line 13 to line 76 loops for every size and type of quantization matrix. The syntax from line 14 to line 66 (see FIG. 18) in the loop is inserted into the QMPS in the case where a generation mode is present (pred_present_flag=1).

The syntax from line 16 to line 22 in the case where a generation mode is present is the syntax for copy mode. From line 16 to line 18, the source ID, copy source size, and copy source type are specified. On line 19, the residual flag is specified. The function residual_matrix( ) on line 21 means that residual data is specified in the QMPS in the case where residual components are present. The residual data at this point may be quantized according to the values of the four classes of quantization scales (Qscale0 to Qscale3) discussed above. The syntax from line 23 to line 56 is the syntax for axis designation mode, and is described in FIG. 17. The residual data in axis designation mode may likewise be quantized according to the values of the four classes of quantization scales (Qscale0 to Qscale3) discussed above (line 55).

The syntax from line 57 to line 66 in FIG. 18 is the syntax for full scan mode. Also, the syntax from line 68 to line 75 is the syntax for the case in which a generation mode is not present. In either case, a quantization matrix is specified with the full scan method by the function qmatrix( ). However, in the second example, VLC tables for entropy encoding differential data (delta_coef) in the DPCM method or run values (run) and non-zero element values (data) in the run-length method are adaptively switched in order to further raise the encoding efficiency. The vlc_table_data on line 61 and line 71 specify the table number of a VLC table selected for the differential data (delta_coef) in the DPCM method or the non-zero element values (data) in the run-length method. The vlc_table_run on line 63 and line 73 specify the table number of a VLC table selected for the run values (run) in the run-length method.

The function qmatrix( ) on line 1 of FIG. 19 is the syntax for specifying a quantization matrix with the full scan method. Line 3 to line 8 in FIG. 19 indicate the syntax for the DPCM method, and the differential data (delta_coef) on line 5 is encoded using the VLC table specified by vlc_table_data discussed above. Also, line 10 to line 21 indicate the syntax for the run-length method, and the run values (run) on line 12 is encoded using the VLC table specified by vlc_table_run discussed above. The non-zero element values (data) on line 13 are encoded using the VLC table specified by vlc_table_data discussed above.

FIG. 23 illustrates code word lists in 11 classes of variable-length coding (VLC) tables selectable in a low complexity entropy coding (LCEC) method. The "x" in each code word in FIG. 23 is a given suffix. For example, if a value of "15" is encoded with Exp-Golomb coding, a 9-bit code word of "000010000" is obtained, but if that value is encoded with VLC4, a 5-bit code word of "11111" is obtained. In this way, the encoding efficiency can be raised by selecting a VLC table having suffixes with larger numbers of digits in short code words in the case of encoding many larger values. Among the 11 classes of VLC tables in FIG. 23, VLC4 for example has 4-digit suffixes in 5-bit code words. Also, VLC9 has 4-digit suffixes in 6-bit code words. Consequently, these VLC tables are suitable in the case of encoding many larger values.

Returning to the quantization matrix syntax, since the differential data of a linear array of a quantization matrix has many consecutive zeros, the run values in the run-length method produce many larger values, rather than small values such as 0, 1, or 2. On the other hand, the non-zero element values and the differential data values in the run-length method produce large values only infrequently. Consequently, by switching the VLC table for each differential data designation method (DPCM/run-length) and the class of value (run/non-zero element in the case of the run-length method) as with the syntax discussed above, the amount of codes required to define a quantization matrix is significantly reduced.

The function residual_matrix( ) on line 1 of FIG. 20 also implements adaptive switching of VLC tables. In other words, the vlc_table_data on line 7 specifies the table number of a VLC table selected for the differential data (delta_coef) in the DPCM method. The differential data (delta_coef) on line 10 is encoded using the VLC table specified on line 7. The vlc_table_data on line 15 specifies the table number of a VLC table selected for the non-zero element values (data) in the run-length method. The vlc_table_run on line 16 specifies the table number of a VLC table selected for the run values (run) in the run-length method. The run values (run) on line 19 are encoded using the VLC table specified by vlc_table_run discussed above. The non-zero element values (data) on line 20 are encoded using the VLC table specified by vlc_table_data discussed above.

According to the various features of such a QMPS syntax, the amount of codes required to define a quantization matrix is effectively reduced, and the encoding efficiency may be improved. However, the syntax described in this section is merely one example. In other words, part of the syntax illustrated by example herein may be reduced or omitted, the sequence of parameters may be changed, or other parameters may be added to the syntax. Also, several of the features of the syntax described in this section may also be implemented when defining a quantization matrix in the SPS or PPS rather than the QMPS. In such cases, it is possible to reduce the amount of codes required to define a quantization matrix in the SPS or PPS.

6. Various Exemplary Configurations of Parameter Sets

The foregoing describes several specific examples of the syntax for a quantization matrix parameter set (QMPS) that stores quantization matrix parameters. The QMPS substantially may be a dedicated parameter set containing quantization matrix parameters only, but may also be a common parameter set that also contains other parameters relating to encoding tools other than quantization matrices. For example, "Adaptation Parameter Set (APS)" (JCTVC-F747r3, Joint Collaborative Team on Video Coding (JCT-VC) of ITU-T SG16 WP3 and ISO/IEC JTC1/SC29/WG11 6th Meeting: Torino, IT, 14-22 Jul. 2011) introduces a new parameter set called the adaptation parameter set (APS), and proposes storing parameters relating to the adaptive loop filter (ALF) and the sample adaptive offset (SAO) in the APS. By additionally including quantization matrix parameters in such an APS, it is also possible to substantially configure the QMPS discussed above. Thus, in this section, several techniques for configuring the QMPS by using the APS proposed by "Adaptation Parameter Set (APS)" (JCTVC-F747r3) will be described.

6-1. First Technique

Figure 24:
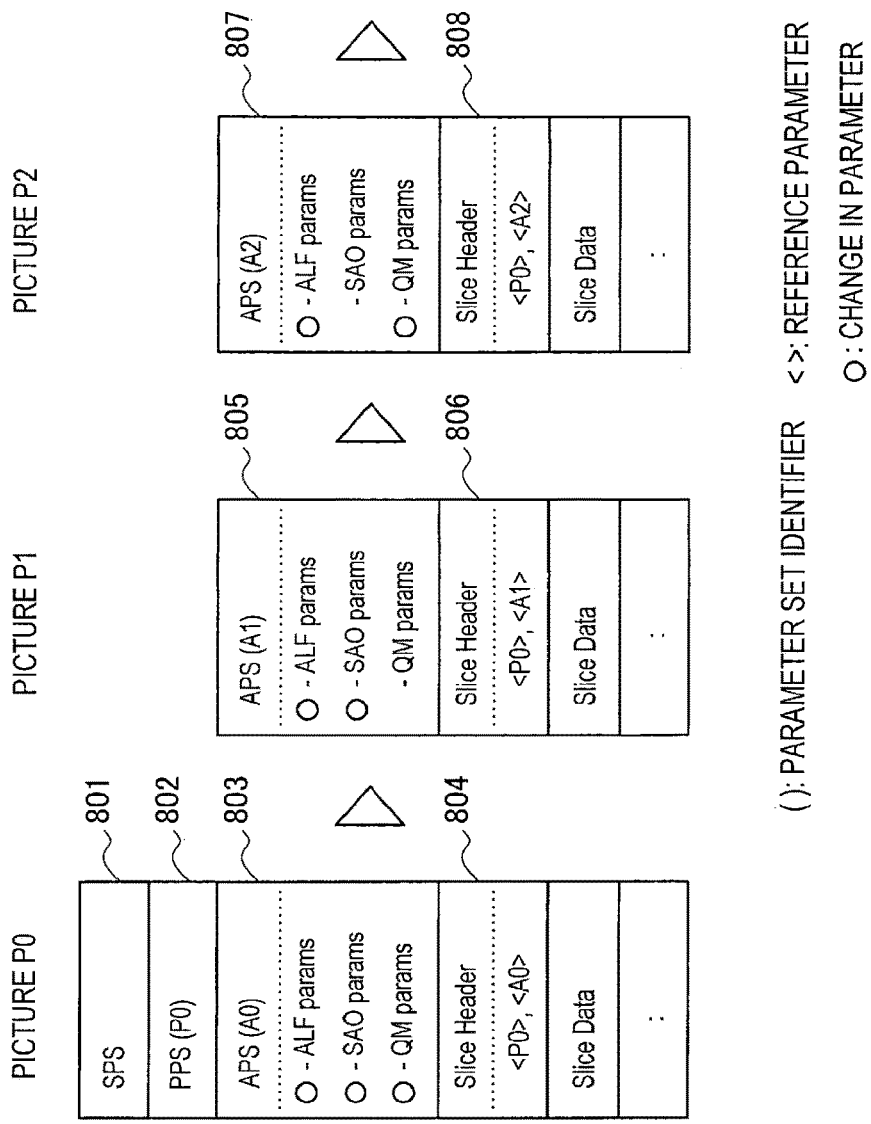
FIG. 24 is an explanatory diagram illustrating an example of an encoded stream structured in accordance with a first technique that uses an APS.

The first technique is a technique that lists all target parameters inside one APS, and references each parameter using an APS ID, an identifier that uniquely identifies that APS. FIG. 24 illustrates an example of an encoded stream configured according to the first technique.

Referring to FIG. 24, an SPS 801, a PPS 802, and an APS 803 are inserted at the start of a picture P0 positioned at the start of a sequence. The PPS 802 is identified by the PPS ID "P0". The APS 803 is identified by the APS ID "A0". The APS 803 includes ALF-related parameters, SAO-related parameters, and quantization matrix parameters (hereinafter designated QM-related parameters). A slice header 804 attached to slice data inside the picture P0 includes a reference PPS ID "P0", and this means that parameters inside the PPS 802 are referenced in order to decode that slice data. Similarly, the slice header 804 includes a reference APS ID "A0", and this means that parameters inside the APS 803 are referenced in order to decode that slice data.

An APS 805 is inserted into a picture P1 following the picture P0. The APS 805 is identified by the APS ID "A1". The APS 805 includes ALF-related parameters, SAO-related parameters, and QM-related parameters. The ALF-related parameters and the SAO-related parameters included in the APS 805 have been updated from the APS 803, but the QM-related parameters have not been updated. A slice header 806 attached to slice data inside the picture P1 includes a reference APS ID "A1", and this means that parameters inside the APS 805 are referenced in order to decode that slice data.

An APS 807 is inserted into a picture P2 following the picture P1. The APS 807 is identified by the APS ID "A2". The APS 807 includes ALF-related parameters, SAO-related parameters, and QM-related parameters. The ALF-related parameters and the QM-related parameters included in the APS 807 have been updated from the APS 805, but the SAO-related parameters have not been updated. A slice header 808 attached to slice data inside the picture P2 includes a reference APS ID "A2", and this means that parameters inside the APS 807 are referenced in order to decode that slice data.

Figure 25:
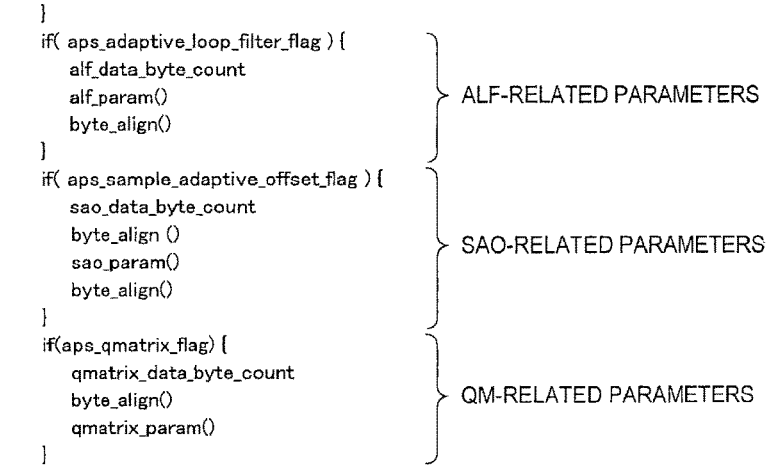
FIG. 25 is an explanatory diagram illustrating an example of APS syntax defined in accordance with a first technique that uses an APS.

FIG. 25 illustrates an example of APS syntax defined according to the first technique. On line 2 in FIG. 25, an APS ID for uniquely identifying that APS is specified. The APS ID is a parameter set identifier used instead of the QMPS ID described using FIG. 3. The ALF-related parameters are specified on line 13 to line 17. The SAO-related parameters are specified on line 18 to line 23. The QM-related parameters are specified on line 24 to line 28. The "aps_qmatrix_flag" on line 24 is a quantization matrix present flag indicating whether QM-related parameters are set inside that APS. The "qmatrix_param( )" on line 27 is a function specifying quantization matrix parameters as illustrated by example in FIGS. 13 to 20. In the case where the quantization matrix present flag on line 24 indicates that QM-related parameters are set inside that APS (aps_qmatrix_flag=1), the function qmatrix_param( ) may be used to set quantization matrix parameters inside that APS.

In the case of implementing the first technique, the parameter acquiring section 160 illustrated in FIG. 8 determines whether quantization matrix parameters are set inside an APS by referencing the quantization matrix present flag included in that APS. The parameter acquiring section 160 then acquires the quantization matrix parameters from the APS in the case where quantization matrix parameters are set inside that APS.

FIG. 26 is an explanatory diagram illustrating an example of slice header syntax defined in accordance with the first technique. On line 5 in FIG. 26, there is specified a reference PPS ID for referencing parameters included in the PPS from among the parameters to be set for that slice. On line 8, there is specified a reference APS ID for referencing parameters included in the APS from among the parameters to be set for that slice. The reference APS ID is a reference parameter used instead of the (reference) QMPS ID described using FIG. 4.

According to the first technique, by extending the APS proposed by "Adaptation Parameter Set (APS)" (JCTVC-F747r3), it is possible to realize the quantization matrix parameter set discussed earlier at little cost. In addition, it becomes possible to use a quantization matrix present flag to partially update only the quantization matrix parameters from among the parameters relating to various encoding tools potentially included in the APS, or alternatively, partially not update only the quantization matrix parameters. In other words, since it is possible to include quantization matrix parameters in the APS only when updating the quantization matrix becomes necessary, quantization matrix parameters can be efficiently transmitted inside the APS.

6-2. Exemplary Modification of First Technique

A technique in accordance with the exemplary modification described below may also be implemented in order to further reduce the amount of codes of quantization matrix parameters inside the APS.

FIG. 27 illustrates an example of APS syntax defined according to an exemplary modification of the first technique. In the syntax illustrated in FIG. 27, the QM-related parameters are specified on line 24 to line 33. The "aps_qmatrix_flag" on line 24 is a quantization matrix present flag indicating whether QM-related parameters are set inside that APS. The "ref_aps_id_present_flag" on line 25 is a past reference ID present flag indicating whether a past reference ID is to be used as the QM-related parameter in that APS. In the case where the past reference ID present flag indicates that a past reference ID is to be used (ref_aps_id_present_flag=1), a past reference ID "ref_aps_id" is set on line 27. The past reference ID is an identifier for referencing the APS ID of an APS encoded or decoded before the current APS. In the case where a past reference ID is used, quantization matrix parameters are not set inside the reference source (latter) APS. In this case, the setting section 170 illustrated in FIG. 8 reuses the quantization matrices set on the basis of the quantization matrix parameters in the reference target APS indicated by the past reference ID as quantization matrices corresponding to the reference source APS. Note that a past reference ID referencing the APS ID of a reference source APS (what is called self-reference) may be prohibited. Instead, the setting section 170 may set the default quantization matrix as the quantization matrix corresponding to the self-referencing APS. In the case where a past reference ID is not used (ref_aps_id_present_flag=0), the function "qmatrix_param( )" on line 31 may be used to set quantization matrix parameters inside that APS.

In this way, by using a past reference ID to reuse already encoded or decoded quantization matrices, repeatedly setting the same quantization matrix parameters inside APSs is avoided. Thus, the amount of codes of quantization matrix parameters inside the APS can be reduced. Note that although FIG. 27 illustrates an example in which the APS ID is used in order to reference a past APS, the means of referencing a past APS is not limited to such an example. For example, another parameter such as the number of APSs between the reference source APS and the reference target APS may also be used in order to reference a past APS. Also, instead of using the past reference ID present flag, the referencing of a past APS and the setting of new quantization matrix parameters may be switched depending on whether or not the past reference ID indicates a given value (minus one, for example.)

6-3. Second Technique

The second technique is a technique that stores parameters in different APSs (different NAL units) for each class of parameter, and references each parameter using an APS ID that uniquely identifies each APS. FIG. 28 illustrates an example of an encoded stream configured according to the second technique.

Referring to FIG. 28, an SPS 811, a PPS 812, an APS 813a, an APS 813b, and an APS 813c are inserted at the start of a picture P0 positioned at the start of a sequence. The PPS 812 is identified by the PPS ID "P0". The APS 813a is an APS for ALF-related parameters, and is identified by the APS ID "A00". The APS 813b is an APS for SAO-related parameters, and is identified by the APS ID "A10". The APS 813c is an APS for QM-related parameters, and is identified by the APS ID "A20". A slice header 814 attached to slice data inside the picture P0 includes a reference PPS ID "P0", and this means that parameters inside the PPS 812 are referenced in order to decode that slice data. Similarly, the slice header 814 includes a reference APS_ALF ID "A00", a reference APS_SAO ID "A10", and a reference APS_QM ID "A20", and these mean that parameters inside the APSs 813a, 813b, and 813c are referenced in order to decode that slice data.

An APS 815a and an APS 815b are inserted into a picture P1 following the picture P0. The APS 815a is an APS for ALF-related parameters, and is identified by the APS ID "A01". The APS 815b is an APS for SAO-related parameters, and is identified by the APS ID "A11". Since the QM-related parameters are not updated from the picture P0, an APS for QM-related parameters is not inserted. A slice header 816 attached to slice data inside the picture P1 includes a reference APS_ALF ID "A01", a reference APS_SAO ID "A11", and a reference APS_QM ID "A20". These mean that parameters inside the APSs 815a, 815b, and 813c are referenced in order to decode that slice data.

An APS 817a and an APS 817c are inserted into a picture P2 following the picture P1. The APS 817a is an APS for ALF-related parameters, and is identified by the APS ID "A02". The APS 817c is an APS for QM-related parameters, and is identified by the APS ID "A21". Since the SAO-related parameters are not updated from the picture P1, an APS for SAO-related parameters is not inserted. A slice header 818 attached to slice data inside the picture P2 includes a reference APS_ALF ID "A02", a reference APS_SAO ID "A11", and a reference APS_QM ID "A21". These mean that parameters inside the APSs 817a, 815b, and 817c are referenced in order to decode that slice data.

The APS for QM-related parameters in the second technique (the APSs 813c and 817c, for example) are substantially equal to the QMPS discussed earlier. The APS ID of the APS for QM-related parameters is used instead of the QMPS ID described using FIG. 3. According to the second technique, since different APSs are used for each class of parameters, the transmission of redundant parameters is not conducted for parameters that do not require updating. For this reason, the encoding efficiency may be optimized. However, with the second technique, as the classes of parameters to be incorporated into the APS increase, there is an increase in the classes of NAL unit types (nal_unit_type), an identifier for identifying classes of APSs. In the standard specification of HEVC, there are a limited number of NAL unit types (nal_unit_type) reserved for extensions. Consequently, it is beneficial to consider a structure that avoids expending many NAL unit types for APSs.

6-4. Third Technique

The third technique is a technique that incorporates quantization matrix parameters and other parameters into the APS, and groups these parameters by individual identifiers defined separately from the APS ID. In this specification, this identifier assigned to each group and defined separately from the APS ID is called the sub-identifier (SUB ID). Each parameter is referenced using the sub-identifier in the slice header. FIG. 29 illustrates an example of an encoded stream configured according to the third technique.

Referring to FIG. 29, an SPS 821, a PPS 822, and an APS 823 are inserted at the start of a picture P0 positioned at the start of a sequence. The PPS 822 is identified by the PPS ID "P0". The APS 823 includes ALF-related parameters, SAO-related parameters, and QM-related parameters. The ALF-related parameters belong to one group, and are identified by a SUB_ALF ID "AA0", a sub-identifier for ALF. The SAO-related parameters belong to one group, and are identified by a SUB_SAO ID "AS0", a sub-identifier for SAO. The QM-related parameters belong to one group, and are identified by a SUB_QM ID "AQ0", a sub-identifier for QM. A slice header 824 attached to slice data inside the picture P0 includes a reference SUB_ALF ID "AA0", a reference SUB_SAO ID "AS0", and a reference SUB_QM ID "AQ0". These mean that the ALF-related parameters belonging to the SUB_ALF ID "AA0", the SAO-related parameters belonging to the SUB_SAO ID "AS0", and the QM-related parameters belonging to the SUB_QM ID "AQ0" are referenced in order to decode that slice data.

An APS 825 is inserted into a picture P1 following the picture P0. The APS 825 includes ALF-related parameters and SAO-related parameters. The ALF-related parameters are identified by a SUB_ALF ID "AA1". The SAO-related parameters are identified by a SUB_SAO ID "AS1". Since the QM-related parameters are not updated from the picture P0, QM-related parameters are not included in the APS 825. A slice header 826 attached to slice data inside the picture P1 includes a reference SUB_ALF ID "AA1", a reference SUB_SAO ID "AS1", and a reference SUB_QM ID "AQ0". These mean that the ALF-related parameters belonging to the SUB_ALF ID "AA1" and the SAO-related parameters belonging to the SUB_SAO ID "AS1" inside the APS 825, as well as the QM-related parameters belonging to the SUB_QM ID "AQ0" inside the APS 823, are referenced in order to decode that slice data.

An APS 827 is inserted into a picture P2 following the picture P1. The APS 827 includes ALF-related parameters and QM-related parameters. The ALF-related parameters are identified by a SUB_ALF ID "AA2". The QM-related parameters are identified by a SUB_QM ID "AQ1". Since the SAO-related parameters are not updated from the picture P1, SAO-related parameters are not included in the APS 827. A slice header 828 attached to slice data inside the picture P2 includes a reference SUB_ALF ID "AA2", a reference SUB_SAO ID "AS1", and a reference SUB_QM ID "AQ1". These mean that the ALF-related parameters belonging to the SUB_ALF ID "AA2" and the QM-related parameters belonging to the SUB_QM ID "AQ1" inside the APS 827, as well as the SAO-related parameters belonging to the SUB_SAO ID "AS1" inside the APS 825, are referenced in order to decode that slice data.

Figure 30:
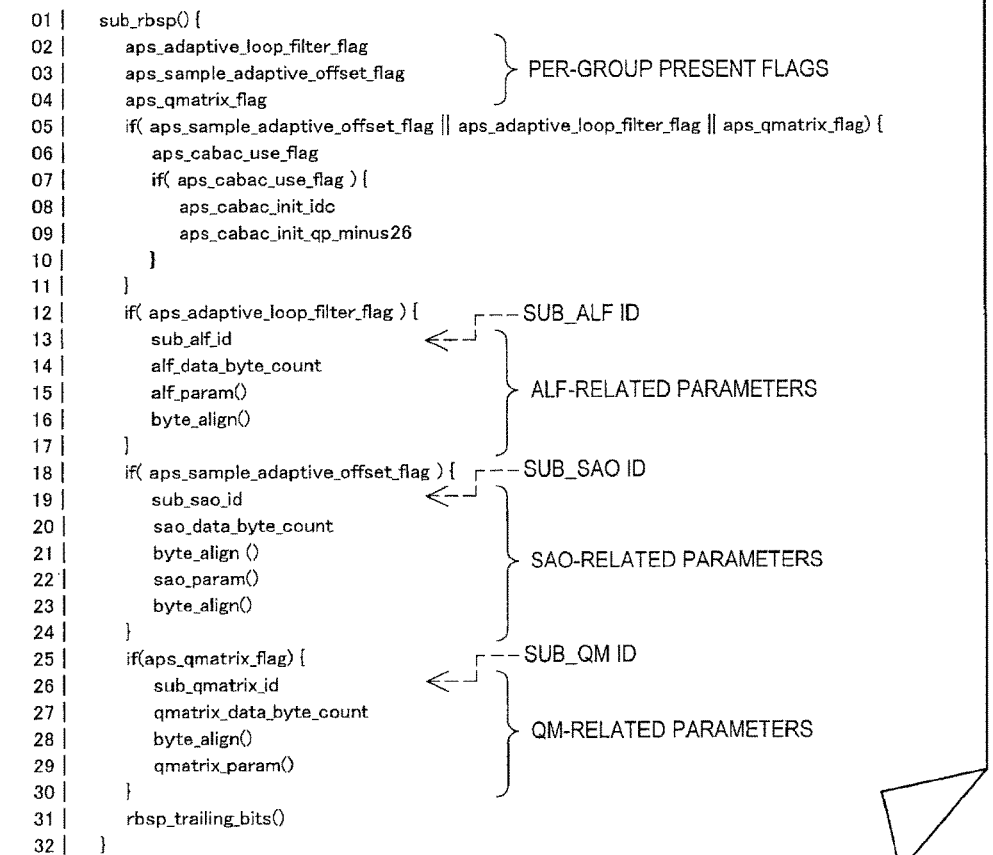
FIG. 30 is an explanatory diagram illustrating an example of APS syntax defined in accordance with a third technique that uses an APS.

FIG. 30 illustrates an example of APS syntax defined according to the third technique. On line 2 to line 4 of FIG. 30, three group present flags "aps_adaptive_loop_filter_flag", "aps_sample_adaptive_offset_flag", and "aps_qmatrix_flag" are specified. The group present flags indicate whether or not parameters belonging to the respective groups are included in that APS. Although the APS ID is omitted from the syntax in the example in FIG. 30, an APS ID for identifying that APS may also be added within the syntax. The ALF-related parameters are specified on line 12 to line 17. The "sub_alf_id" on line 13 is a sub-identifier for ALF. The SAO-related parameters are specified on line 18 to line 24. The "sub_sao_id" on line 19 is a sub-identifier for SAO. The QM-related parameters are specified on line 25 to line 30. The "sub_qmatrix_id" on line 26 is a sub-identifier for QM. The "qmatrix_param( )" on line 29 is a function specifying quantization matrix parameters as illustrated by example in FIGS. 13 to 20.

FIG. 31 is an explanatory diagram illustrating an example of slice header syntax defined in accordance with the third technique. On line 5 in FIG. 31, there is specified a reference PPS ID for referencing parameters included in the PPS from among the parameters to be set for that slice. On line 8, there is specified a reference SUB_ALF ID for referencing ALF-related parameters from among the parameters to be set for that slice. On line 9, there is specified a reference SUB_SAO ID for referencing SAO-related parameters from among the parameters to be set for that slice. On line 10, there is specified a reference SUB_QM ID for referencing QM-related parameters from among the parameters to be set for that slice.

In the case of implementing the third technique, the parameter generating section 130 of the syntax processing section 13 of the image encoding device 10 attaches a new SUB_QM ID as a sub-identifier to an updated group of quantization matrix parameters every time the quantization matrix parameters are updated. The inserting section 130 then inserts the quantization matrix parameters with the attached SUB_QM ID into the APS, together with other parameters. The parameter acquiring section 160 of the syntax processing section 61 of the image decoding device 60 uses the reference SUB_QM ID designated in the slice header to acquire, from an APS, quantization matrix parameters to be set for each slice.

According to the third technique, parameters are grouped inside the APS by using sub-identifiers, and the transmission of redundant parameters is not conducted for parameters in groups that do not require updating. For this reason, the encoding efficiency may be optimized. Also, since the classes of APSs do not increase even if the classes of parameters increase, large numbers of NAL unit types are not expended as with the second technique discussed earlier. Consequently, the third technique does not compromise the flexibility of future extensions.

In the example in FIGS. 29 to 31, parameters included in the APS are grouped according to encoding tools relating to ALF, SAO, and QM. However, this is merely one example of grouping parameters. The APS may also include parameters relating to other encoding tools. For example, AIF-related parameters such as filter coefficients for an adaptive interpolation filter (AIF) are one example of parameters that may be incorporated into the APS. Hereinafter, various criteria for grouping parameters to be incorporated into the APS will be discussed with reference to FIG. 32.

The table illustrated in FIG. 32 lists "Parameter contents", "Update frequency", and "Data size" as features of respective parameters in typical encoding tools.

The adaptive loop filter (ALF) is a filter (typically a Wiener filter) that two-dimensionally filters a decoded image with filter coefficients that are adaptively determined so as to minimize the error between the decoded image and the original image. ALF-related parameters include filter coefficients to be applied to each block, and an on/off flag for each coding unit (CU). The data size of ALF filter coefficients is extremely large compared to other classes of parameters. For this reason, ALF-related parameters are ordinarily transmitted for high-rate I pictures, whereas the transmission of ALF-related parameters may be omitted for low-rate B pictures. This is because transmitting ALF-related parameters with a large data size for low-rate pictures is inefficient from a gain perspective. In most cases, the ALF filter coefficients vary for each picture. Since the filter coefficients depend on the image content, the likelihood of being able to reuse previously set filter coefficients is low.

The sample adaptive offset (SAO) is a tool that improves the image quality of a decoded image by adding an adaptively determined offset value to each pixel value in a decoded image. SAO-related parameters include offset patterns and offset values. The data size of SAO-related parameters is not as large as ALF-related parameters. SAO-related parameters likewise vary for each picture as a general rule. However, since SAO-related parameters have the property of not changing very much even if the image content changes slightly, there is a possibility of being able to reuse previously set parameter values.

The quantization matrix (QM) is a matrix whose elements are quantization scales used when quantizing transform coefficients transformed from image data by orthogonal transform. QM-related parameters, or in other words quantization matrix parameters, are as described in detail in this specification. The data size of QM-related parameters is larger than SAO-related parameters. The quantization matrix is required for all pictures as a general rule, but does not necessarily required updating for every picture if the image content does not change greatly. For this reason, the quantization matrix may be reused for the same picture types (such as I/P/B pictures), or for each GOP.

The adaptive interpolation filter (AIF) is a tool that adaptively varies the filter coefficients of an interpolation filter used during motion compensation for each sub-pixel position. AIF-related parameters include filter coefficients for respective sub-pixel positions. The data size of AIF-related parameters is small compared to the above three classes of parameters. AIF-related parameters vary for each picture as a general rule. However, since the same picture types tend to have similar interpolation properties, AIF-related parameters may be reused for the same picture types (such as I/P/B pictures).

On the basis of the above parameter qualities, the following three criteria, for example, may be adopted for the purpose of grouping parameters included in the APS:

Criterion A) Grouping according to encoding tool
Criterion B) Grouping according to update frequency
Criterion C) Grouping according to likelihood of parameter reuse Criterion A is a criterion that groups parameters according to their related encoding tools. The parameter set structure illustrated by example in FIGS. 29 to 31 are based on criterion A. Since the qualities of parameters are generally determined according to their related encoding tools, grouping parameters by encoding tool makes it possible to make timely and efficient parameter updates according to the various qualities of the parameters.

Criterion B is a criterion that groups parameters according to their update frequency. As illustrated in FIG. 32, ALF-related parameters, SAO-related parameters, and AIF-related parameters all may be updated every picture as a general rule. Thus, these parameters can be grouped into a single group while QM-related parameters are grouped into another group, for example. In this case, there are fewer groups compared to criterion A. As a result, there are also fewer sub-identifiers to specify in the slice header, and the amount of codes of the slice header can be reduced. Meanwhile, since the update frequencies of parameters belonging to the same group resemble each other, the likelihood of redundantly transmitting non-updated parameters in order to update other parameters is kept low.

Criterion A is a criterion that groups parameters according to the likelihood of parameter reuse. Although ALF-related parameters are unlikely to be reused, SAO-related parameters and AIF-related parameters are somewhat likely to be reused. With QM-related parameters, the parameters are highly likely to be reused over multiple pictures. Consequently, by grouping parameters according to their likelihood of reuse in this way, the redundant transmission of reused parameters inside the APS can be avoided.

6-5. Exemplary Modification of Third Technique

With the third technique discussed above, the number of groups into which parameters are grouped inside the APS results in an equal number of reference SUB IDs specified in the slice headers, as illustrated by example in FIG. 31. The amount of codes required by the reference SUB IDs is approximately proportional to the product of the number of slice headers and the number of groups. A technique in accordance with the exemplary modification described below may also be implemented in order to further reduce such a rate.

Figure 33:
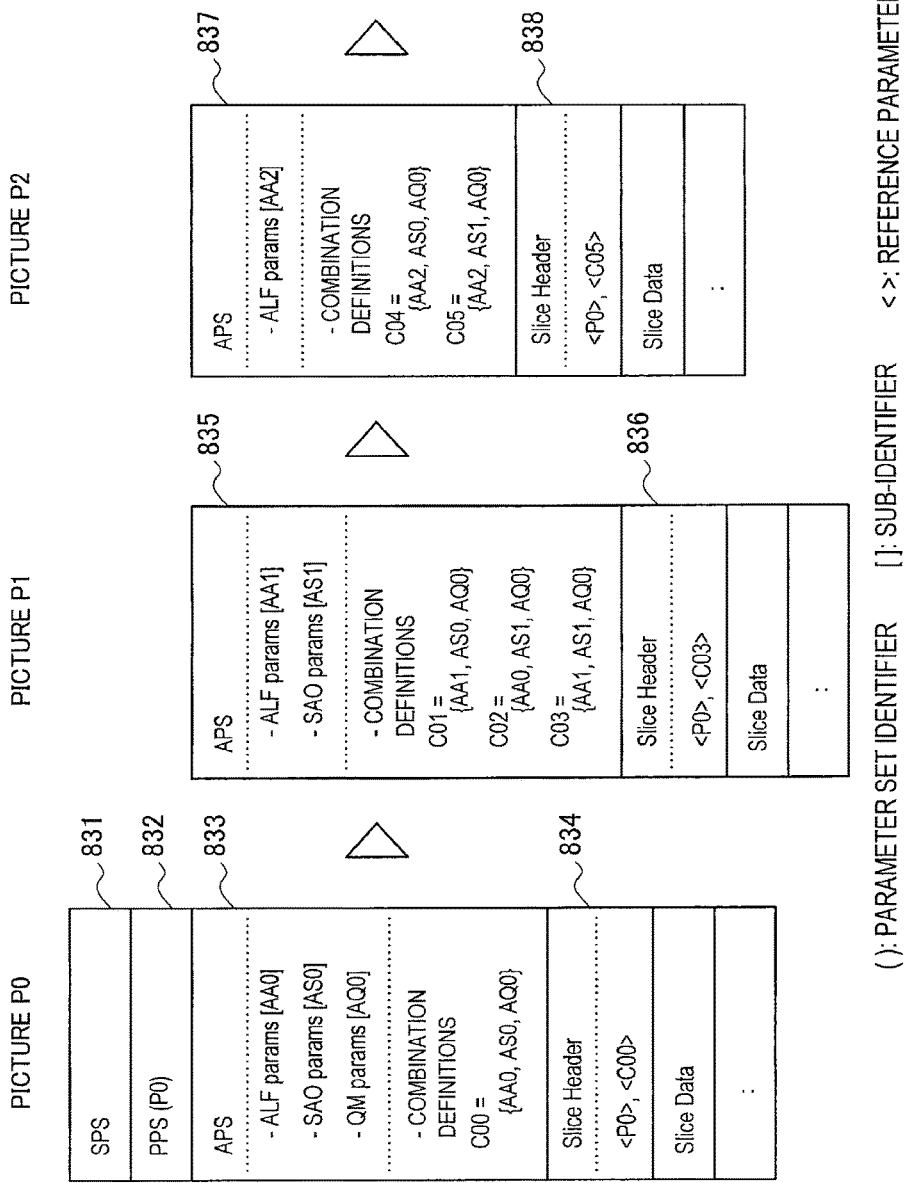
FIG. 33 is an explanatory diagram for explaining an example of an encoded stream structured in accordance with an exemplary modification of a third technique that uses an APS.

In the exemplary modification of the third technique, a combination ID associated with a combination of sub-identifiers is defined inside the APS or other parameter set. Parameters included inside the APS may then be referenced from a slice header via the combination ID. FIG. 33 illustrates an example of an encoded stream configured according to such an exemplary modification of the third technique.

Referring to FIG. 33, an SPS 831, a PPS 832, and an APS 833 are inserted at the start of a picture P0 positioned at the start of a sequence. The PPS 832 is identified by the PPS ID "P0". The APS 833 includes ALF-related parameters, SAO-related parameters, and QM-related parameters. The ALF-related parameters are identified by a SUB_ALF ID "AA0". The SAO-related parameters are identified by a SUB_SAO ID "AS0". The QM-related parameters are identified by a SUB_QM ID "AQ0". Additionally, the APS 833 includes a combination ID "C00"={AA0, AS0, AQ0} as a definition of a combination. A slice header 834 attached to slice data in the picture P0 includes the combination ID "COO". This means that the ALF-related parameters belonging to the SUB_ALF ID "AA0", the SAO-related parameters belonging to the SUB_SAO ID "AS0", and the QM-related parameters belonging to the SUB_QM ID "AQ0" that are respectively associated with the combination ID "COO" are referenced in order to decode that slice data.

An APS 835 is inserted into a picture P1 following the picture P0. The APS 835 includes ALF-related parameters and SAO-related parameters. The ALF-related parameters are identified by a SUB_ALF ID "AA1". The SAO-related parameters are identified by a SUB_SAO ID "AS1". Since the QM-related parameters are not updated from the picture P0, QM-related parameters are not included in the APS 835. Additionally, the APS 835 includes a combination ID "C01"={AA1, AS0, AQ0}, a combination ID "C02"={AA0, AS1, AQ0}, and a combination ID "C03"={AA1, AS1, AQ0} as definitions of combinations. A slice header 836 attached to slice data in the picture P1 includes the combination ID "C03". This means that the ALF-related parameters belonging to the SUB_ALF ID "AA1", the SAO-related parameters belonging to the SUB_SAO ID "AS1", and the QM-related parameters belonging to the SUB_QM ID "AQ0" that are respectively associated with the combination ID "C03" are referenced in order to decode that slice data.

An APS 837 is inserted into a picture P2 following the picture P1. The APS 837 includes ALF-related parameters. The ALF-related parameters are identified by a SUB_ALF ID "AA2". Since the SAO-related parameters and the QM-related parameters are not updated from the picture P1, SAO-related parameters and QM-related parameters are not included in the APS 837. Additionally, the APS 837 includes a combination ID "C04"={AA2, AS0, AQ0} and a combination ID "C05"={AA2, AS1, AQ0} as definitions of combinations. A slice header 838 attached to slice data in the picture P2 includes the combination ID "C05". This means that the ALF-related parameters belonging to the SUB_ALF ID "AA2", the SAO-related parameters belonging to the SUB_SAO ID "AS1", and the QM-related parameters belonging to the SUB_QM ID "AQ0" that are respectively associated with the combination ID "C05" are referenced in order to decode that slice data.

Note that in this exemplary modification, combination IDs may not be defined for all combinations of sub-identifiers, such that combinations IDs are defined only for the combinations of sub-identifiers actually referenced in a slice header. Also, combinations of sub-identifiers may be defined inside an APS different from the APS where the corresponding parameters are stored.

In the case of implementing this exemplary modification, the parameter generating section 130 of the syntax processing section 13 of the image encoding device 10 generates combination IDs as supplemental parameters, which are to be associated with combinations of sub-identifiers that group various parameters, including quantization matrix parameters. The inserting section 130 then inserts the combination IDs generated by the parameter generating section 130 into an APS or another parameter set. The parameter acquiring section 160 of the syntax processing section 61 of the image decoding device 60 acquires the combination ID designated in the slice header of each slice, and uses the sub-identifiers associated with that combination ID to additionally acquire quantization matrix parameters inside the APS.

In this way, by using a combination ID associated with combinations of sub-identifiers to reference parameters inside the APS, the amount of codes required to reference each parameter from the slice headers can be reduced.

7. Example Application

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to client devices via cellular communication, and the like, a recording device that records images onto a medium such as an optical disc, a magnetic disk, or flash memory, and a playback device that plays back images from such storage media. Four example applications will be described below.

7-1. First Example Application

Figure 34:
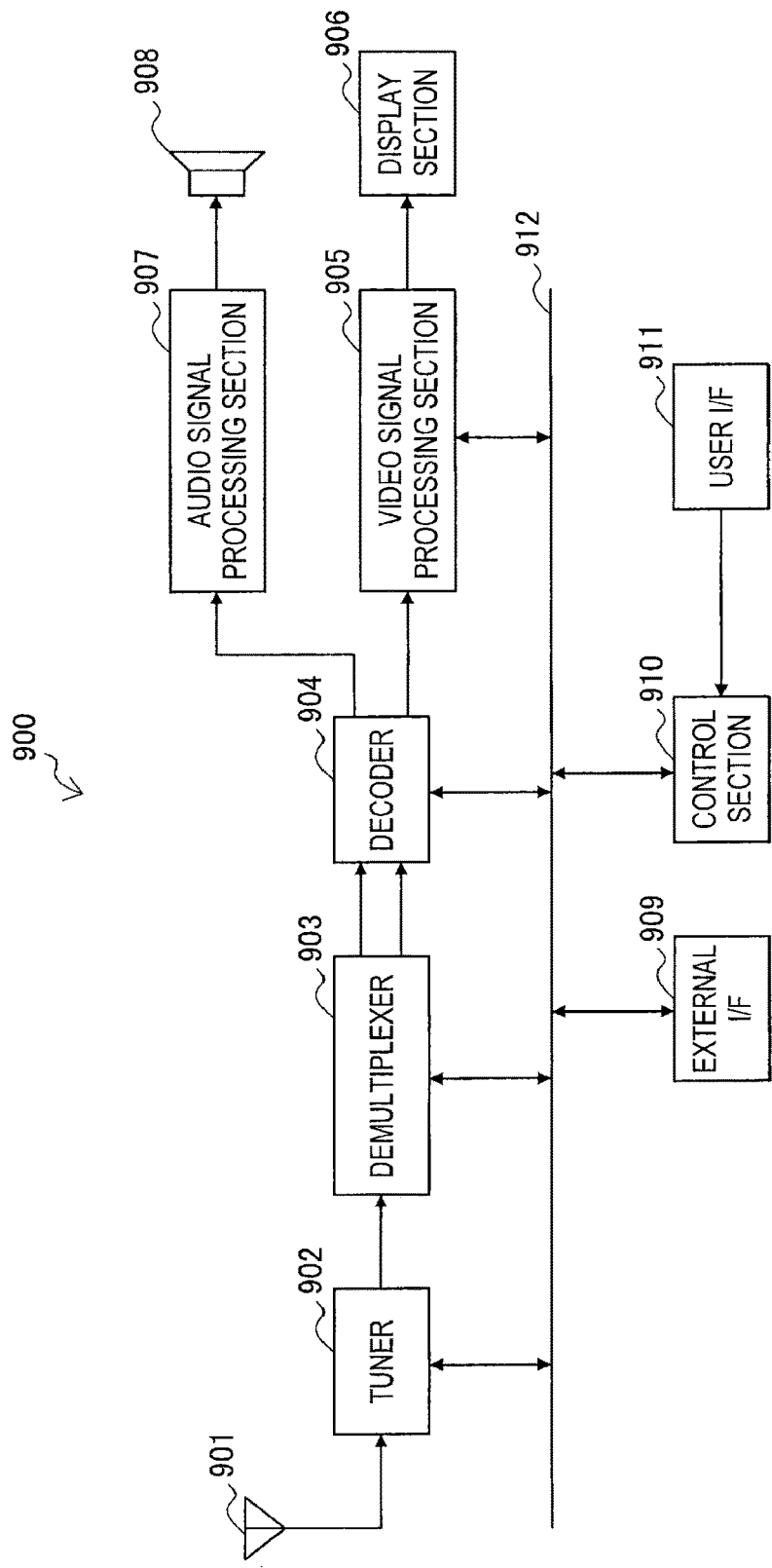
FIG. 34 is a block diagram illustrating an example of a schematic configuration of a television.

FIG. 34 is a block diagram illustrating an exemplary schematic configuration of a television adopting the embodiment described above. A television 900 includes an antenna 901, a tuner 902, a demultiplexer 903, a decoder 904, a video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. Then, the tuner 902 outputs an encoded bit stream obtained by demodulation to the demultiplexer 903. That is, the tuner 902 serves as transmission means of the television 900 for receiving an encoded stream in which an image is encoded.

The demultiplexer 903 separates a video stream and an audio stream of a program to be viewed from the encoded bit stream, and outputs the separated streams to the decoder 904. Also, the demultiplexer 903 extracts auxiliary data such as an electronic program guide (EPG) from the encoded bit stream, and supplies the extracted data to the control section 910. Additionally, the demultiplexer 903 may perform descrambling in the case where the encoded bit stream is scrambled.

The decoder 904 decodes the video stream and the audio stream input from the demultiplexer 903. Then, the decoder 904 outputs video data generated by the decoding process to the video signal processing section 905. Also, the decoder 904 outputs the audio data generated by the decoding process to the audio signal processing section 907.

The video signal processing section 905 plays back the video data input from the decoder 904, and causes the display section 906 to display the video. The video signal processing section 905 may also cause the display section 906 to display an application screen supplied via a network. Further, the video signal processing section 905 may perform additional processes such as noise removal, for example, on the video data according to settings. Furthermore, the video signal processing section 905 may generate graphical user interface (GUI) images such as menus, buttons, or a cursor, for example, and superimpose the generated images onto an output image.

The display section 906 is driven by a drive signal supplied by the video signal processing section 905, and displays a video or an image on a video screen of a display device (such as a liquid crystal display, a plasma display, or an OLED display, for example).

The audio signal processing section 907 performs playback processes such as D/A conversion and amplification on the audio data input from the decoder 904, and outputs audio from the speaker 908. Also, the audio signal processing section 907 may perform additional processes such as noise removal on the audio data.

The external interface 909 is an interface for connecting the television 900 to an external appliance or a network. For example, a video stream or an audio stream received via the external interface 909 may be decoded by the decoder 904. That is, the external interface 909 also serves as transmission means of the televisions 900 for receiving an encoded stream in which an image is encoded.

The control section 910 includes a processor such as a central processing unit (CPU), and memory such as random access memory (RAM), and read-only memory (ROM). The memory stores a program to be executed by the CPU, program data, EPG data, data acquired via a network, and the like. The program stored in the memory is read and executed by the CPU when activating the television 900, for example. By executing the program, the CPU controls the operation of the television 900 according to an operation signal input from the user interface 911, for example.

The user interface 911 is connected to the control section 910. The user interface 911 includes buttons and switches used by a user to operate the television 900, and a remote control signal receiver, for example. The user interface 911 detects an operation by the user via these structural elements, generates an operation signal, and outputs the generated operation signal to the control section 910.

The bus 912 interconnects the tuner 902, the demultiplexer 903, the decoder 904, the video signal processing section 905, the audio signal processing section 907, the external interface 909, and the control section 910.

In a television 900 configured in this way, the decoder 904 includes the functions of an image decoding device 60 according to the foregoing embodiments. Consequently, it is possible to moderate the decrease in encoding efficiency for video decoded by the television 900, or improve the encoding efficiency.

7-2. Second Example Application

Figure 35:
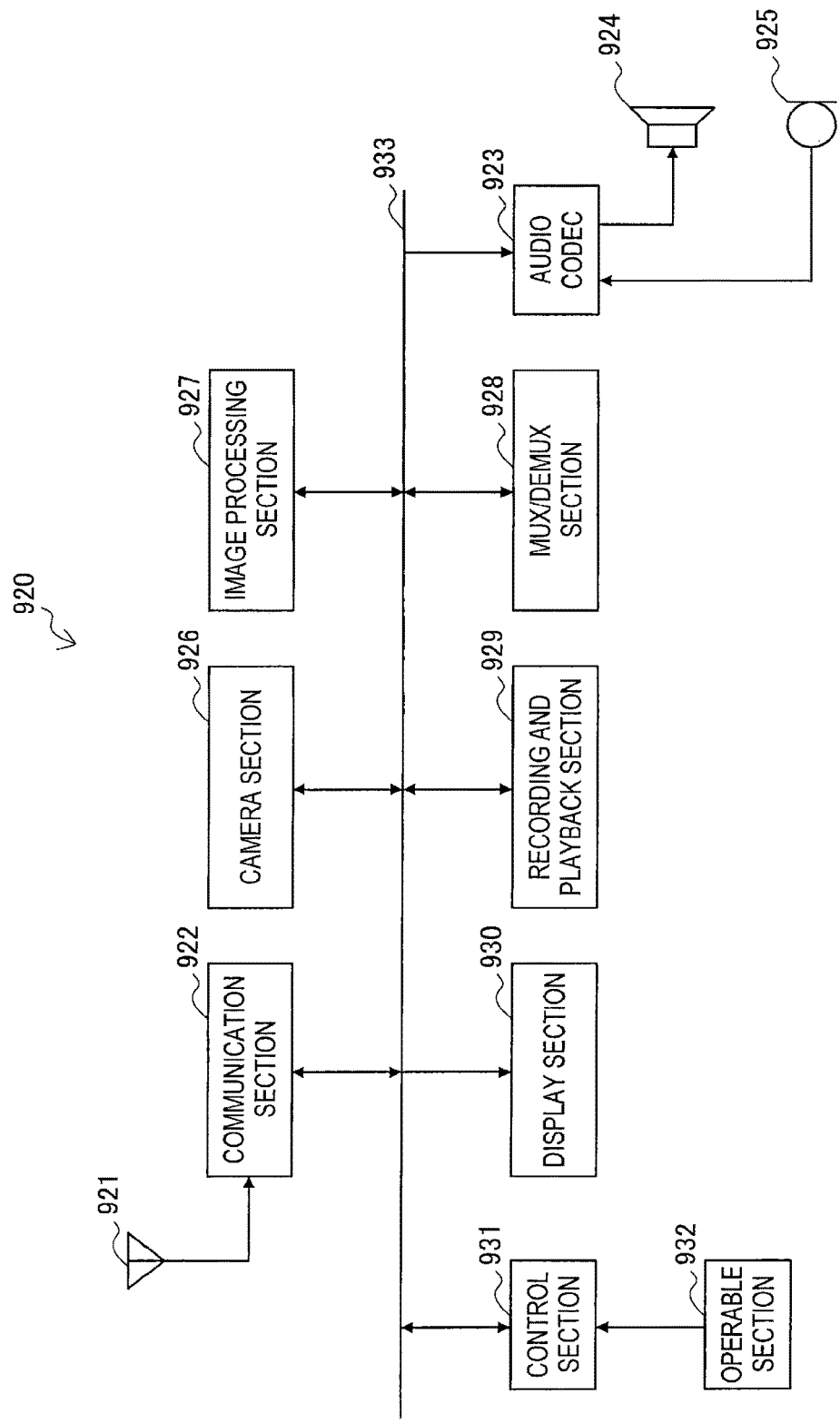
FIG. 35 is a block diagram illustrating an example of a schematic configuration of a mobile phone.

FIG. 35 is a block diagram illustrating an exemplary schematic configuration of a mobile phone adopting the embodiment described above. A mobile phone 920 includes an antenna 921, a communication section 922, an audio codec 923, a speaker 924, a microphone 925, a camera section 926, an image processing section 927, a multiplexing/demultiplexing (mux/demux) section 928, a recording and playback section 929, a display section 930, a control section 931, an operable section 932, and a bus 933.

The antenna 921 is connected to the communication section 922. The speaker 924 and the microphone 925 are connected to the audio codec 923. The operable section 932 is connected to the control section 931. The bus 933 interconnects the communication section 922, the audio codec 923, the camera section 926, the image processing section 927, the mux/demux section 928, the recording and playback section 929, the display 930, and the control section 931.

The mobile phone 920 performs operations such as transmitting and receiving audio signals, transmitting and receiving emails or image data, taking images, and recording data in various operating modes including an audio communication mode, a data communication mode, an imaging mode, and a videophone mode.

In the audio communication mode, an analog audio signal generated by the microphone 925 is supplied to the audio codec 923. The audio codec 923 converts the analog audio signal into audio data, and A/D converts and compresses the converted audio data. Then, the audio codec 923 outputs the compressed audio data to the communication section 922. The communication section 922 encodes and modulates the audio data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 decompresses and D/A converts the audio data, and generates an analog audio signal. Then, the audio codec 923 supplies the generated audio signal to the speaker 924 and causes audio to be output.

Also, in the data communication mode, the control section 931 generates text data that makes up an email, according to operations by a user via the operable section 932, for example. Moreover, the control section 931 causes the text to be displayed on the display section 930. Furthermore, the control section 931 generates email data according to transmit instructions from the user via the operable section 932, and outputs the generated email data to the communication section 922. The communication section 922 encodes and modulates the email data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal, reconstructs the email data, and outputs the reconstructed email data to the control section 931. The control section 931 causes the display section 930 to display the contents of the email, and also causes the email data to be stored in the storage medium of the recording and playback section 929.

The recording and playback section 929 includes an arbitrary readable and writable storage medium. For example, the storage medium may be a built-in storage medium such as RAM, or flash memory, or an externally mounted storage medium such as a hard disk, a magnetic disk, a magneto-optical disc, an optical disc, USB memory, or a memory card.

Furthermore, in the imaging mode, the camera section 926 takes an image of a subject, generates image data, and outputs the generated image data to the image processing section 927, for example. The image processing section 927 encodes the image data input from the camera section 926, and causes the encoded stream to be stored in the storage medium of the recording and playback section 929.

Furthermore, in the videophone mode, the mux/demux section 928 multiplexes a video stream encoded by the image processing section 927 and an audio stream input from the audio codec 923, and outputs the multiplexed stream to the communication section 922, for example. The communication section 922 encodes and modulates the stream, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. The transmit signal and received signal may include an encoded bit stream. Then, the communication section 922 demodulates and decodes the received signal, reconstructs the stream, and outputs the reconstructed stream to the mux/demux section 928. The mux/demux section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 decompresses and D/A converts the audio stream, and generates an analog audio signal. Then, the audio codec 923 supplies the generated audio signal to the speaker 924 and causes audio to be output.

In a mobile phone 920 configured in this way, the image processing section 927 includes the functions of the image encoding device 10 and the image decoding device 60 according to the foregoing embodiments. Consequently, it is possible to moderate the decrease in encoding efficiency for video encoded and decoded by the mobile phone 920, or improve the encoding efficiency.

7-3. Third Example Application

Figure 36:
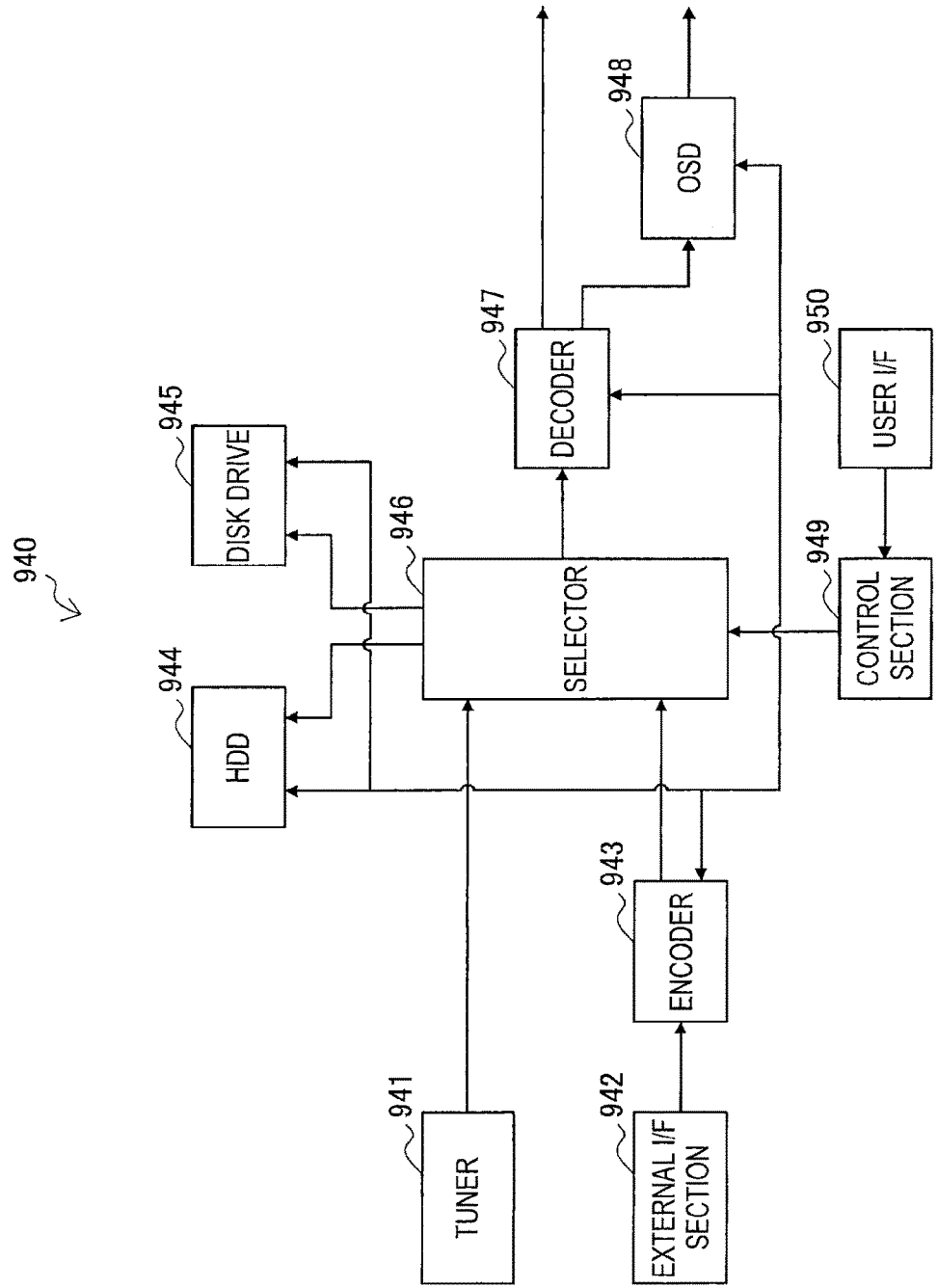
FIG. 36 is a block diagram illustrating an example of a schematic configuration of a recording and playback device.

FIG. 36 is a block diagram illustrating an exemplary schematic configuration of a recording and playback device adopting the embodiment described above. A recording and playback device 940 encodes, and records onto a recording medium, the audio data and video data of a received broadcast program, for example. The recording and playback device 940 may also encode, and record onto the recording medium, audio data and video data acquired from another device, for example. Furthermore, the recording and playback device 940 plays back data recorded onto the recording medium via a monitor and speaker according to instructions from a user, for example. At such times, the recording and playback device 940 decodes the audio data and the video data.

The recording and playback device 940 includes a tuner 941, an external interface 942, an encoder 943, a hard disk drive (HDD) 944, a disc drive 945, a selector 946, a decoder 947, an on-screen display (OSD) 948, a control section 949, and a user interface 950.

The tuner 941 extracts a signal of a desired channel from broadcast signals received via an antenna (not illustrated), and demodulates the extracted signal. Then, the tuner 941 outputs an encoded bit stream obtained by demodulation to the selector 946. That is, the tuner 941 serves as transmission means of the recording and playback device 940.

The external interface 942 is an interface for connecting the recording and playback device 940 to an external appliance or a network. For example, the external interface 942 may be an IEEE 1394 interface, a network interface, a USB interface, a flash memory interface, or the like. For example, video data and audio data received by the external interface 942 are input into the encoder 943. That is, the external interface 942 serves as transmission means of the recording and playback device 940.

In the case where the video data and the audio data input from the external interface 942 are not encoded, the encoder 943 encodes the video data and the audio data. Then, the encoder 943 outputs the encoded bit stream to the selector 946.

The HDD 944 records onto an internal hard disk an encoded bit stream, which is compressed content data such as video or audio, various programs, and other data. Also, the HDD 944 reads such data from the hard disk when playing back video and audio.

The disc drive 945 records or reads data with respect to an inserted recording medium. The recording medium inserted into the disc drive 945 may be a DVD disc (such as a DVD-Video, DVD-RAM, DVD-R, DVD-RW, DVD+, or DVD+RW disc), a Blu-ray (registered trademark) disc, or the like, for example.

When recording video and audio, the selector 946 selects an encoded bit stream input from the tuner 941 or the encoder 943, and outputs the selected encoded bit stream to the HDD 944 or the disc drive 945. Also, when playing back video and audio, the selector 946 outputs an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 plays back the video data input from the decoder 947, and displays video. Also, the OSD 948 may superimpose GUI images, such as menus, buttons, or a cursor, for example, onto displayed video.

The control section 949 includes a processor such as a CPU, and memory such as RAM or ROM. The memory stores a program to be executed by the CPU, program data, and the like. A program stored in the memory is read and executed by the CPU when activating the recording and playback device 940, for example. By executing the program, the CPU controls the operation of the recording and playback device 940 according to an operation signal input from the user interface 950, for example.

The user interface 950 is connected to the control section 949. The user interface 950 includes buttons and switches used by a user to operate the recording and playback device 940, and a remote control signal receiver, for example. The user interface 950 detects an operation by the user via these structural elements, generates an operation signal, and outputs the generated operation signal to the control section 949.

In a recording and playback device 940 configured in this way, the encoder 943 includes the functions of the image encoding device 10 according to the foregoing embodiments. In addition, the decoder 947 includes the functions of the image decoding device 60 according to the foregoing embodiments. Consequently, it is possible to moderate the decrease in encoding efficiency for video encoded and decoded by the recording and playback device 940, or improve the encoding efficiency.

7-4. Fourth Example Application

Figure 37:
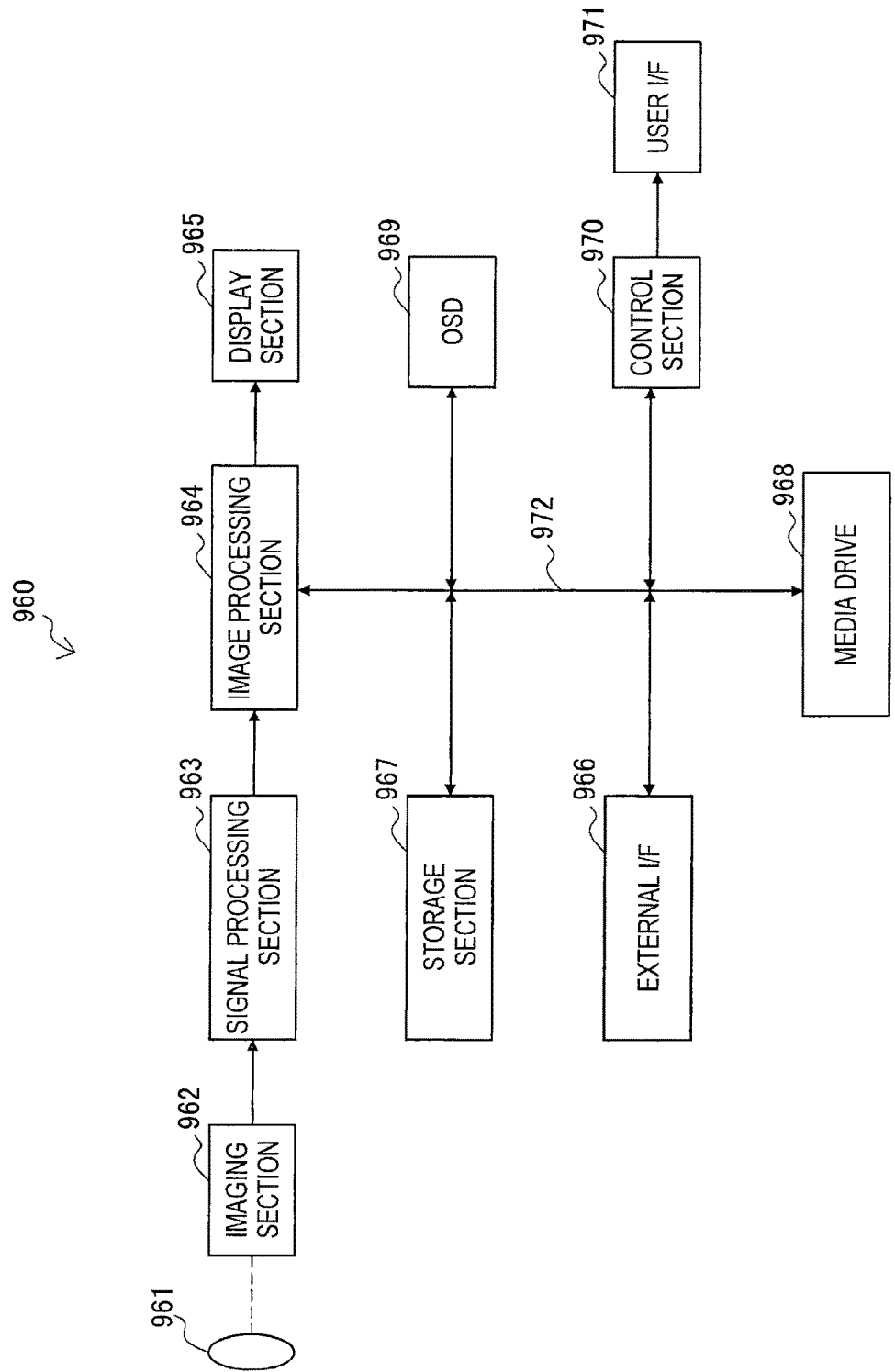
FIG. 37 is a block diagram illustrating an example of a schematic configuration of an imaging device.

FIG. 37 is a block diagram showing an example of a schematic configuration of an imaging device adopting the embodiment described above. An imaging device 960 takes an image of a subject, generates an image, encodes the image data, and records the image data onto a recording medium.

The imaging device 960 includes an optical block 961, an imaging section 962, a signal processing section 963, an image processing section 964, a display section 965, an external interface 966, memory 967, a media drive 968, an OSD 969, a control section 970, a user interface 971, and a bus 972.

The optical block 961 is connected to the imaging section 962. The imaging section 962 is connected to the signal processing section 963. The display section 965 is connected to the image processing section 964. The user interface 971 is connected to the control section 970. The bus 972 interconnects the image processing section 964, the external interface 966, the memory 967, the media drive 968, the OSD 969, and the control section 970.

The optical block 961 includes a focus lens, an aperture stop mechanism, and the like. The optical block 961 forms an optical image of a subject on the imaging surface of the imaging section 962. The imaging section 962 includes an image sensor such as a CCD or CMOS sensor, and photoelectrically converts the optical image formed on the imaging surface into an image signal which is an electrical signal. Then, the imaging section 962 outputs the image signal to the signal processing section 963.

The signal processing section 963 performs various camera signal processes such as knee correction, gamma correction, and color correction on the image signal input from the imaging section 962. The signal processing section 963 outputs the processed image data to the image processing section 964.

The image processing section 964 encodes the image data input from the signal processing section 963, and generates encoded data. Then, the image processing section 964 outputs the encoded data thus generated to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose display data acquired from the OSD 969 onto an image to be output to the display section 965.

The OSD 969 generates GUI images such as menus, buttons, or a cursor, for example, and outputs the generated images to the image processing section 964.

The external interface 966 is configured as an USB input/output terminal, for example. The external interface 966 connects the imaging device 960 to a printer when printing an image, for example. Also, a drive is connected to the external interface 966 as necessary. A removable medium such as a magnetic disk or an optical disc, for example, is inserted into the drive, and a program read from the removable medium may be installed in the imaging device 960. Furthermore, the external interface 966 may be configured as a network interface to be connected to a network such as a LAN or the Internet. That is, the external interface 966 serves as transmission means of the image capturing device 960.

A recording medium to be inserted into the media drive 968 may be an arbitrary readable and writable removable medium, such as a magnetic disk, a magneto-optical disc, an optical disc, or semiconductor memory, for example. Also, a recording medium may be permanently installed in the media drive 968 to constitute a non-portable storage section such as an internal hard disk drive or a solid-state drive (SSD), for example.

The control section 970 includes a processor such as a CPU, and memory such as RAM or ROM. The memory stores a program to be executed by the CPU, program data, and the like. A program stored in the memory is read and executed by the CPU when activating the imaging device 960, for example. By executing the program, the CPU controls the operation of the imaging device 960 according to an operation signal input from the user interface 971, for example.

The user interface 971 is connected to the control section 970. The user interface 971 includes buttons, switches and the like used by a user to operate the imaging device 960, for example. The user interface 971 detects an operation by the user via these structural elements, generates an operation signal, and outputs the generated operation signal to the control section 970.

In an imaging device 960 configured in this way, the image processing section 964 includes the functions of the image encoding device 10 and the image decoding device 60 according to the foregoing embodiments. Consequently, it is possible to moderate the decrease in encoding efficiency for video encoded and decoded by the imaging device 960, or improve the encoding efficiency.

8. Conclusion

The foregoing uses FIGS. 1 to 37 to describe an image encoding device 10 and an image decoding device 60 according to an embodiment. According to the embodiment, quantization matrix parameters defining quantization matrices used when quantizing and inversely quantizing an image are inserted into a quantization matrix parameter set (QMPS) that differs from the sequence parameter set and the picture parameter set. In so doing, it becomes unnecessary both to encode parameters other than quantization matrix parameters when updating a quantization matrix, and to encode quantization matrix parameters when updating parameters other than quantization matrix parameters. Consequently, the decrease in encoding efficiency accompanying the update of the quantization matrix is moderated, or the encoding efficiency is improved. Particularly, the reduction of the amount of codes with the techniques disclosed in this specification becomes even more effective in the case of quantization matrices with larger sizes, or in the case where a larger number of quantization matrices are defined for each picture.

Also, according to the present embodiment, parameters that specify copying a previously generated quantization matrix may be included in the QMPS instead of directly defining a quantization matrix. In this case, the parameters that specify a quantization matrix itself (an array of differential data in DPCM format, for example) are omitted from the QMPS, and thus the amount of codes required to define a quantization matrix can be further reduced.

Also, according to the present embodiment, a QMPS ID is assigned to each QMPS. Then, in copy mode, the QMPS ID of the QMPS defining the copy source quantization matrix may be designated as a source ID. Also, the size and type of the copy source quantization matrix may be designated as the copy source size and the copy source type. Consequently, a quantization matrix in an arbitrary QMPS from among quantization matrices in multiple QMPSs generated previously can be flexibly designated as a copy source quantization matrix. It is also possible to copy and reuse a quantization matrix of a different size or type.

Also, according to the present embodiment, parameters that specify residual components of a quantization matrix to be copied may be included in a QMPS. Consequently, a quantization matrix that is not completely equal to a previously generated quantization matrix can still be generated anew at a low rate.

Also, in axis designation mode, instead of scanning all elements of a quantization matrix, only the values of the elements in the quantization matrix corresponding to three reference axes or the four corners of the quantization matrix may be included in the QMPS. Consequently, it is likewise possible to define a quantization matrix with a small amount of codes in this case.

Also, according to the present embodiment, the quantization matrices to use for each slice are set on the basis of quantization matrix parameters inside the QMPS identified by the QMPS ID designated in the slice header. Consequently, since quantization matrices can be flexibly switched for each slice, the optimal quantization matrix at each point in time can be used to encode or decode video, even in the case where the image characteristics vary from moment to moment.

Note that this specification describes an example in which the quantization matrix parameter set multiplexed into the header of the encoded stream and transmitted from the encoding side to the decoding side. However, the technique of transmitting the quantization matrix parameter set is not limited to such an example. For example, information inside each parameter set may also be transmitted or recorded as separate data associated with an encoded bit stream without being multiplexed into the encoded bit stream. Herein, the term "associated" means that images included in the bit stream (also encompassing partial images such as slices or blocks) and information corresponding to those images can be linked at the time of decoding. In other words, information may also be transmitted on a separate transmission channel from an image (or bit stream). Also, the information may be recorded to a separate recording medium (or a separate recording area on the same recording medium) from the image (or bit stream). Furthermore, information and images (or bit streams) may be associated with each other in arbitrary units such as multiple frames, single frames, or portions within frames, for example.

The foregoing thus describes preferred embodiments of the present disclosure in detail and with reference to the attached drawings. However, the technical scope of the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1)

An image processing device including:

an acquiring section configured to acquire quantization matrix parameters from an encoded stream in which the quantization matrix parameters defining a quantization matrix are set within a parameter set which is different from a sequence parameter set and a picture parameter set;

a setting section configured to set, based on the quantization matrix parameters acquired by the acquiring section, a quantization matrix which is used when inversely quantizing data decoded from the encoded stream; and an inverse quantization section configured to inversely quantize the data decoded from the encoded stream using the quantization matrix set by the setting section.

(2)

The image processing device according to (1), wherein the parameter set containing the quantization matrix parameters is a common parameter set within which other encoding parameters relating to encoding tools other than a quantization matrix can also be set, and the acquiring section acquires the quantization matrix parameters when the quantization matrix parameters are set within the common parameter set.

(3)

The image processing device according to (2), wherein the acquiring section determines whether the quantization matrix parameters are set within the common parameter set by referencing a flag included in the common parameter set.

(4)

The image processing device according to (2) or (3), wherein the common parameter set is an adaptation parameter set.

(5)

The image processing device according to (4), wherein in a case where a reference to a first adaptation parameter set is included in a second adaptation parameter set decoded after the first adaptation parameter set, the setting section reuses a quantization matrix set based on the quantization matrix parameters acquired from the first adaptation parameter set as a quantization matrix corresponding to the second adaptation parameter set.

(6)

The image processing device according to (5), wherein in a case where a reference to a third adaptation parameter set is included within the third adaptation parameter set, the setting section sets a default quantization matrix as a quantization matrix corresponding to the third adaptation parameter set.

(7)

The image processing device according to (1), wherein in a case where a copy parameter instructing to copy a first quantization matrix for a first parameter set is included in a second parameter set, the setting section sets a second quantization matrix by copying the first quantization matrix.

(8)

The image processing device according to (7), wherein each parameter set that includes the quantization matrix parameters has an identifier that identifies each parameter set, and the copy parameter includes an identifier of a parameter set of a copy source.

(9)

The image processing device according to (8), wherein each parameter set includes quantization matrix parameters that respectively define a plurality of classes of quantization matrices, and the copy parameter includes a class parameter designating a class of the first quantization matrix.

(10)

The image processing device according to (8), wherein in a case where the identifier of the parameter set of the copy source included in the third parameter set is equal to an identifier of the third parameter set, the setting section sets a default quantization matrix as a third quantization matrix for the third parameter set.

(11)

The image processing device according to (7), wherein in a case where a size of the second quantization matrix is larger than a size of the first quantization matrix, the setting section sets the second quantization matrix by interpolating elements of the copied first quantization matrix.

(12)

The image processing device according to (7), wherein in a case where a size of the second quantization matrix is smaller than a size of the first quantization matrix, the setting section sets the second quantization matrix by decimating elements of the copied first quantization matrix.

(13)

The image processing device according to (7), wherein in a case where a residual designation parameter designating residual components of a quantization matrix which is copied is included in the second parameter set, the setting section sets the second quantization matrix by adding the residual components to the copied first quantization matrix.

(14)

The image processing device according to (1), wherein each parameter set that includes the quantization matrix parameters has a parameter set identifier that identifies each parameter set, and the inverse quantization section uses, for each slice, a quantization matrix set by the setting section based on quantization matrix parameters included in a parameter set identified by the parameter set identifier designated in a slice header.

(15)

The image processing device according to any one of (7) to (14), wherein the parameter set containing the quantization matrix parameters further includes other encoding parameters relating to encoding tools other than a quantization matrix.

(16)

The image processing device according to (15), wherein the quantization matrix parameters and the other encoding parameters are grouped by a sub-identifier defined separately from a parameter identifier that identifies each parameter set, and the acquiring section acquires the quantization matrix parameters using the sub-identifier.

(17)

The image processing device according to (16), wherein a combination identifier associated with a combination of a plurality of the sub-identifiers is defined in the parameter set or another parameter set, and the acquiring section acquires the combination identifier designated in a slice header of each slice, and acquires the quantization matrix parameters using the sub-identifiers associated with the acquired combination identifier.

(18)

An image processing method including:

acquiring quantization matrix parameters from an encoded stream in which the quantization matrix parameters defining a quantization matrix are set within a parameter set which is different from a sequence parameter set and a picture parameter set;

setting, based on the acquired quantization matrix parameters, a quantization matrix which is used when inversely quantizing data decoded from the encoded stream; and inversely quantizing the data decoded from the encoded stream using the set quantization matrix.

(19)

An image processing device including:

a quantization section configured to quantize data using a quantization matrix;

a setting section configured to set quantization matrix parameters that define a quantization matrix to be used when the quantization section quantizes the data; and an encoding section configured to encode the quantization matrix parameters set by the setting section within a parameter set which is different from a sequence parameter set and a picture parameter set.

(20)

An image processing method including:

quantizing data using a quantization matrix;

setting quantization matrix parameters that define the quantization matrix to be used when quantizing the data; and encoding the set quantization matrix parameters within a parameter set which is different from a sequence parameter set and a picture parameter set.

REFERENCE SIGNS LIST

10 Image processing device (image encoding device)
16 Quantization section
120 Parameter generating section
130 Inserting section
60 Image processing device (image decoding device)
63 Inverse quantization section
160 Parameter acquiring section
170 Setting section

The invention claimed is:

1. An image processing device comprising:
circuitry configured to:
receive an encoded bit stream;
decode, from the encoded bit stream, a first information indicating whether or not a current quantization matrix is to be generated by copying a source quantization matrix, wherein the current quantization matrix has a second identification value;
in the case when the first information indicates that the current quantization matrix is to be generated by copying the source quantization matrix:
decode a second information indicative of a first identification value;
in a case when the first identification value is not equal to the second identification value:
identify the source quantization matrix based at least in part on the first identification value, and based on one or more or none of: a matrix size, and a matrix type;
in a case when the first identification value is equal to the second identification value:
use a default matrix as the source quantization matrix;
generate the current quantization matrix by copying the source quantization matrix; and
use the current quantization matrix to process the image.

2. The image processing device according to claim 1, wherein the matrix type includes at least one combination of a prediction mode and a color component.

3. The image processing device according to claim 2, wherein the at least one combination of the prediction mode and the color component includes intra prediction for luma component, intra prediction for chroma component, inter prediction for luma component, and inter prediction for chroma component.

4. The image processing device according to claim 2, wherein the at least one combination of the prediction mode and the color component includes intra prediction for Y component, intra prediction for Cb component, intra prediction for Cr component, inter prediction for Y component, inter prediction for Cb component, and inter prediction for Cr component.

5. The image processing device according to claim 1, wherein in the case when the first information indicates that the current quantization matrix having the second identification value is not to be generated by copying the source quantization matrix, further configured to:
decode the current quantization matrix, and
use the decoded current quantization matrix to process the image.

6. An image processing method comprising the steps of:
receiving an encoded bit stream;
decoding, from the encoded bit stream, a first information indicating whether or not a current quantization matrix is to be generated by copying a source quantization matrix, wherein the current quantization matrix has a second identification value;
in the case when the first information indicates that the current quantization matrix is to be generated by copying the source quantization matrix:
decoding a second information indicative of a first identification value;
in a case when the first identification value is not equal to the second identification value:
identifying the source quantization matrix based at least in part on the first identification value, and one or more or none of: a matrix size, and a matrix type;
in a case when the first identification value is equal to the second identification value:
using a default matrix as the source quantization matrix;
generating the current quantization matrix by copying the source quantization matrix; and
use the current quantization matrix to process the image.

7. The image processing method according to claim 6, wherein in the step of setting the source quantization matrix, the source quantization matrix is set corresponding to the matrix type including at least one combination of a prediction mode and a color component.

8. The image processing method according to claim 7, wherein the at least one combination of the prediction mode and the color component includes intra prediction for luma component, intra prediction for chroma component, inter prediction for luma component, and inter prediction for chroma component.

9. The image processing method according to claim 7, wherein the at least one combination of the prediction mode and the color component includes intra prediction for Y component, intra prediction for Cb component, intra prediction for Cr component, inter prediction for Y component, inter prediction for Cb component, and inter prediction for Cr component.

10. The image processing method according to claim 6, wherein in the case when the first information indicates that the current quantization matrix having the second identification value is not to be generated by copying the source quantization matrix:
decoding the current quantization matrix, and
use the decoded current quantization matrix to process the image.

* * * * *

UNITED STATES PATENT AND TRADEMARK OFFICE
CERTIFICATE OF CORRECTION

PATENT NO. : 10,225,554 B2
APPLICATION NO. : 15/955091
DATED : March 5, 2019
INVENTOR(S) : Tanaka Page 1 of 1

It is certified that error appears in the above-identified patent and that said Letters Patent is hereby corrected as shown below:

In the Specification

Column 11, Line 38, change "intra-Cb, intra-Cr" to --intra-Cb, ..., intra-Cr--

Column 30, Line 10, change "COO" to --C00--

Column 30, Line 15, change "COO" to --C00--

Signed and Sealed this
Twenty-eighth Day of May, 2019

Andrei Iancu
*Director of the United States Patent and Trademark Office*